(12) United States Patent
Yamamoto et al.

(10) Patent No.: US 9,400,618 B2
(45) Date of Patent: Jul. 26, 2016

(54) REAL PAGE MIGRATION IN A STORAGE SYSTEM COMPRISING A PLURALITY OF FLASH PACKAGES

(71) Applicant: HITACHI, LTD., Tokyo (JP)

(72) Inventors: Akira Yamamoto, Sagamihara (JP); Masayuki Yamamoto, Sagamihara (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/445,442

(22) Filed: Jul. 29, 2014

(65) Prior Publication Data

US 2015/0081954 A1 Mar. 19, 2015

Related U.S. Application Data

(63) Continuation of application No. 13/259,763, filed as application No. PCT/JP2011/005145 on Sep. 13, 2011, now Pat. No. 8,806,156.

(51) Int. Cl.
| | |
|---|---|
| *G06F 12/02* | (2006.01) |
| *G06F 3/06* | (2006.01) |
| *G09B 19/06* | (2006.01) |
| *G09B 17/00* | (2006.01) |
| *G06F 17/28* | (2006.01) |

(52) U.S. Cl.
CPC .............. *G06F 3/0688* (2013.01); *G06F 3/065* (2013.01); *G06F 3/0619* (2013.01); *G06F 12/0246* (2013.01); *G06F 17/28* (2013.01); *G09B 17/00* (2013.01); *G09B 19/06* (2013.01)

(58) Field of Classification Search
CPC . G06F 3/0608; G06F 3/0647; G06F 12/0246; G06F 3/0619
See application file for complete search history.

(56) References Cited

U.S. PATENT DOCUMENTS

| 8,954,659 B2 | 2/2015 | Yamamoto et al. | |
|---|---|---|---|
| 2007/0239655 A1* | 10/2007 | Agetsuma et al. | 707/1 |
| 2008/0307178 A1* | 12/2008 | Agombar et al. | 711/162 |
| 2008/0320219 A1 | 12/2008 | Okada et al. | |
| 2009/0150605 A1 | 6/2009 | Flynn et al. | |

(Continued)

FOREIGN PATENT DOCUMENTS

| JP | H04-109344 | 4/1992 |
|---|---|---|
| JP | H07-261938 | 10/1995 |
| WO | WO2011/010344 | 1/2011 |

OTHER PUBLICATIONS

Office Action, Japanese Patent Application No. 2013-552448, issued Dec. 2, 2014.

*Primary Examiner* — Hal Schnee

(74) *Attorney, Agent, or Firm* — Volpe and Koenig, P.C.

(57) ABSTRACT

A storage system comprises a plurality of flash packages comprising a plurality of flash chips, and a storage controller for receiving a first write request from a higher-level apparatus and sending a second write request of write data based on data conforming to this first write request to a write-destination flash package, and demonstrates a capacity virtualization function for causing a storage capacity to appear larger than an actual storage capacity for the higher-level apparatus, and for configuring a storage space using page units. The storage system generates a second VOL (logical volume) based on a first VOL, manages a plurality of VOLs comprising the first VOL and one or more second VOLs generated based on the first VOL as a VOL group, and allocates the same page to areas of the same address of the plurality of VOLs configuring the VOL group.

10 Claims, 33 Drawing Sheets

(56) References Cited

U.S. PATENT DOCUMENTS

| | | |
|---|---|---|
| 2009/0204872 A1* | 8/2009 | Yu et al. ............... 714/773 |
| 2009/0300397 A1* | 12/2009 | Nguyen et al. ............... 713/324 |
| 2009/0319743 A1* | 12/2009 | Ash et al. ............... 711/165 |
| 2010/0153620 A1* | 6/2010 | McKean et al. ............... 711/103 |
| 2010/0281230 A1* | 11/2010 | Rabii et al. ............... 711/165 |
| 2011/0153931 A1* | 6/2011 | Bell et al. ............... 711/114 |
| 2012/0079170 A1* | 3/2012 | Chang et al. ............... 711/103 |

* cited by examiner

| | |
|---|---|
| Package group | 2101 |
| Real page address | 2102 |
| Empty page pointer | 2103 |
| Amount of stored page data | 2104 |
| Amount of compressed and stored page data | 2105 |
| Moving state flag | 2109 |
| Transfer- to real page pointer | 2110 |
| Waiting state for transferring | 2111 |
| Number of logical volumes | 2112 |
| Logical volume information pointer | 2113 |
| ⋮ | |
| Logical volume information pointer | 2113 |

Real page information 2100

Fig. 6

| Flash package ID | 2501 |
|---|---|
| Flash package virtual capacity | 2502 |
| Virtual block capacity | 2503 |

Flash package information 2500

Fig. 8

| Flash package group ID | 2301 |
|---|---|
| Package group RAID type | 2302 |
| Number of real page | 2303 |
| Number of empty real pages | 2304 |
| Flash package pointer | 2305 |
| ⋮ | |
| Flash package pointer | 2305 |
| Number of unavailable real pages | 2306 |

Flash package information 2300

Fig. 9

Package information 3000

Chip information 3100

Virtual block information 3200

Real block information 3300

REAL PAGE MIGRATION IN A STORAGE SYSTEM COMPRISING A PLURALITY OF FLASH PACKAGES

TECHNICAL FIELD

The present invention relates to the storage control of a storage system comprising a flash memory.

BACKGROUND ART

Storage systems have been equipped with a variety of storage functions in recent years. Furthermore, since storage vendors have been marketing these storage functions for profit, enhancing storage function performance increases customer value. Compared to a magnetic disk, a flash memory not only has better basic performance but also features different operating characteristics, and as such, using flash memory is an effective approach to enhancing the performance of storage functions.

Furthermore, when rewriting data, the memory characteristics of a flash memory make it impossible to directly overwrite this data to the physical area in which this data was originally stored. When carrying out a data write to an area in which a write has already being carried out, it is necessary to execute a delete process in a unit called a "block", which is a flash memory delete unit, and to write the data thereafter. For this reason, in a case where data is to be rewritten, most often the data is not written to the area in which this data was originally stored, but rather, is written to a different area. When the same data is written to a plurality of areas and a block becomes full, a block delete process is performed, and a process is carried out to write only the latest data and to create a free area. This process will be called a "reclamation process" hereinbelow. For this reason, in a package equipped with a flash memory (hereinafter, a flash memory package), a logical address layer, which is different from a physical address, is provided as an address layer that appears to be outside of the flash memory package, and a logical address, which is allocated to a physical address, is changed as needed. Furthermore, since the logical address does not change when the physical address changes, a data access using the same address is possible from outside the flash memory package, thereby enabling good usability to be maintained.

Next, technology for reducing the capacity of stored data will be described. Generally speaking, compression technology is a typical technology for reducing the capacity of stored data. In recent years, a technology called capacity virtualization technology has come into widespread use for reducing the capacity of stored data. Capacity virtualization technology is for showing a host a virtual capacity that is larger than the physical capacity of a storage device included in the storage system, and is realized by a storage controller inside the storage system. This technology makes use of a characteristic by which the amount of data actually stored with respect to the capacity of a user-defined user volume (a storage device as seen from the standpoint of the user) when the user is actually using the storage seldom reaches this defined capacity. That is, whereas a defined physical capacity is allocated when a volume is defined in a case where capacity virtualization technology is not used, in a case where capacity virtualization technology is applied, capacity is first allocated when data is actually stored in the storage system. This enables the capacity of stored data to be reduced, and, in addition, also makes it possible to enhance usability since the user does not have to define the volume capacity exactly, but rather need only define a value with a large enough margin. Patent Literature 1 discloses a system in which, in a storage system comprising a storage controller coupled to a large number of flash packages, both the storage controller and the flash packages possess capacity virtualization technology. In Patent Literature 1, to distinguish between the two, the former is called the higher-level capacity virtualization function and the latter is called the lower-level capacity virtualization function. For this reason, the flash package appears to the storage controller to have a larger capacity than the physical capacity of the actual flash memory. In the capacity virtualization technology, a physical storage area, which is allocated when data has been written, is called a page. As in the past, in Patent Literature 1, the physical storage area allocated when data has been written is called a "page" in the higher-level capacity virtualization technology realized in accordance with the storage controller. However, the physical storage area allocated when data has been written in the lower-level capacity virtualization technology realized in accordance with the flash package is called a "block", which is the delete unit of the flash memory. In general, the size of a page is highly diverse, but in Patent Literature 1, the size of the page is larger than the size of the block, which is the flash memory delete unit. In a flash memory, whereas the delete unit is generally called a "block" as mentioned above, the read/write unit inside the block is called a "page". Naturally, the size of the block is larger than the size of the page in a flash memory. However, in Patent Literature 1, the word page is not the flash memory read/write unit, but rather refers to a page in higher-level capacity virtualization. Furthermore, in the present invention, it is supposed that the word page is not the flash memory read/write unit, but rather refers to a page in higher-level capacity virtualization. However, it is not necessarily a requirement for a storage system targeted by the present invention to have the capacity virtualization technology mentioned hereinabove. In addition, formatting is ordinarily performed using a specific pattern, for example, all 0's, prior to storing user data in a storage device. Patent Literature 2 also discloses a technology by which this specific pattern, which is written by the host, is detected by the storage system at this time, and an already allocated page is released. In Patent Literature 1, there is also disclosed a technology, which, in the same known case, notifies the flash memory storage device when all 0's are detected by the storage system, and control is exercised in the flash memory storage device so that data is not allocated to this area.

One typical storage function possessed by the storage system is a copy function. As a typical function, there is a function for holding diversified volumes inside the storage system by treating a main volume as a base. The characteristic feature of volumes such as this is the fact that most of the data is the same as that of the main volume, and only a portion of the data differs. In order to reduce the capacity of the stored data, it is preferable that only the data that differs from the data inside the main volume be stored in the storage system without the data that is the same as the data inside the main volume (that is, the data that has been duplicated) being stored. Recently, a virtual server has come into widespread use as a server technology. A large number (for example, between 10 and 100) virtual servers may be allocated to one physical server. In a case like this, a volume is prepared for each virtual server, and data called a "golden image" (a module comprising a virtual server OS and so forth) may be copied to the volume of each virtual server. The golden image copy stored in the volume is used by the virtual server corresponding to this volume. Data inside the respective virtual server volumes is the same as the golden image volume, and only a portion of the data differs. In order to reduce the capacity of the stored data, it is preferable that only the data that differs from the golden image be stored in the storage system without storing the data that is the same as the golden image (the duplicated data).

In addition, a backup technology for acquiring a backup volume, which becomes the backup for the main volume inside the storage system, is known. This can be broadly divided into two methods.

A first method is a method for using the volume currently being used by the server (specifically, an application on the server) as a basis for forming images of certain points in time (before images) as volumes over a plurality of generations (for example, every day or every month). A second method is a method for using a backup volume of a certain period in time in the past, for example, one month ago, as a basis for acquiring a backup image (after image) each day. According to the first method, pre-update data of a location for which data inside the volume being directly used by the server is to be updated, is acquired, and this pre-update data is stored in a storage area other than this volume. This reduces the stored data. According to the second method, post-update data of a location for which data inside the volume being directly used by the server has been updated, is acquired, and this post-update data is stored in a storage area other than this volume. This reduces the stored data.

CITATION LIST

Patent Literature

PTL 1: WO 2011/010344
PTL 2: Japanese Patent Application Laid-open No. 2007-199922

SUMMARY OF INVENTION

Technical Problem

In a large-capacity storage system comprising flash memory, the number of flash memory chips reaches tens of thousands. For this reason, a typical configuration is one in which hundreds of flash packages equipped with hundreds of chips and several thousand HDD (Hard Disk Drives) are coupled to the controller of a storage system.

The problem that the present invention attempts to solve is the enhancement of performance in a system, which, based on a certain volume (a primary volume) inside the storage system, stores only data that differs from that of the primary volume (difference data) when creating a copy of another volume by making the flash packages work together with the storage controller. Hereinbelow, the volume that stores the difference data will be called a difference volume. In Patent Literature 1, the following technologies are disclosed:

(1) capacity virtualization technology (lower-level capacity virtualization technology); and
(2) technology for determining whether or not data is a repetitive pattern of simple data, and for not allocating a physical area in a case where the result of this determination is affirmative. However, technology for generating a high-performance difference volume by making the flash packages work together with the storage controller is not disclosed.

Solution to Problem

One example of an aspect for solving the above-mentioned problem is as follows.

The storage controller writes and reads the data of a plurality of logical volumes to and from the same address space (logical address space) of the flash package.

Thus, the storage controller, upon issuing an access request (typically a read request/write request), specifies a generation number in addition to an access-target address (either a read-source address or a write-destination address). The generation number is used to identify the primary volume and the difference volume.

In addition, the flash package shows the controller inside the storage system a virtual space capacity that is larger than the physical capacity so that the flash package can store a larger capacity than the physical capacity. Furthermore, the flash package partitions the virtual space into a number of virtual block groups, and allocates these virtual block groups to a number of real blocks. The data of a plurality of logical volumes is stored in a real block of one virtual block group. Making good use of characteristics (flash memory characteristics) like those mentioned hereinabove has the potential for enhancing the performance of difference volume generation. As has already been explained, when rewriting data in a flash memory, most often the data is not written to the area where this data was originally stored, but rather, is written to a different area. When the same data is written to a plurality of areas and the block becomes full, a reclamation process is executed. Generally speaking, when executing a reclamation process, in a case where a plurality of data exists for the same address (for example, the same virtual segment), only recently updated data is kept; the other data is deleted. However, according to this aspect, there may be a plurality of data of different generations for the same address, and a certain piece of data from among this plurality of data need not be recently updated data for this same address, but rather, may be recently updated data for one generation. That is, according to this aspect, recently updated data is stored for each generation with respect to the same address, and data that is not recently updated data for each generation is deleted. This makes it possible to efficiently store difference data (for example, data that corresponds to a difference with the data inside the primary volume). Furthermore, updating does not necessarily occur in all addresses for each generation. In accordance with this, in the case of the backup volume, the data of the previous generation normally becomes valid. In a case where there is no data in the previous generation, the latest data, which is the updated version of this data, becomes valid. A flash package conforming to this aspect has functions for receiving a read request specifying a target generation from the storage controller, going back through the generations stored in the package, and providing the storage controller with the valid generation data as the data conforming to this read request. By contrast, the relationship between a volume, which serves as the base of the golden image of the virtual server, and a difference volume is more complicated. For this reason, the relationship between the volume that serves as the base and the difference volume is stored in either the storage controller or the flash package.

In a storage system that employs such a system, since update frequency will differ by virtual block group, the amount of data stored in a flash package will differ by virtual block group. Since the physical capacity of the flash package is limited, in a case where the physical free capacity has decreased, the physical free capacity can be increased using the following method. This method is premised on the fact that the storage controller possesses the higher-level capacity virtualization function. In the higher-level capacity virtualization function, the area allocation unit is called a "page". One characteristic feature of this aspect is that a plurality of generations of data are included in one page, in other words, the same page is allocated to a plurality of volume areas each corresponding to a plurality of generations. A first method for increasing the physical free capacity of a flash package is a method for migrating a page comprising data of a plurality of generations to another flash package. A second method is a method for partitioning one page into a plurality of pages according to generation. Specifically, in a case where N generations correspond to one page, the N generations are associated with a plurality of pages rather than the one page. More specifically, for example, in a case where data of a first generation through a tenth generation are stored in one page, the data of the first generation through the fifth generation are kept in this page (or transferred to another first page), and the data of the sixth generation through the tenth generation are transferred to a second page.

Advantageous Effects of Invention

In a large-capacity storage system, which is coupled to a large number of flash packages each mounted with a large number of flash memories, it is possible to suppress performance degradation, reduce stored data capacity, and store data of a capacity that is larger than the physical storage capacity.

BRIEF DESCRIPTION OF DRAWINGS

FIG. 6 is a diagram showing the format of real page information in the example.

FIG. 8 shows the format of flash package information in the example.

FIG. 9 is a diagram showing the format of flash package group information in the example.

DESCRIPTION OF EMBODIMENTS

Figure 1:
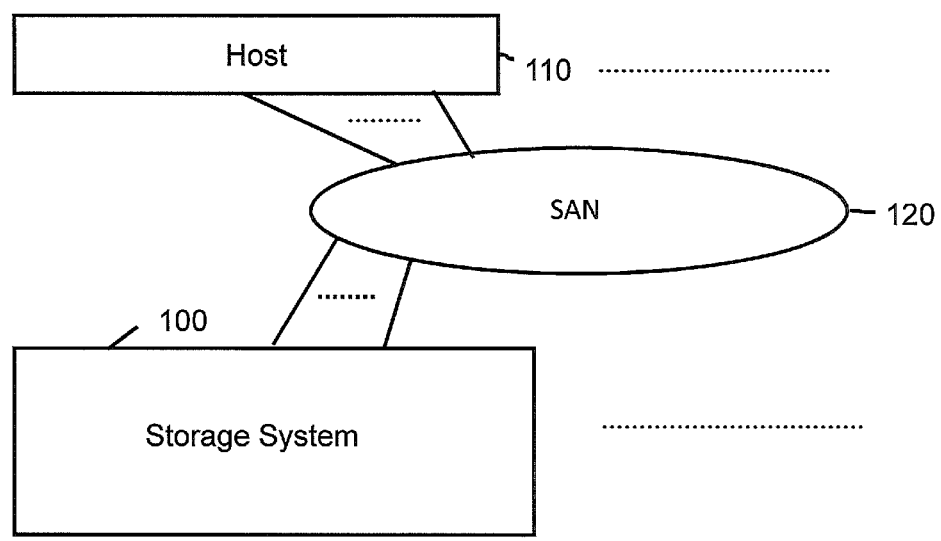
FIG. 1 is a diagram showing the configuration of an information system in an example of the present invention.

An example of the present invention will be explained below by referring to the drawings.

FIG. 1 shows the configuration of an information system in one embodiment.

The information system comprises a storage system 100, a host 110, and a SAN (Storage Area Network) 120 coupling these components. The host 110 is a computer for executing an application program (a user application), and reads and writes required data back and forth to the storage system 100 via the SAN 120. The SAN 120 uses a protocol that is able to transfer an SCSI command. For example, a Fibre Channel or other such protocol can be used as this protocol. Besides the SCSI command, a mainframe I/O protocol can also be used.

Figure 2:
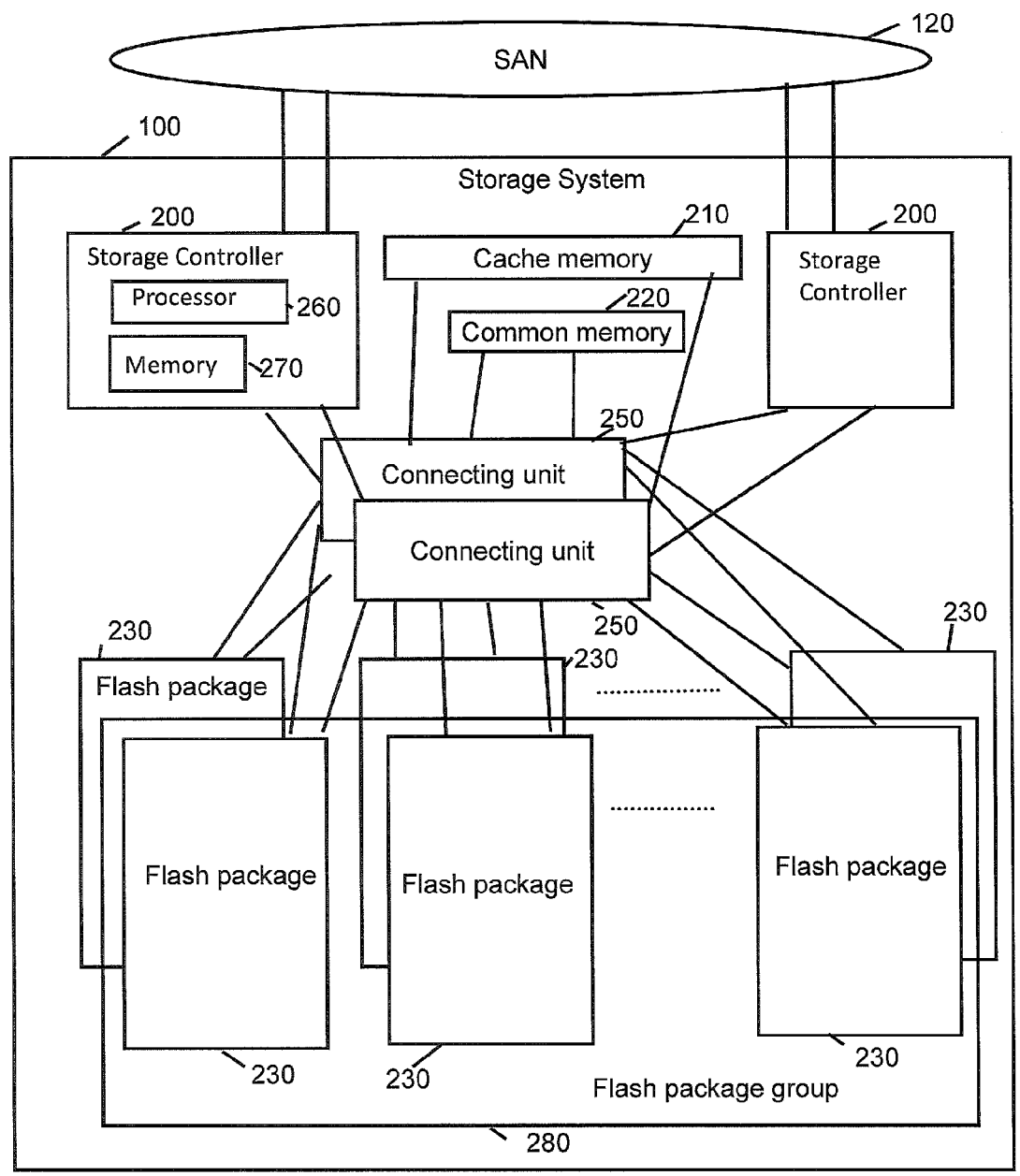
FIG. 2 is a diagram showing the configuration of a storage system in the example.

FIG. 2 shows the configuration of the storage system 100.

The storage system 100 comprises one or more storage controllers 200, a cache memory 210, a common memory 220, a flash package 230, and one or more connecting units 250 for coupling these components. Furthermore, in this example, all of the storage media inside the storage system 100 are flash packages 230, but the storage system 100 may also comprise other storage media, such as a HDD (Hard Disk Drive). Also, the capacities of all of the flash packages 230 are identical in this example. However, the present invention is valid even when there is a capacity that differs among the capacities of the flash packages 230. The storage controller 200 comprises a processor 260 for processing an access request (typically either a read request or a write request) issued from the host 110, and a memory 270 for storing a program and information.

One characteristic feature of this example is as follows. That is, when generating a difference volume (a logical volume equivalent to the differences with the primary volume) based on a certain logical volume (the primary volume) inside the storage system 100, a system, in which data that differs from the data in the primary volume (the difference data) is stored, and data that is the same as the data in the primary volume (the duplicated data) is not stored, is realized with high performance by making the flash packages 230 work together with the storage controller 200. The difference data may be stored in the difference volume, or may be stored in a storage area other than the difference volume. A set of related logical volumes (for example, a set comprising the primary volume and a difference volume generated having the primary volume as a basis) will be called a "logical volume group" here. Furthermore, in this example, it is supposed that the purpose for generating the difference volume is either one of the following two reasons:

(1) a backup; or
(2) the generation of a virtual server image from the golden image. Of course, the present invention will be valid even when a difference volume is generated for a reason other than the two reasons given above.

In this example, technology for reducing the capacity of data stored in a flash memory (flash memory stored data capacity reduction technology) is realized in the storage system 100, which comprises a large number of flash memories. In this example, the storage system 100 has hierarchical capacity virtualization technology. The control unit of a higher-level capacity virtualization technology is called a page. A page in this example is used in the capacity virtualization technology realized in accordance with a storage controller 200. Furthermore, the present invention will be valid even when a higher-level control unit in the hierarchical capacity virtualization technology is not a page. In this example, the size of a page is larger than a block, which is the delete unit in the flash memory. For example, the size of the page is X-times the block size (where X is a whole number equal to or larger than 2). Since the read/write unit in a flash memory is normally called a page, the page is smaller than the block. However, as already explained, in this example, a page signifies the control unit with respect to the higher-level capacity virtualization technology (a storage area allocated to a virtual logical volume in accordance with thin provisioning), and the size thereof is larger than the block. Furthermore, in this example, the read/write unit in the flash memory will be called a "segment" to make a distinction with the page, which is the higher-level capacity virtualization control unit. Furthermore, the control unit of the lower-level capacity virtualization technology in this example will be explained as the $N^{th}$ (where N is a whole number equal to or larger than 1) unit of the block, which is the delete unit of the flash memory. The present invention will still be valid even when a capacity virtualization function, which makes a flash memory the storage medium, makes the virtual capacity larger than the real capacity, and makes a block, which is the delete unit, the allocation unit, is provided to the host 110 without a conventional higher-level capacity virtualization function.

FIG. 2 shows the configuration of the storage system 100.

The storage system 100 comprises one or more storage controllers 200, a cache memory 210, a common memory 220, a flash package 230, and one or more connecting units 250 for coupling these components. Furthermore, in this example, the plurality of storage mediums inside the storage system 100 are all flash memories, but the storage system 100 may also comprise another type of storage medium, like a HDD, in addition to the flash memories. Also, the physical capacities (physical storage capacities) of all of the flash packages 230 are identical in this example. However, the physical capacities of at least two or more lash packages 230 of the plurality of flash packages 230 in the present invention may differ. The storage controller 200 comprises a processor 260 for processing either a read request or a write request issued from the host 110, and a storage resource (for example, a memory 270) for storing a program and/or information.

The connecting unit 250 is a mechanism for coupling the respective components inside the storage system 100. In this example, it is supposed that one flash package 230 is coupled to a plurality of storage controllers 200 in accordance with a plurality of connecting units 250 to increase reliability. However, the present invention will still be valid in a case where one flash package 230 is coupled to only one connecting unit 250.

At least one of the cache memory 210 and common memory 220 normally comprises a DRAM or other such volatile memory, but a battery or the like may be used to make this memory nonvolatile. However, the present invention will still be valid even when at least one of the cache memory 210 and common memory 220 is made nonvolatile.

The data among the data stored in the flash package 230, which is frequently accessed by the storage controller 200, is stored in the cache memory 210. The storage controller 200 receives a write request from the host 110, writes the data conforming to this write request (the data to be written to the flash package 230) to the cache memory 210, and completes this write request (for example, sends the host 110 a completion report with respect to the write request). However, the present invention will still be valid in a system which completes the write request at the stage when the write data has been stored in the flash package 230.

The common memory 220 stores cache memory 210 control information, important management information that is inside the storage system 100, information with respect to communications between the storage controllers 200, and at least one type of synchronized information.

Furthermore, in this example, it is supposed that the flash package 230 appears to be a single unit of the storage device from the standpoint of the storage controller 200. Therefore, it is supposed that the storage controller 200 is equipped with a RAID (Redundant Array of Independent (or Inexpensive) Disks) function that enables data to be recovered from a flash package 230 even when this flash package 230 fails. In a case where the storage controller 200 is equipped with a RAID function, a single RAID configuration can be adopted using a plurality of flash packages 230. This will be called a flash package group 280. However, the present invention will still be valid even when the storage controller 200 is not equipped with a RAID function like this.

Figure 3:
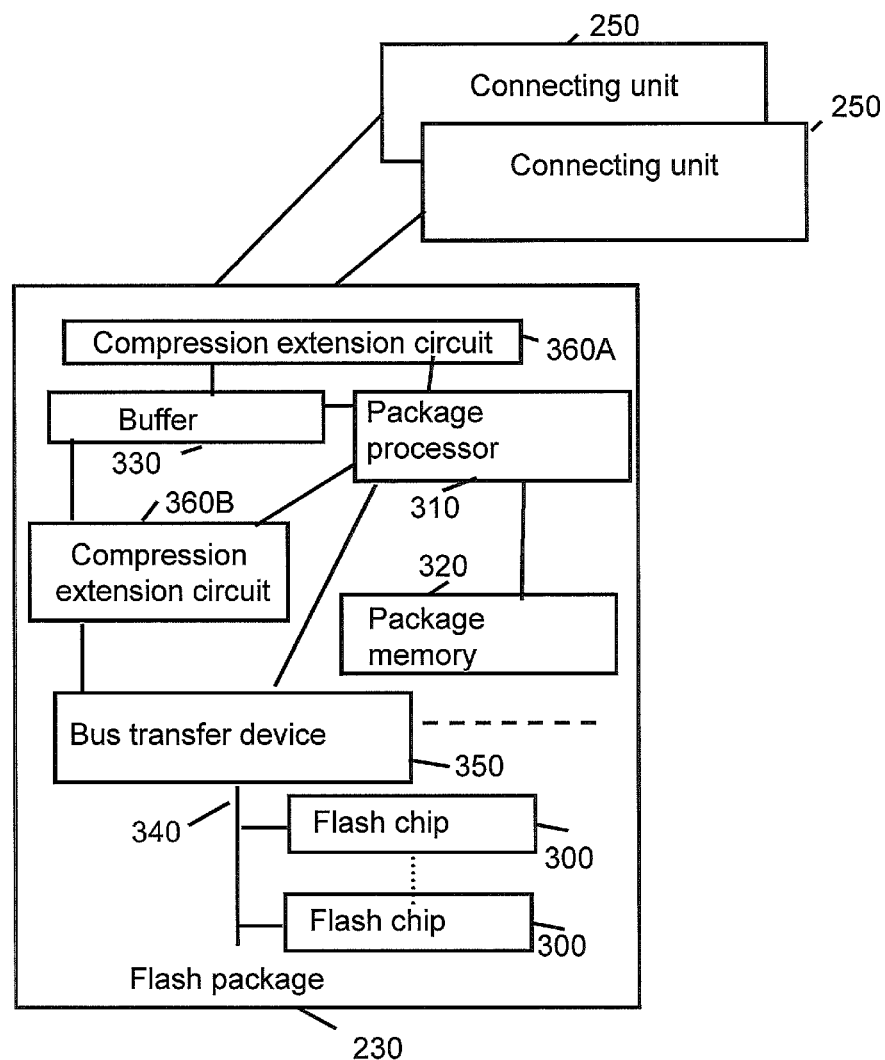
FIG. 3 is a diagram showing the configuration of a flash package in the example.

FIG. 3 shows the configuration of the flash package 230.

The flash package 230 comprises a plurality of flash chips 300, a package processor 310, a package memory 320, a buffer 330, a package bus 340, a bus transfer device 350, and a compression extension circuit 360. In this example, the flash package 230 has a block-unit capacity virtualization function. Furthermore, the present invention will still be valid even in a case where the flash package 230 has a function for virtualizing capacity in units other than blocks. For this reason, a capacity that is larger than the physical capacity of the flash package 230 (a value reflecting the total physical capacity of all the flash chips 300 of the flash package 230) is defined as the virtual capacity. Upon receiving a write request from the storage controller 200, the flash package 230 determines whether or not a block to which the data should be written has been allocated to the write-destination address (the virtual area to which this address belongs) conforming to this write request, and in a case where the result of this determination is negative, allocates a block to the write-destination address. This makes it possible to delay the time at which the block is actually allocated, thereby having the effect of reducing capacity.

Furthermore, two compression extension circuits 360A and 360B are provided. The first compression extension circuit 360A either compresses or extends the data to be transferred between the storage controller 200 and the buffer 330. The second compression extension circuit 360B either compresses or extends data to be transferred between the bus transfer device 350 and the buffer 330, and data that is to be read from a certain area of the buffer 330 and written to a different area of the buffer 330. In accordance with the above, it is possible to compress data stored in a flash chip 300, thereby having the effect of further reducing capacity. Also, in this example, in a case where there is no particular instruction (for example, a case in which there is no instruction from the package processor 310), the compression extension circuits 360A and 360B transfer the inputted data as-is without either compressing or extending this data.

The package processor 310 receives either a read request or a write request from the storage controller 200, and executes processing in accordance with the received request.

The buffer 330 stores the data that is to either be read or written between the storage controller 200 and the flash chip 300. In this example, the buffer 330 is a volatile memory. The package processor 310 receives a write request from the storage controller 200, and this write request is completed at the stage when the data conforming to this write request has been written to the flash chip 300 (write-request-complete is reported to the storage controller 200). However, the buffer 330 may be a nonvolatile memory, and the package processor 310 may send this write request completion report to the storage controller 200 at the stage when the data conforming to the write request from the storage controller 200 has been written to the buffer 330.

A program executed by the package processor 310 and flash chip 300 management information are stored in the package memory 320. Because the flash package 230 management information is important, it is preferable that the management information be able to be saved to a specific flash chip 300 during a planned stoppage. It is also preferable to have a battery in preparation for a sudden failure, and to use this battery so as to be able to save the management information to a specific flash chip 300 even when a failure or the like occurs.

The package bus 340 is for carrying data transferred between the buffer 330 and the flash chip 300, and one or more of these package buses 340 exist. A flash package 230 generally has a plurality of package buses 340 to improve performance, but the present invention will still be valid with just one package bus 340.

The bus transfer device 350 exists corresponding to the package bus 340, and executes a data transfer between the buffer 330 and the flash chip 300 in accordance with an instruction from the package processor 310.

The compression extension circuits 360A and 360B either compress or extend data to be read from the buffer 330 and/or data to be written to the buffer 330 in accordance with an instruction from the package processor 310. Of course, it is also possible for the compression extension circuits 360A and 360B to transfer data without either compressing or extending this data.

Figure 4:
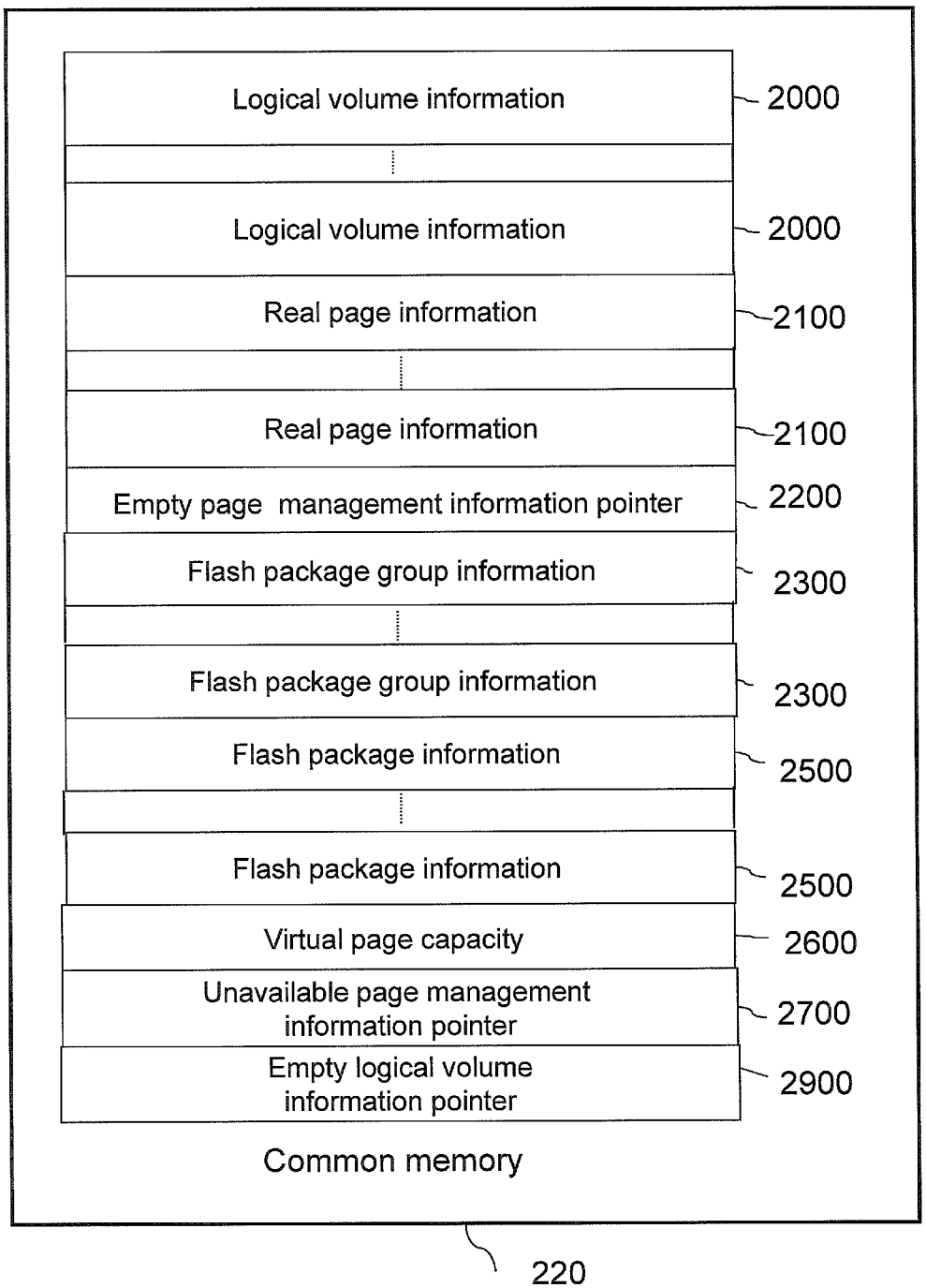
FIG. 4 is a diagram showing information, which is for carrying out higher-level control, and which is stored in a common memory of the storage system in the example.

FIG. 4 shows information stored in the common memory 220 of the storage system 100.

Logical volume information 2000, real page information 2100, an empty page information management pointer 2200, flash package group information 2300, flash package information 2500, a virtual page capacity 2600, an unavailable page information management pointer 2700 and an empty logical volume information pointer 2900 are stored in the common memory 220. At least one type of information among this information is used for realizing the higher-level capacity virtualization technology.

In this example, it is supposed that the storage controller 200 comprises a higher-level capacity virtualization function. However, the present invention will still be valid even in a case where the storage controller 200 does not have a higher-level capacity virtualization function. Normally, the storage area allocation unit in the higher-level capacity virtualization function is called a page. Furthermore, in this example, it is supposed that a logical volume (for example, a virtual logical volume in accordance with thin provisioning) is partitioned into a plurality of virtual pages (virtual storage areas), and a storage space (hereinafter may be called a "pool"), which is based on one or more flash package groups 280, is partitioned into a plurality of real pages (substantial storage areas). In capacity virtualization, the storage capacity of the logical volume can appear to be larger than the actual capacity. For this reason, the number of virtual pages is generally larger than the number of real pages. In a case where the capacity virtualization function has been realized, the storage controller 200 allocates an empty real page from the pool to the virtual page belonging to the write-destination address conforming to the write request from the host 110, and writes the data conforming to the write request to this real page.

The virtual page capacity 2600 is information denoting the capacity of the virtual page. However, in this example, the capacity of the virtual page and the capacity of the real page are not identical. This is because redundancy data that differs in accordance with the RAID type may be stored in the real page. Therefore, the capacity of the real page is decided by the RAID type of the flash package group 280 to which this real page has been allocated. For example, in a case where data is written in duplicate as in RAID 1, the capacity of the real page is two times the virtual page capacity. In a case where redundancy data with a capacity of one storage device is stored with respect to the capacity of N storage devices as in RAID 5, the real page capacity is a capacity of (N+1)/N of the virtual page capacity. One piece of redundancy data and the N pieces of data that make up this redundancy data will be called a "stripe group". In addition, the length of the individual pieces of data comprising the stripe group will be called a "stripe size". Naturally, when there is no redundancy as in RAID 0, a capacity equivalent to the virtual page capacity constitutes the capacity of the real page. Furthermore, in this example, the capacity of the virtual page is shared in common with respect to either one or a plurality of logical volumes (a virtual logical volume in accordance with thin provisioning) provided by the storage system 100, but the present invention will still be valid even when a different capacity virtual page is included in the one or plurality of virtual volumes.

Figure 5:
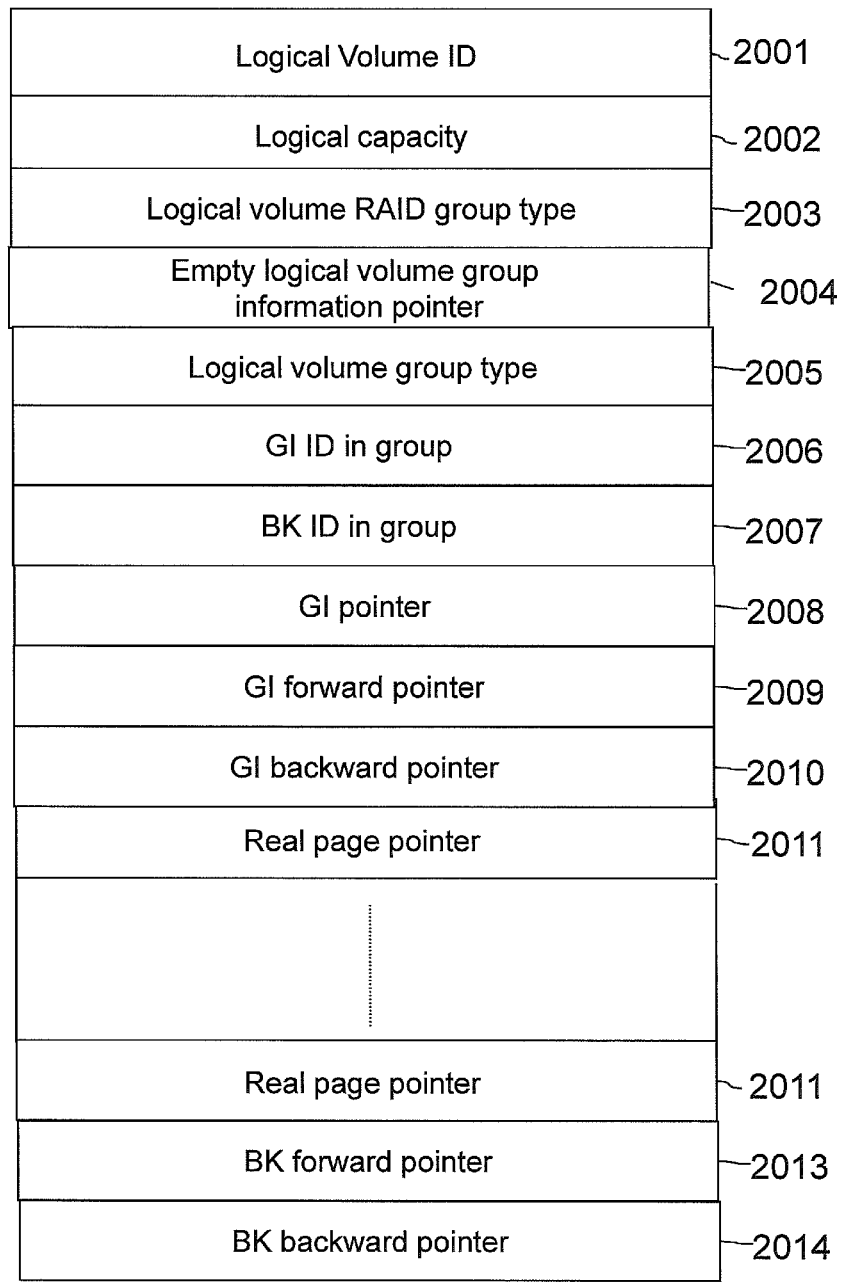
FIG. 5 is a diagram showing the format of logical volume information in the example.

FIG. 5 shows the format of logical volume information 2000.

The logical volume is a logical storage device for storing data that is to be either read or written. Generally, the host 110 issues a logical volume ID, an address in the logical volume, and an access request (a read request or a write request) specifying the length of the data to be read or written. The logical volume information 2000 is information that resides in each logical volume. This information comprises a logical volume ID 2001, a logical capacity 2002, a logical volume RAID group type 2003, a empty logical volume group information pointer 2004, a logical volume group type 2005, a GI (Golden Image) ID in group 2006, an BK (Backup) ID in group 2007, a GI pointer 2008, a GI forward pointer 2009, a GI backward pointer 2010, a BK forward pointer 2013, a BK backward pointer 2014, and a real page pointer 2011.

In this example, when an instruction is issued for the generation of a new logical volume (a difference volume) based on a certain logical volume (the primary volume), a logical volume group is formed. This instruction is sent from the host 110 of the management server 120 to the storage system 100. The data in the difference volume becomes the data in the primary volume at the point in time at which this instruction is received. Therefore, since the difference volume data is the same as the primary volume data at this point in time, possessing a mechanism for recognizing this fact will do away with the need for redundantly storing the data. When data is written to either the primary volume or the difference volume subsequent to the point in time at which the instruction was received, a difference will occur between the logical volumes (the primary volume and the difference volume). For this reason, the data subsequent to the point in time at which the instruction was received must be stored and managed in the flash package 230. The object of this example is to make use of the characteristics of the flash memory to efficiently execute the above management.

The logical volume ID 2001 denotes the ID of the corresponding logical volume.

The logical capacity 2002 is the capacity of this logical volume as seen from the host 110.

The logical volume RAID group type 2003 specifies the RAID type of the corresponding logical volume, i.e., RAID0, RAID1, and so forth. It is supposed that in a case where redundant data of the capacity of one unit is stored with respect to the capacity of N units as in RAID5, the specific numerical value of N will be specified. An arbitrary RAID type cannot be specified; the RAID type must be a type possessed by at least one flash package group 280.

The empty logical volume group information pointer 2004 is for indicating the next empty logical volume information. In this example, in a case where a logical volume exists alone, the number of logical volumes belonging to a certain logical volume group is one. When a difference volume (a new logical volume) is generated based on this volume, the number of logical volumes belonging to the logical volume group becomes plural.

The logical volume group type 2005 denotes the type of the logical volume. This type is any of a GI volume, an online volume, or a backup volume here. The GI volume is a volume that stores the golden image of the virtual server. The online volume is a volume that stores data used by the host 110 application. The online volume may be generated independently, or may be generated from the GI volume. The backup volume stores the backup data of a certain point in time of the online volume. In this example, it is supposed that a normal volume is an online volume. When the storage controller 200 has received a GI generate request to generate a golden image in the difference volume that is based on the primary volume, the volume type of the primary volume transitions to GI volume, and the volume type of the difference volume transitions to online volume (The GI generate request may be a request to generate a golden image in a difference volume that is based on a primary volume, which already comprises the golden image.). When the storage controller 200 has received a backup request to back up a difference volume that is based on a primary volume constituting an online volume, the storage controller 200 generates a difference volume, whose volume type is backup volume.

The GI ID in group 2006 is the identifier of an online volume, which has been generated from a GI volume (golden image) inside the relevant logical volume group.

The BK ID in group 2007 is the identifier of a backup volume, which has been generated from a single online volume of the relevant logical volume group. Furthermore, in this example, the BK ID in group 2007 of backup volumes generated from different online volumes will duplicate one another, but the present invention is valid even when there is no duplication.

The GI pointer 2008 points to the logical volume information 2000 of the GI volume (golden image) that constitutes the generation source of the relevant logical volume.

The GI forward pointer 2009 comprises one or more pointers (logical volume information 2000 pointers). These one or more pointers are arranged in the generation order of the logical volume information 2000 that was generated from the same golden image.

The GI backward pointer 2010 comprises one or more pointers (logical volume information 2000 pointers). These one or more pointers are arranged in the reverse order of the GI forward pointer 2009.

The BK forward pointer 2013 comprises one or more pointers (logical volume information 2000 pointers). These one or more pointers are arranged in order from an old generation to a new generation of backup volumes.

The BK backward pointer 2014 comprises one or more pointers (logical volume information 2000 pointers). These one or more pointers are arranged in the reverse order of the BK forward pointer 2013.

In this example, it is supposed that in a case where a single logical volume exists, the logical volume group type 2005 of this logical volume is online. Furthermore, the GI pointer 2008, the GI forward pointer 2009, the GI backward pointer 2010, the BK forward pointer 2013, and the BK backward pointer 2014 of the logical volume information 2000 of the logical volume are all NULL, and the GI ID in group 2006 and the BK ID in group 2007 are both 0.

Figure 34:
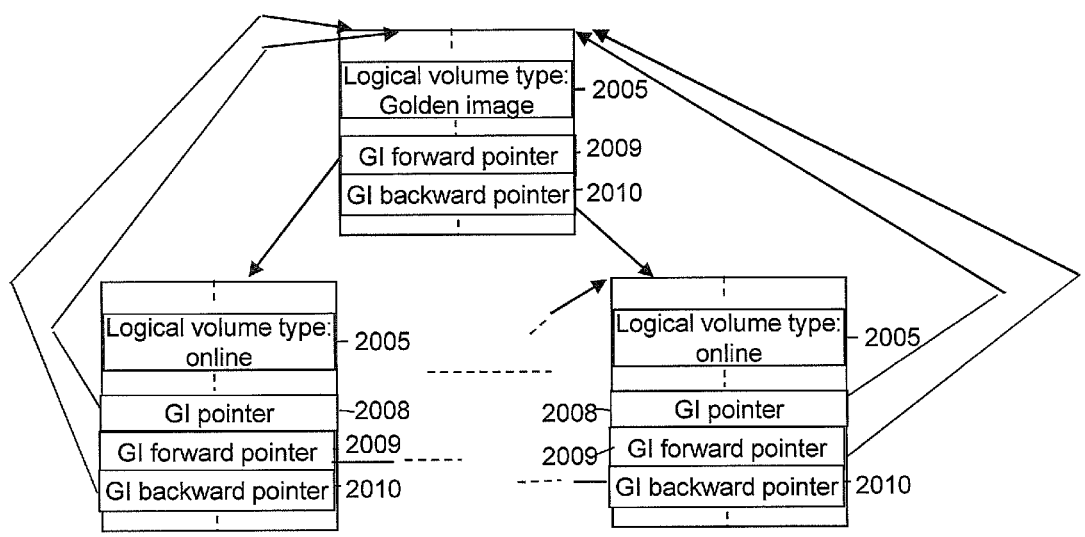
FIG. 34 is a diagram depicting a first example of the configuration of a logical volume group in the example.
Figure 35:
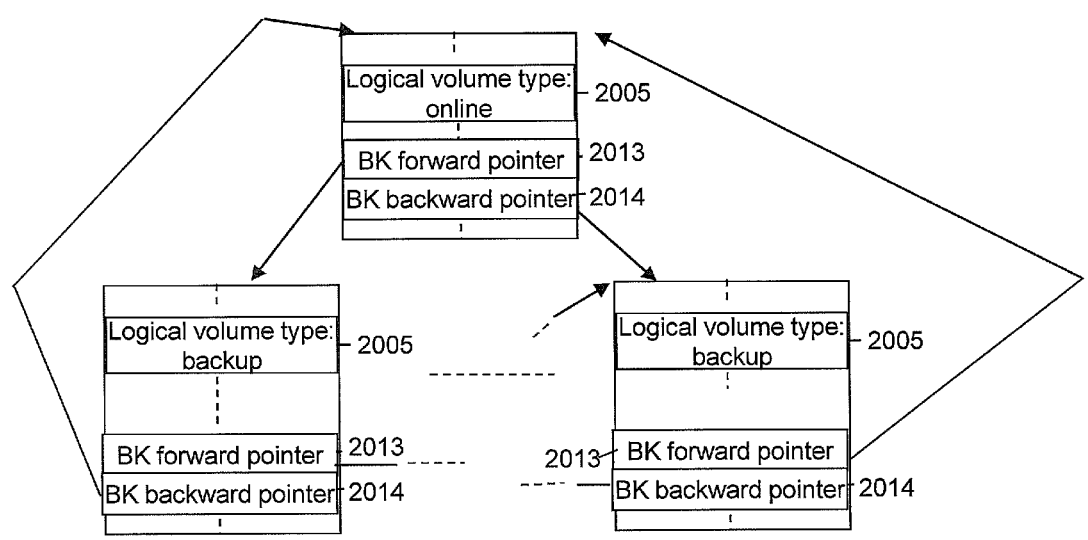
FIG. 35 is a diagram depicting a second example of the configuration of a logical volume group in the example.
Figure 36:
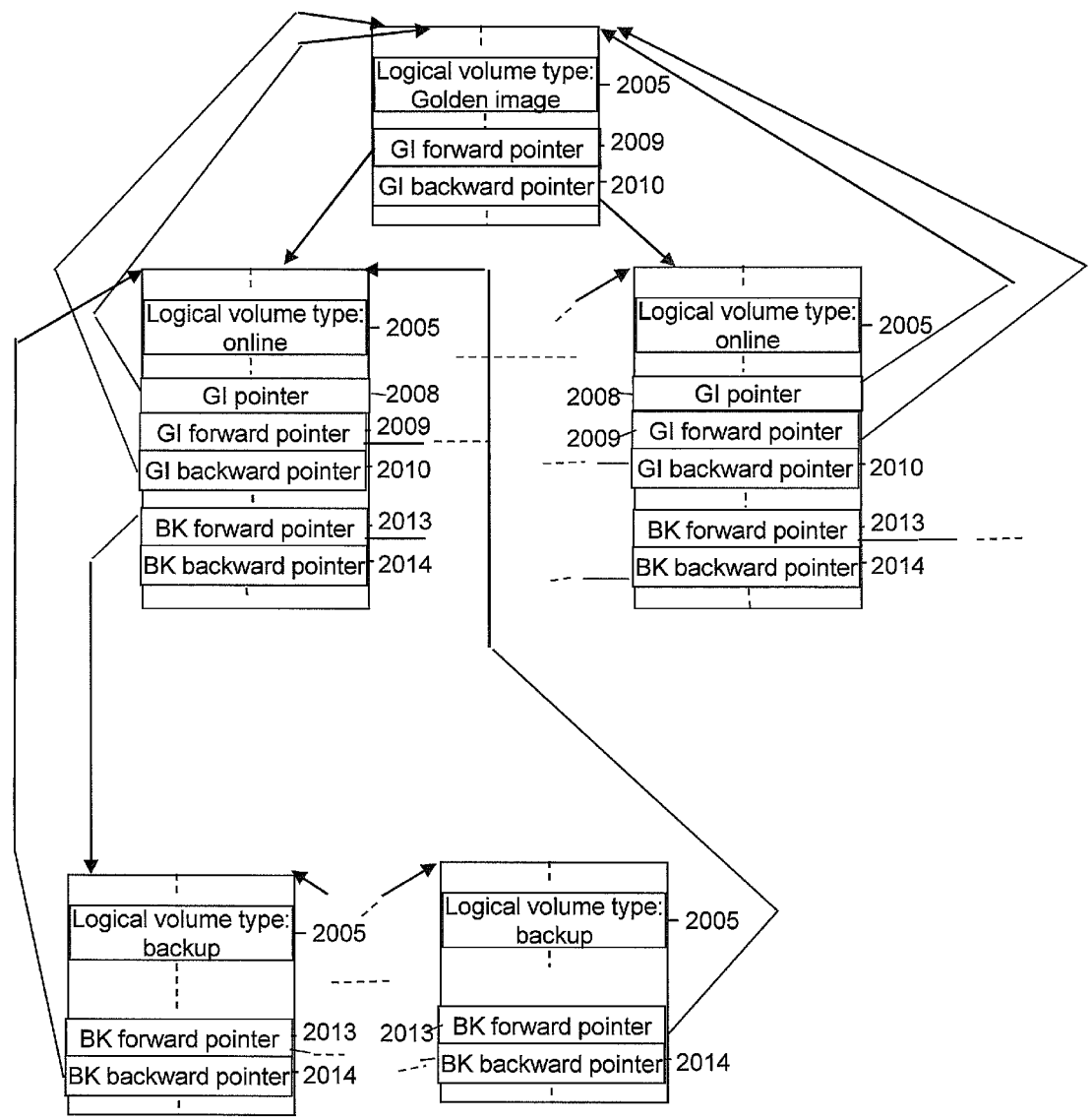
FIG. 36 is a diagram depicting a third example of the configuration of a logical volume group in the example.

FIGS. 34 through 36 show a number of examples of the configuration of the logical volume group.

According to a first logical volume group configuration example shown in FIG. 34, a plurality of online volumes (difference volumes) is generated from a single GI volume (golden image). In accordance with this, the GI pointers 2008 of the respective logical volume information 2000 having online volume as the logical volume type 2005 point to the logical volume information 2000 having GI volume as the logical volume type 2005. Furthermore, the logical volume information 2000 of the logical volumes that were generated lastly are linked to the foremost logical volume information 2000, for which the logical volume type 2005 is golden image, in both directions by the GI forward pointer 2009 and the GI backward pointer 2010.

According to a second logical volume group configuration example shown in FIG. 35, a plurality of generations of backup volumes has been generated from an online volume.

In accordance with this, the logical volume group type 2005 of the logical volume information 2000 of the recently generated logical volume is online volume, and the logical volume group type 2005 of the old logical volume information 2000 is backup volume. However, since the addresses of the logical volumes as seen from the host 110 do not change, the logical volume ID 2001 and the logical volume group type 2005 of the logical volume information 2000 for the earlier online volumes are copied to the logical volume ID 2001 and the logical volume group type 2005 of new logical volume information 2000. A value signifying a backup volume is set in the logical volume group type 2005 of the logical volume information 2000 of the old logical volume (primary volume), which constitutes the basis of the generated logical volume, and the primary volume identifier is set in the logical volume ID 2001 of this information 2000. Each logical volume is connected in accordance with the BK forward pointer 2013 and the BK backward pointer 2014. The BK ID in group 2005 ascends in the order in which the logical volume information 2000 was generated.

According to a third logical volume group configuration example shown in FIG. 36, an online volume is generated from a GI volume (golden image), and, in addition, a backup volume is generated for an online volume. In this example, the GI volume logical volume information to which the GI pointers 2008 are pointing is the logical volume information 2000 for which the logical volume group type 2005 is online volume. Furthermore, the logical volume information 2000 for which the logical volume group type 2005 is GI volume and the logical volume information 2000 for which the logical volume group type 2005 is online volume are linked in both directions by the GI forward pointer 2009 and the GI backward pointer 2010. The other aspects of this configuration have been explained by referring to FIGS. 34 and 35, and as such, explanations thereof will be omitted here. That is, the logical volume group configuration example shown in FIG. 36 is based on a combination of the logical volume group configuration example shown in FIG. 34 and the logical volume group configuration example shown in FIG. 35.

One characteristic feature of this example is that the storage controller 200 adds a GI ID in group and a BK ID in group (either the GI ID in group or the BK ID in group is equivalent to an example of a generation number) to the access request (a read request and a write request) sent to the flash package 230 in addition to the access-target address (a read-source area address and a write-destination area address). In accordance with this, in a case where either the GI ID in group or the BK ID in group differs even though the same address is specified, the flash package 230 can recognize that the different data is the read/write target.

FIG. 5 is again referenced. The real page pointer 2011 is the pointer to management information 2100 of a page that has been allocated to a virtual page of the corresponding logical volume. The number of real page pointers 2011 is the number of virtual pages of the logical volume (a number obtained by dividing a value denoting the logical capacity 2002 by a value denoting the virtual page capacity 2600, and in the case of a remainder, 1 is added to the quotient). The page corresponding to the initial real page pointer 2011 is the real page that has been allocated to the first virtual page of the logical volume, and thereafter, a pointer corresponding to the real page to be allocated to the next virtual page is stored in the next real page pointer 2011. Furthermore, since the present invention supports a virtual capacity function, the allocation of the real page is not defined by the logical volume, but rather is triggered by a data write actually being carried out to the corresponding virtual page. Therefore, in the case of a virtual page for which a write has yet to be carried out, the corresponding real page pointer 2011 will be NULL.

FIG. 6 is the format of the real page information 2100.

The real page information 2100 is real page management information, which exists for each real page. The real page information 2100 comprises a package group 2101, a real page address 2102, an empty page pointer 2103, an amount of stored page data 2104, an amount of compressed and stored page data 2105, a moving state flag 2109, a transfer to real page pointer 2110, a waiting state for transferring 2111, a number of logical volumes 2112 and a logical volume information pointer 2113.

The package group 2101 shows the flash package group 280 to which the corresponding real page is allocated.

The real page address 2102 is information showing the relative address inside the flash package group 280 constituting the basis for the corresponding real page to which the corresponding real page is allocated.

The empty page pointer 2103 constitutes a valid value in a case where a virtual page is not allocated to the corresponding real page. In this case, this value points to the next empty page information 2100 for which the virtual page is not allocated. In a case where the virtual page is allocated, the empty page pointer 2103 becomes a NULL value.

In this example, each flash package 230 is equipped with a capacity virtualization function, and provides the storage controller 200 with capacity that appears to be larger than the actual physical capacity. The unit for capacity virtualization in the flash package 230 in this example is the block, which is the delete unit of the flash memory. Below, the block seen from the storage controller 200 may be called a "virtual block" and the block actually allocated by the flash package 230 may be called a "real block". Therefore, in this example, the real page is configured from either one or a plurality of virtual blocks. Furthermore, in this example, the capacity space configured by the virtual block is larger than the capacity space configured by the real block.

Figure 7:
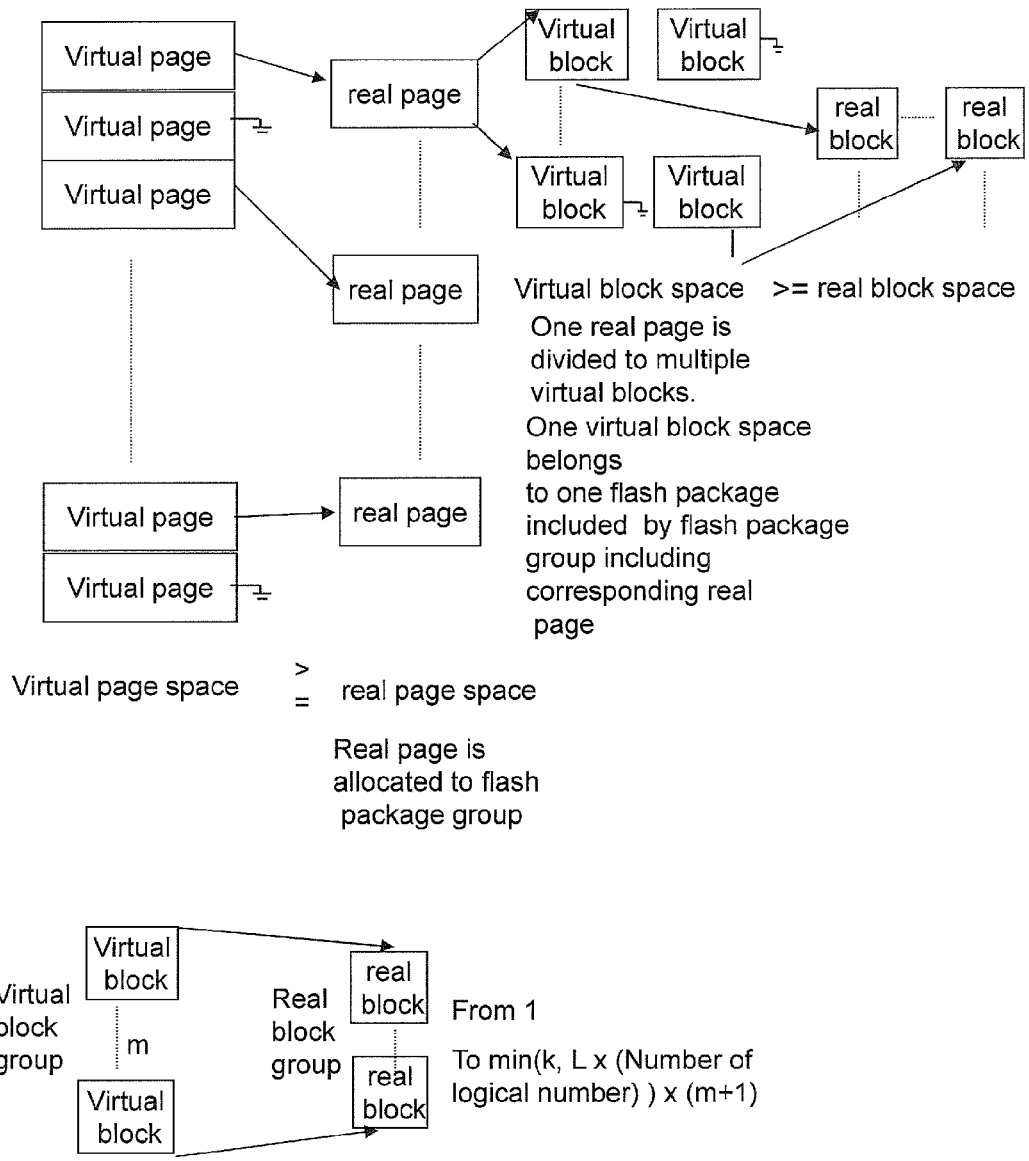
FIG. 7 is a diagram depicting the relationship of a virtual page, a real page, a virtual block, and a real block in the example.

FIG. 7 shows the relationships between the virtual page, the real page, the virtual block and the real block.

As has already been explained, redundant data, which is not in the virtual page, may be included in the real page. Meanwhile, the data stored in the virtual block is compressed and stored in the real block. In this example, the data of m (where m is a whole number equal to or larger than 1) virtual blocks is stored in between 1 and min(k, L*(number of logical blocks allocated to the relevant virtual block group))*(m+1) real blocks in accordance with the compression ratio. The k, for example, is the number of generations. The L, for example, is a value smaller than 1 (and a value larger than 0). However, the present invention is valid even in a case where the above storage system is not adopted. In the explanation of this example, these m virtual blocks may be called a "virtual block group", and the one or more real blocks allocated to a single virtual block group may be called a "real block group". The reason for making min(k, L*(number of logical blocks allocated to the relevant virtual block group))*(m+1) the maximum number of allocated real blocks in this example will be explained below.

Hypothetically, it is supposed that most of the data in the virtual block group could not be compressed. In this case, the number of real blocks required will be m, but there will be practically no empty capacity in the real block. It is supposed that the flash package 230 has received a request (a normal write request) to rewrite a portion of the data inside the block from the storage controller 200 at this time. Since the flash memory block cannot be rewritten, the flash package 230 must read all of the data in this block to the buffer 330, update the rewrite part only, delete the relevant block one time, and thereafter store the data in the entire block. Executing the above operation each time the flash package 230 receives a write request results in excessively long processing times and cannot be called practical. To solve for this, in this example, one more real block is allocated, thereby securing an empty area. For this reason, an additional write can be carried out to the empty area. In a case where the empty area is too small to accommodate the rewrite data, a delete process is carried out. In addition, the number of logical blocks allocated to the relevant virtual group and the number of generations (k) are taken into account, and the maximum number of allocated real blocks is regarded as min(k, L(<1)*(number of logical blocks allocated to the relevant virtual block group))*(m+1). This makes it possible to improve performance since the delete process (for example, a process for deleting all the data inside the real block) may be executed one time for every n write requests. Furthermore, reducing the number of delete processes also increases the life of the flash memory. In this example, the flash package 230 makes it appear to the storage controller 200 that there are more virtual blocks than real blocks. However, the storage controller 200 is aware of how many empty real blocks the flash package 230 actually has, and can reallocate a real page. In this example, the flash package 230 allocates a real block when a write request for a virtual block to which a real block has yet to be allocated is received.

The amount of stored page data 2104 and the amount of compressed and stored page data 2105 each exists in proportion to the number of flash packages 230 configuring the flash package group 280, which allocated the relevant page. However, this information is not attribute information of the virtual block(s) included in this real page, but rather is attribute information related to the data of the virtual page corresponding to this real page. Therefore, in a case where this virtual page is allocated to a different real page and the data of the current real page is copied to the new real page, the amount of stored page data 2104 and the amount of compressed and stored page data 2105 must be inherited as the management information of the new real page. The amount of stored page data 2104 is the amount of data stored in the relevant real page. Furthermore, in this example, because the data of a plurality of logical volumes is written to the real page, the maximum amount of stored page data 2104 is the real page capacity*the number of logical volumes 2802. The amount of compressed and stored page data 2105 is the amount of compressed data stored in the relevant page. The above two values are calculated based on information received from the flash package 230.

The number of logical volume 2112 stores the number of logical volumes allocated to the relevant real page. The number of logical volumes allocated may differ for each real page.

The logical volume information pointer 2113 is a pointer to the logical volume information 2000 of the logical volume allocated to the relevant real page. In this example, since the maximum number of logical volumes allocated to one real page is k, the number of areas of the logical volume information pointer 2113 is k. It is supposed that a value is configured for valid logical volume information pointers 2113 equivalent to the number configured from the top in the number of logical volumes 2112, and NULL values are configured for the remainder. In this example, it is supposed that a virtual block group recognized by the flash package 230 is included in one real page. For this reason, when the number of real blocks allocated to a virtual block group exceeds the limit, the flash package 230 notifies the storage controller 200 to this effect. Upon receiving this notification, the storage controller 200 divides the logical volume, which has been allocated to one real page up until now, into a plurality (for example, two), and divides and stores the data in the real page used up to now and in the newly acquired real page. Naturally, the present invention is valid even when the data is stored in three or more real pages.

The moving state flag 2109, the transfer to real page pointer 2110 and the waiting state for transferring 2111 are information used when the data of the relevant real page is transferred to another real page. The moving state flag 2109 is ON when the data of this real page is being transferred to the other real page. The transfer to real page pointer 2110 is information denoting the address of the transfer-destination real page to which the data of this real page is being transferred. The waiting state for transferring 2111 is a flag that is ON when the decision to transfer the data inside the target real page has been made.

FIG. 8 is the format of the flash package information 2500.

The flash package information 2500 exists for each flash package 230. The flash package information 2500 comprises a flash package ID 2501, a flash package virtual capacity 2502, and a virtual block capacity 2503.

The flash package ID 2501 is the identifier of the relevant flash package 230.

The flash package virtual capacity 2502 denotes the virtual capacity of the relevant flash package 230.

The virtual block capacity 2503 is the capacity of the virtual block. A value obtained by dividing the value denoting the flash package virtual volume 2502 by the value denoting the virtual block capacity 2503 constitutes the number of virtual blocks based on this flash package 230. In this example, the value denoting this flash package virtual capacity 2502 is adjusted in accordance with the compression ratio of the flash package 230. As already explained, in this example, the flash package 230 determines the virtual capacity of this package 230, but this virtual capacity may be determined by the storage controller 200. When a notification to the extent that the virtual capacity has changed is received from the flash package 230, the storage controller 200 sets this value in the flash package virtual capacity 2502.

FIG. 9 shows the format of the flash package group information 2300.

The flash package group information 2300 exists for each flash package group 280. The flash package group information 2300 comprises a flash package group ID 2301, a package group RAID type 2302, a number of real pages 2303, a number of empty real pages 2304, a flash package pointer 2305, and a number of unavailable real pages 2306.

The flash package group ID 2301 is the identifier of the relevant flash package group 280.

The package group RAID type 2302 is the RAID type of the relevant flash package group 280. The RAID types in this example are the same as those described when explaining the logical volume RAID type 2003.

The number of real pages 2303 denotes the number of real pages based on the flash package group 280. The number of empty real pages 2304 denotes the number of empty real pages (empty real pages) among the plurality of real pages based on the flash package group 280. The number of unavailable real pages 2306 denotes the number of unavailable real pages among the plurality of real pages based on the flash package group 280. As already explained, one characteristic features of this example is the fact that the flash package 230 virtual capacity changes in accordance with the compression ratio. When the virtual capacity of the flash package 230 changes, the number of real pages 2303 and the number of empty real pages 2304 also change. This will be explained below. First, when the virtual capacity of the relevant flash package 230 changes, the number of real pages of the relevant flash package group 280 also changes. This will be described in concrete terms. First, based on the thinking behind RAID, the premise is that the available capacity is identical in the flash packages 230 inside the same flash package group 280. Consequently, the equation becomes:

Number of real pages 2303=(smallest flash package virtual capacity 2502 of flash packages 230 in flash package group 280)*(number of flash packages 230 in flash package group 280)/(real page size).

Therefore, in a case where the smallest flash package virtual capacity 2502 of the flash packages 230 in the relevant flash package group 280 has changed, the number of real pages 2303 also changes. Similarly, the number of empty real pages 2304 will also change. Since this also results in the number of real pages that are unavailable being changed, the number of unavailable real pages 2306 also changes. For example, in a case where the number of real pages 2303 increases by 10, the number of empty real pages 2304 also increases by 10 and the number of unavailable real pages 2305 decreases by 10. Furthermore, as already explained, in this example, the flash package 230 determines this capacity, but the storage controller 200 may make this determination.

The flash package pointer 2305 is the pointer to the flash package information 2500 of the flash package(s) 230 belonging to the relevant flash package group 280. The number of package pointers 2305 is the number of flash packages 230 that belong to the relevant flash package group 280, but this value is one that is decided in accordance with the package group RAID type 2302.

The empty page information management pointer 2200 shown in FIG. 4 is information provided for each flash package group 280.

Figure 10:
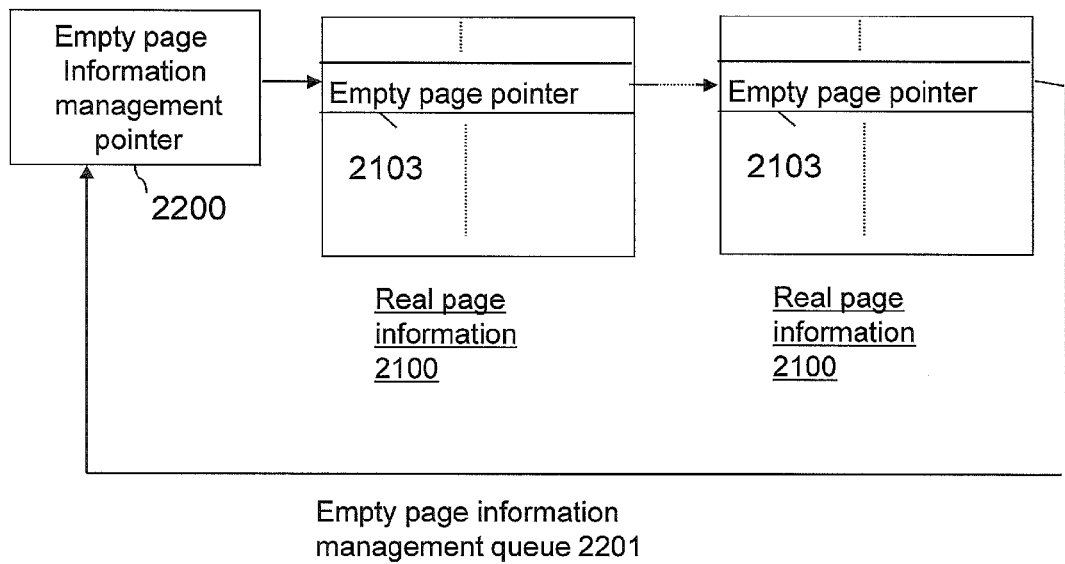
FIG. 10 is a diagram depicting a set of empty real page information pointed to by an empty page information management pointer in the example.

FIG. 10 denotes a collection of empty pages managed by the empty page information management pointer 2200.

The structure of this pointer 2200 is called the empty real page information queue 2201. Empty real page signifies a real page (an empty real page in a virtual page) that has not been allocated to a virtual page. Furthermore, the real page information 2100 corresponding to the empty real page is called the empty real page information 2100. The empty real page information management pointer 2200 is the pointer to the address at the head of the empty real page information 2100. Next, the empty page pointer 2103 inside the first real page information 2100 points to the next empty real page information 2100. In FIG. 9, the empty page pointer 2103 of the final empty real page information 2100 shows the empty page information management pointer 2200, but this may be a NULL value. The storage controller 200, upon receiving a write request with respect to a virtual page to which a real page has not been allocated, uses the empty page information management pointer 2200 to search for an empty real page within any flash package group 280 having the same RAID type as the logical volume RAID type 2003, for example, the flash package group 280 having the largest number of empty real pages, and allocates the detected empty real page to the virtual page.

The unavailable real page information management pointer 2700 shown in FIG. 4 is information provided for each flash package group 280.

Figure 11:
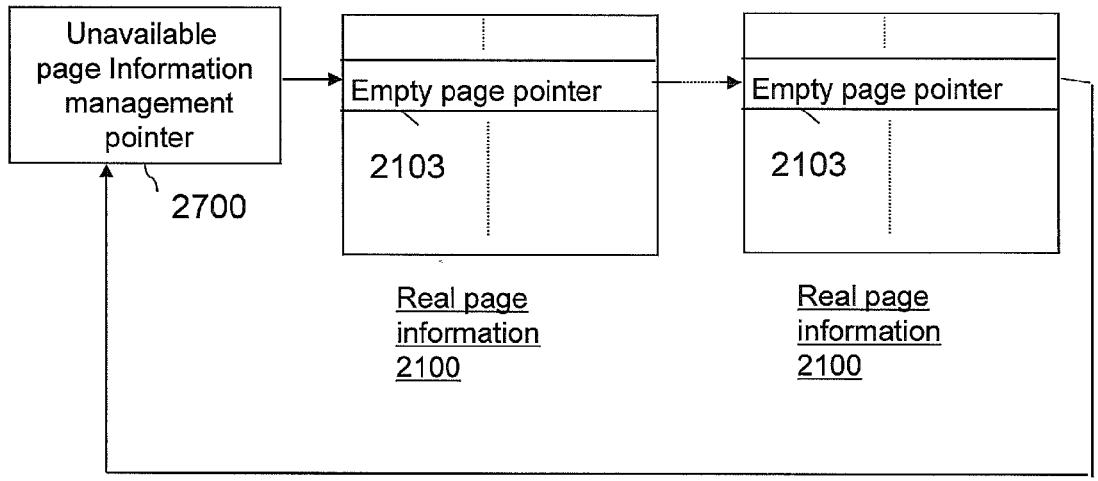
FIG. 11 is a diagram depicting a set of unavailable real page information pointed to by an unavailable page information management pointer in the example.

FIG. 11 denotes a collection of unavailable real pages managed by the unavailable real page information management pointer 2700.

Such a structure is called the unavailable real page information management queue 2701. This structure is the same as the empty real page information management queue 2201. In a case where the virtual capacity of the flash package 230 has lessened and the number of the number of real pages 2303 has decreased, real page information 2100 managed by the empty real page information management queue 2201 is transferred to the unavailable real page information management queue 2701 in proportion to this number. By contrast, in a case where the virtual capacity of the flash package 230 has grown and the number of the number of real pages 2303 has increased, real page information 2100 managed by the unavailable real page information management queue 2701 is transferred to the empty real page information management queue 2201 in proportion to this number. In this example, the storage controller 200 is equipped with a higher-level capacity virtualization function, and the flash package 230 is equipped with a lower-level capacity virtualization function. For this reason, even when the virtual capacity of the flash package 230 changes, the storage controller 110 may simply use the already explained method to transfer the real page information 2100. In a case where the real page information 2100 has been associated with the unavailable real page information management queue 2701, the real page corresponding to this information 2100 is unable to be allocated to a virtual page and the virtual block(s) comprising this real page become inaccessible. For this reason, a real block can be allocated to another virtual block. That is, the real block can be used effectively.

Figure 37:
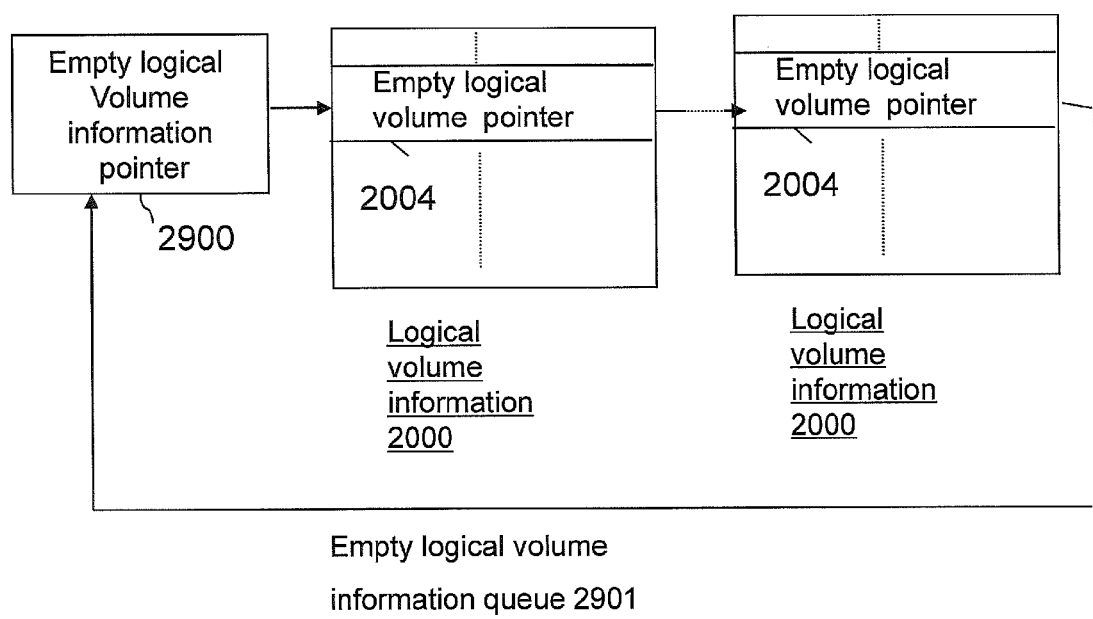
FIG. 37 is a diagram depicting an empty logical volume information queue in the example.

The empty logical volume information pointer 2900 is information provided in the storage controller 200, and manages the empty logical volume information 2000. As shown in FIG. 37, the empty logical volume information 2000 configures an empty logical volume information queue 2901. Since this configuration is the same as the configuration shown in FIGS. 10 and 11, an explanation thereof will be omitted. The storage controller 200, upon receiving a request to generate a logical volume, identifies the logical volume information 2000 indicated by the empty logical volume information pointer 2900, and uses this information 2000. Furthermore, upon deleting a certain logical volume, the storage controller 200 deletes the information required by the relevant logical volume information 2000, and returns to the empty logical volume information queue 2901.

Next, the management information of the flash package 230 will be explained. The flash package 230 holds the management information inside the package memory 320.

Figure 12:
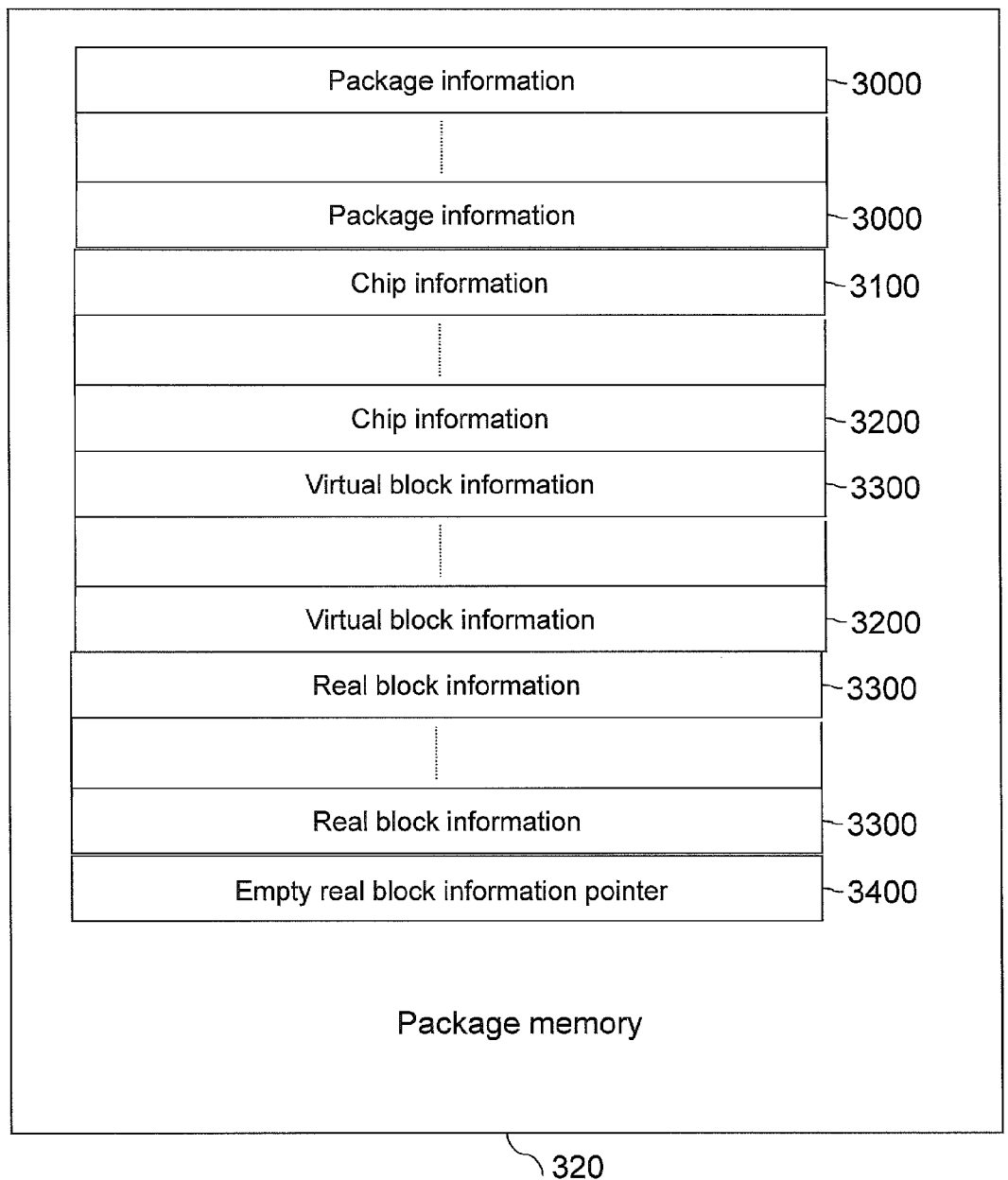
FIG. 12 is a diagram showing information for controlling a lower-level tier in a package memory of a flash package in the example.

FIG. 12 shows the management information stored in the package memory 320.

Figure 13:
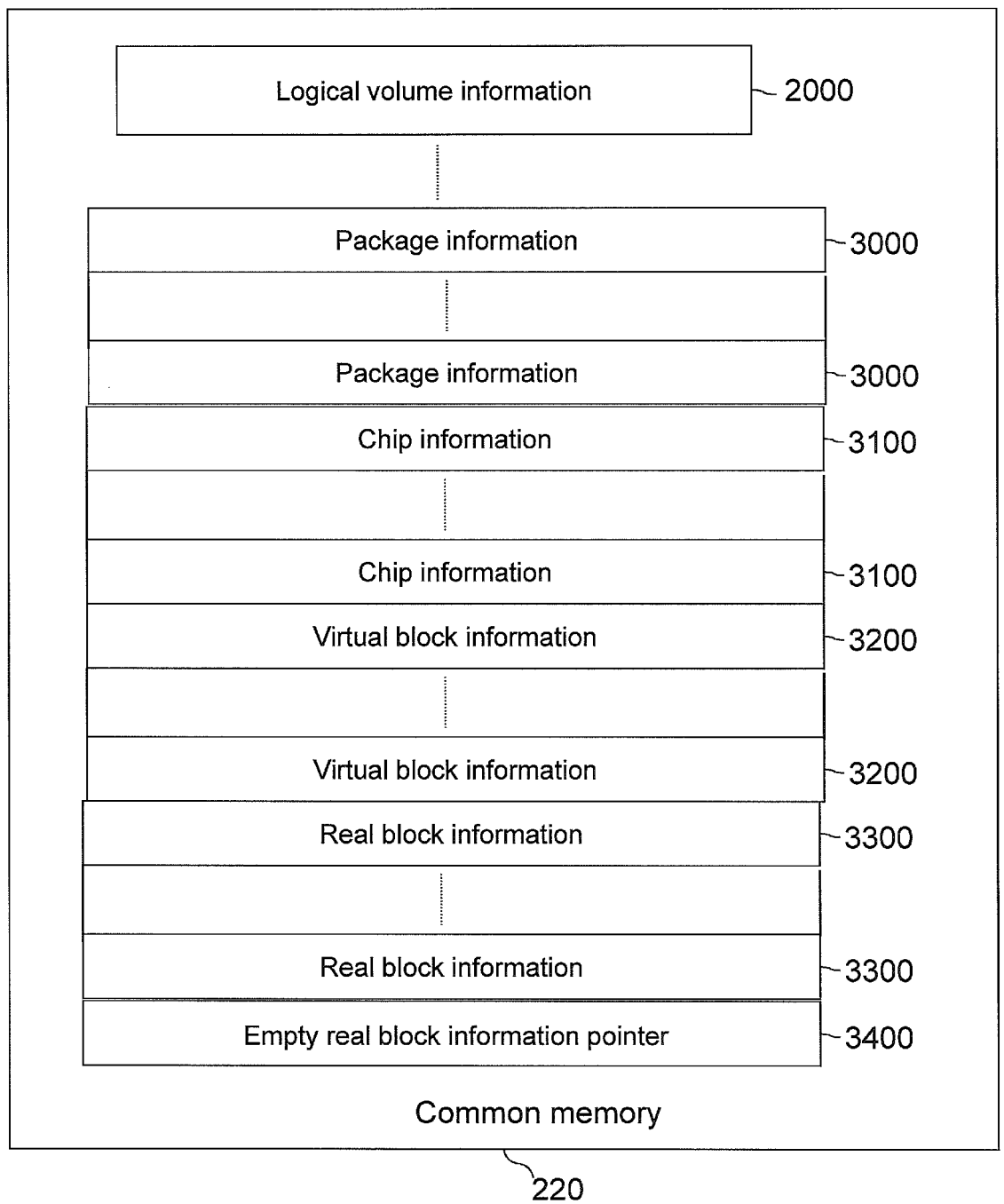
FIG. 13 is a diagram showing a configuration in which the information for controlling the lower-level tier is disposed in the common memory of the storage system in the example.

Package information 3000, chip information 3100, virtual block information 3200, real block information 3300, and an empty real block information pointer 3400 are stored in the package memory 320. At least one type of information from among this information is used for realizing the lower-level capacity virtualization technology and/or the compression technology. In this example, the flash package 230 realizes the lower-level capacity virtualization technology and the compression technology. However, in the present invention, the storage controller 200 may realize the lower-level capacity virtualization technology and the compression technology. In accordance with this, as shown in FIG. 13, substantially the same information as the information shown in FIG. 12 is stored in the common memory 220. In the configuration shown in FIG. 13, since the information shown in FIG. 13 is referenced and updated by the storage controller 200, this information will differ slightly from the respective information shown in FIG. 12. Therefore, in this example, it is supposed that the flash package 230 realizes the lower-level capacity virtualization technology and the compression technology.

Figure 14:
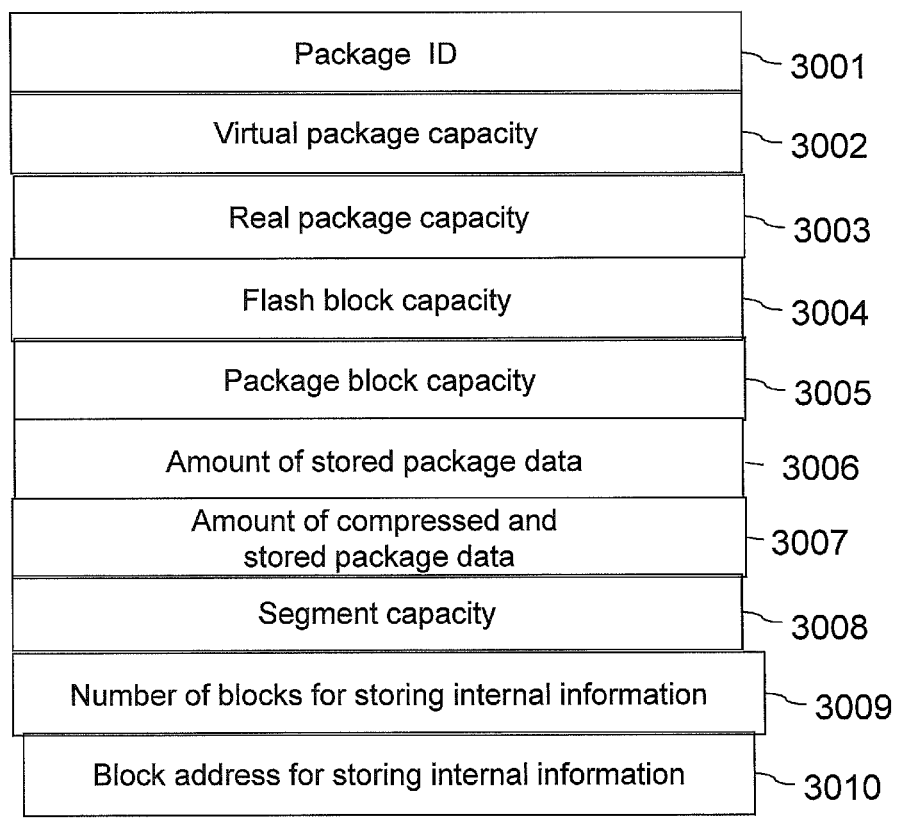
FIG. 14 is a diagram showing the format of package information in the example.

FIG. 14 is the format of the package information 3000.

The package information 3000 comprises a package ID 3001, a virtual package capacity 3002, a real package capacity 3003, a flash block capacity 3004, a package block capacity 3005, an amount of stored package data 3006, an amount of compressed and stored package data 3007, a segment capacity 3008, a number of blocks for storing internal information 3009, and a block address for storing internal information 3010.

The package ID 3001 is the identifier of the relevant flash package 230.

The virtual package capacity 3002 denotes the virtual capacity of the relevant flash package 230 as seen from the storage controller 200. One characteristic feature of this example is the fact that the flash package 230 adjusts this virtual capacity in accordance with a change in the compression ratio. As explained already, this adjustment may be carried out by the storage controller 200.

The real package capacity 3003 denotes the physical capacity of the relevant flash package group 280, specifically, the capacity that enables the storage controller 200 to actually physically store data inside the relevant flash package group 280.

The flash block capacity 3004 denotes the physical capacity of the block, which is the delete unit of the flash memory.

The package block capacity 3005 denotes the capacity of a real block in the flash package 230.

The amount of stored package data 3006 denotes the total pre-compression value of write data received from the storage controller 200.

The amount of compressed and stored package data 3007 denotes the total post-compression value of write data received from the storage controller 200. In this example, the flash memory read/write unit will be called a "segment".

The segment capacity 3008 denotes the capacity of a segment.

The number of blocks for storing internal information 3009 is the number of blocks constituting the save-destination of the internal information (for example, the information comprising the package information 3000, the chip information 3100, the virtual block information 3200, the real block information 3300, and the empty real block information pointer 3400 stored in the package memory 320). The internal information, for example, is stored either when the power is turned OFF or when a failure occurs.

The block address for storing internal information 3010 denotes the address of the storage area in which the internal information is stored (the address of the storage area in the package memory 320). Important information (for example, the package information 3000, the chip information 3100, the virtual block information 3200, the real block information 3300, and the empty real block information pointer 3400) may be stored n times. Also, since save operations are not that numerous, the number of times a block is deleted may cease to be a problem.

Information denoting the total number of real blocks possessed by the relevant flash package 230 may be included in the package information 3000. For example, in addition to the number of blocks for storing internal information 3009, information denoting the number of blocks capable of being allocated from the flash package 230 and the number of failed block based on the flash package 230 may also be included in the package information 3000. The total of the amount of stored package data 3006, the number of failed blocks, and the number of blocks for storing internal information 3009 may be the total number of real blocks that this flash package possesses.

Figure 15:
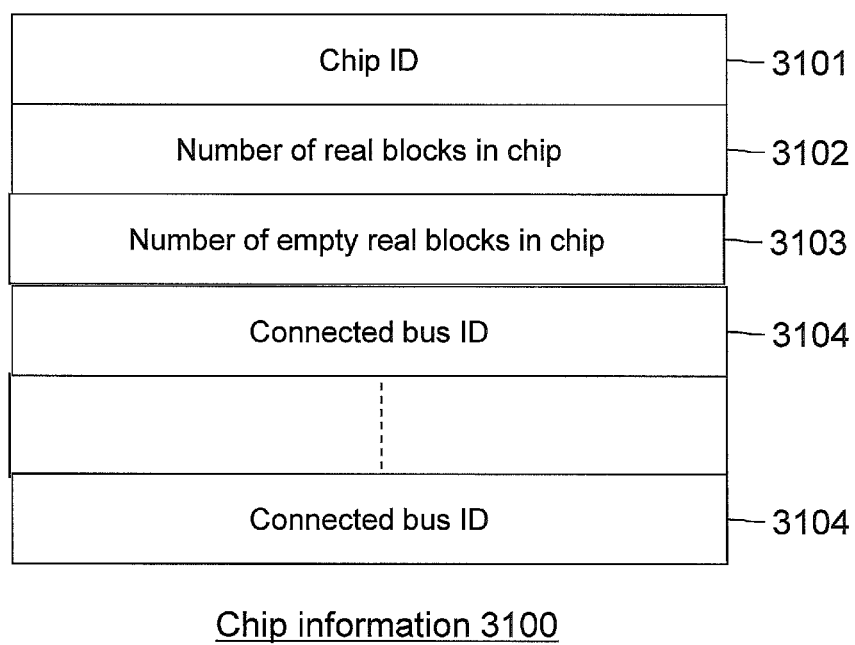
FIG. 15 is a diagram showing the format of chip information in the example.

FIG. 15 is the format of the chip information 3100.

The chip information 3100 exists for each flash chip 300. The chip information 3100 comprises a chip ID 3101, a number of real blocks in chip 3102, a number of empty blocks in chip 3103, and a connected bus ID 3104.

The chip ID 3101 is the identifier of the relevant flash chip 300.

The number of real blocks in chip 3102 denotes the number of real blocks possessed by the relevant flash chip 300.

The number of empty blocks in chip 3103 shows the number of empty real blocks inside the relevant flash chip 300. The empty real block is a real block that has not been allocated to a virtual block (a real block capable of being allocated to a virtual block).

The connected bus ID 3104 is the identifier of the package bus 340 to which the relevant flash chip 300 is coupled.

Figure 16:
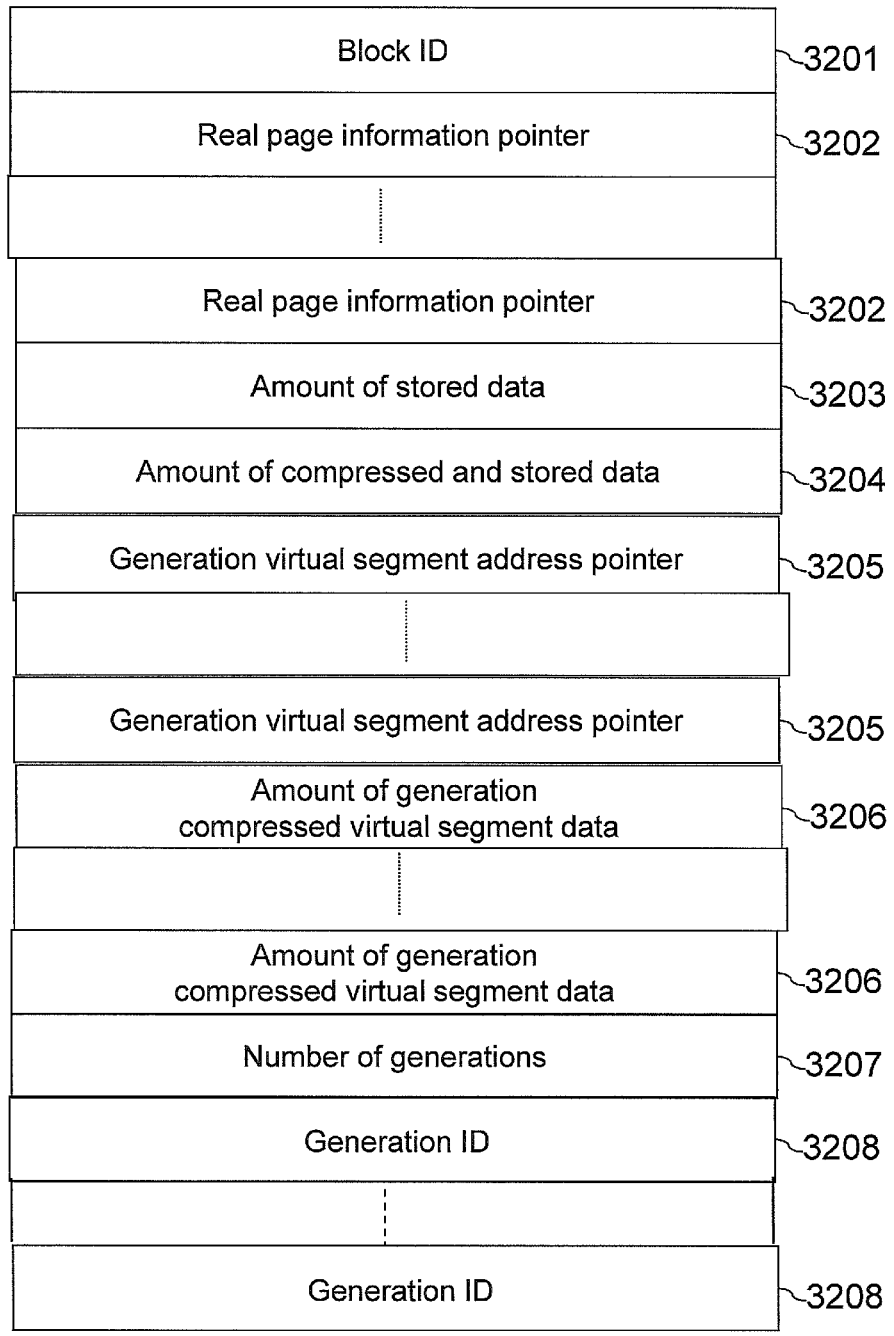
FIG. 16 is a diagram showing the format of virtual block information in the example.

FIG. 16 is the format of the virtual block information 3200.

The virtual block information 3200 is information corresponding to a virtual block group. It is supposed that the virtual block information 3200 is arranged in virtual block address order. The initial virtual block information 3200 corresponds to m virtual blocks from the first virtual block. The virtual block information 3200 comprises a virtual block group identifier 3201, a real block information pointer 3202, an amount of stored data 3203, an amount of compressed and stored data 3204, a number of generations 3207, a generation ID 3208, a generation virtual segment address pointer 3205, and an amount of generation compressed virtual segment data 3206. The flash memory read/write unit is normally called a "page", but since this example treats the page as the unit for the capacity virtualization carried out by the storage controller 200, in this example, the flash memory read/write unit will be called a "segment". In this example, write data is compressed and stored in the flash memory. The segment in which the compressed data is stored will be called a "real segment". A pre-compression virtual segment will be called a "virtual segment". In this example, one or more virtual segments are compressed and stored in a real segment.

The virtual block identifier 3201 is the identifier of the corresponding virtual block group.

The real block information pointer 3202 is a pointer to the real block information 3300 of the real block allocated to the corresponding virtual block. For example, there are (m+1) real block information pointers 3202. The real block information pointer 3202 is a NULL value when a real block is not allocated. In a case where the number of real block allocated to the relevant virtual block group is j (equal to or less than min(k, L(<1)*number of logical blocks allocated to the relevant virtual block group)*(m+1)) real blocks, j real block information pointers 3202 from the start are valid.

The generation ID 3208 is the identifier of the logical block group stored in the relevant virtual block group, that is, information equivalent to the GI ID in group 2006 and the BK ID in group 2007 received from the storage controller 200.

The number of generations 3207 is the number of generations of logical volumes stored in the relevant virtual segment group. Since the number of generations capable of being associated with one virtual segment group is regarded as k in this example, the number of areas of the generation ID 3208 is k, valid values are configured in order from the first generation ID 3208, and NULL values are configured thereafter. In this example, since the data of a plurality of logical volumes comprising one logical volume group are written to one virtual page, the data of a plurality of logical volumes is also stored in the virtual block group.

The amount of stored virtual block group data 3203 denotes the amount of pre-compression data stored in the relevant virtual block group. The maximum capacity is the capacity of the virtual block group. On the other hand, the amount of compressed and stored data 3204 is the amount of stored compressed data. Furthermore, in the case of a flash memory, when the content of a virtual segment is rewritten, the same virtual segment data resides in a plurality of locations since the rewritten content is stored in a different real block. The amount of stored data 3203 and the amount of compressed and stored data 3204 are values obtained by computing the most recent amount of data stored in the virtual segment.

The generation ID 3208 is an identifier for distinguishing logical volumes. Furthermore, in this example, it is supposed that there are p generation IDs 3208 in the virtual block information 3200 (where p is a whole number of 1 or more) as shown in FIG. 16. Also, in this example, the storage controller 200 attaches an identifier to distinguish between a plurality of logical volumes when issuing an access request (a read request or a write request) to the flash package 230. This identifier is the value shown in either the GI ID 2006 or the BK ID 2007 (refer to FIG. 5). The flash package 230, upon receiving this identifier from the storage controller 200, searches the generation IDs 3208, and if this identifier is not yet registered, registers this value in a generation ID 3208 in which a value has yet to be stored. Furthermore, it is supposed that a NULL value is entered in a generation ID 3208 in which a valid identifier is not stored.

The generation virtual segment address pointer 3205 is a pointer which denotes, for each logical volume, an identifier showing the location of the information within the real block information 3300 corresponding to the real block, which the corresponding virtual segment allocated to the relevant virtual block group, and denotes the address inside this real block in which the information is stored.

The amount of generation compressed virtual segment data 3206 is the amount of post-compression data in the corresponding virtual segment. Therefore, the number of areas of the generation virtual segment address pointer 3205 and the number of areas of the amount of generation compressed virtual segment data 3206 are equivalent to the value obtained by multiplying the number of generations IDs 3208 (k) by the number of virtual segments in the virtual block group (flash block capacity 3003*m/segment capacity). Therefore, the generation virtual segment address pointer 3205 of the number of virtual segments in the initial virtual block group shows the data of the logical volume corresponding to the first generation ID 3208. Thereafter, the generation virtual segment address pointer 3205 of the number of virtual segments in the subsequent virtual block group shows the data of the logical volume corresponding to the next generation ID 3208. The same holds true for the amount of generation compressed virtual segment data 3206. Furthermore, in this example, it is supposed that each virtual segment possesses the generation virtual segment address pointer 3205 and the amount of generation compressed virtual segment data 3206, but the present invention is valid even when the same information is possessed by two or more virtual segments.

Figure 17:
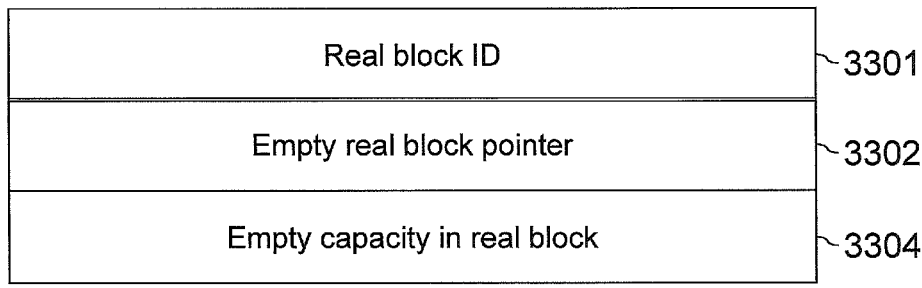
FIG. 17 is a diagram showing the format of real block information in the example.

FIG. 17 is the format of the real block information 3300.

The real block information 3300 exists for each real block. The real block information 3300 comprises a real block identifier 3301, an empty real block pointer 3302, and an empty capacity in real block 3304.

The real block identifier 3301 is the identifier of the corresponding real block, and, for example, shows the address of the flash chip 300 to which this real block corresponds.

The empty real block pointer 3302, in a case where the corresponding real block is not allocated to a virtual block (is in an empty state), points to the real block management information 3300 of the next empty real block.

The empty capacity in real block 3304 shows the current empty capacity of the corresponding real block. The package processor 310 can store write data of equal to or less than the empty capacity in the corresponding real block. After storing the write data, the package processor 310 reduces the empty capacity in real block 3304 in proportion to the amount of write data that was stored.

Figure 18:
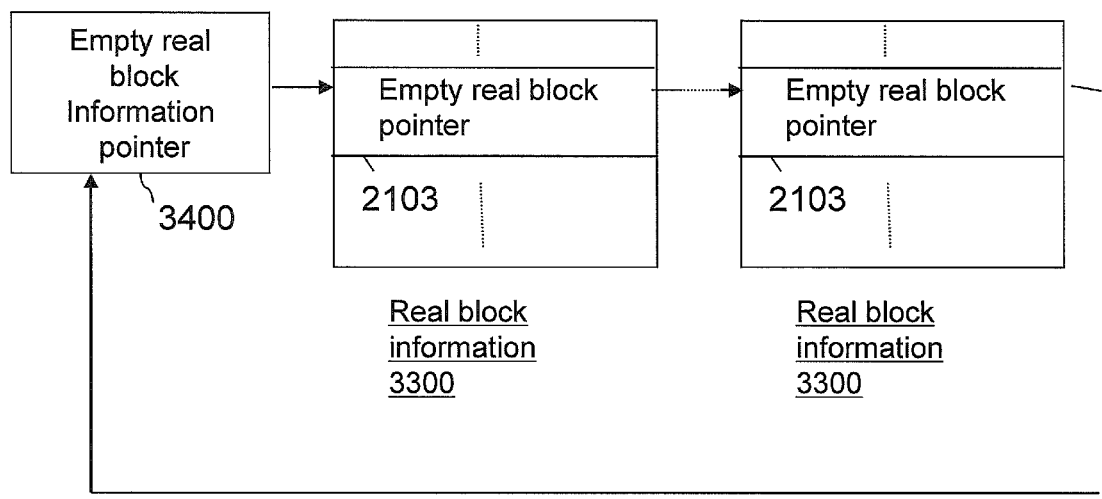
FIG. 18 is a diagram depicting a set of empty real blocks pointed to by an empty real block information pointer in the example.

The empty real block information pointer 3400 exists corresponding to the flash chip 300. FIG. 18 denotes a collection of empty real blocks managed by the empty real block information pointer 3400. The empty real block information pointer 3400 points to the real block information 3300 address of the first empty block. Next, the empty block pointer 3302 inside the real block information 3300 of the first empty real block shows the real block information 3300 of the next empty real block. In FIG. 18, the empty real block pointer 2103 of the real block information 3300 of the last empty real block shows the empty real block information pointer 3400, but this may be a NULL value. The package processor 310, upon receiving from the storage controller 200 a write request specifying an address belonging to a virtual block to which a real block has not been allocated, searches for an empty real block among the real blocks inside the flash chip 300 (based, for example, on the empty real block information pointer 3400 corresponding to the flash chip 300 having the largest number of empty real blocks), and allocates the empty real block that has been found to the virtual block. The package processor 310 writes the data conforming to the above-mentioned received write request to the allocated empty real block.

Next, the operations executed by the storage controller 200 and the flash package 230 using the management information explained hereinabove will be explained.

First, the operation of the storage controller 200 will be explained. Storage controller 200 operations are executed by the processor 260 inside the storage controller 200, and the programs for these operations are stored inside the memory 270.

Figure 19:
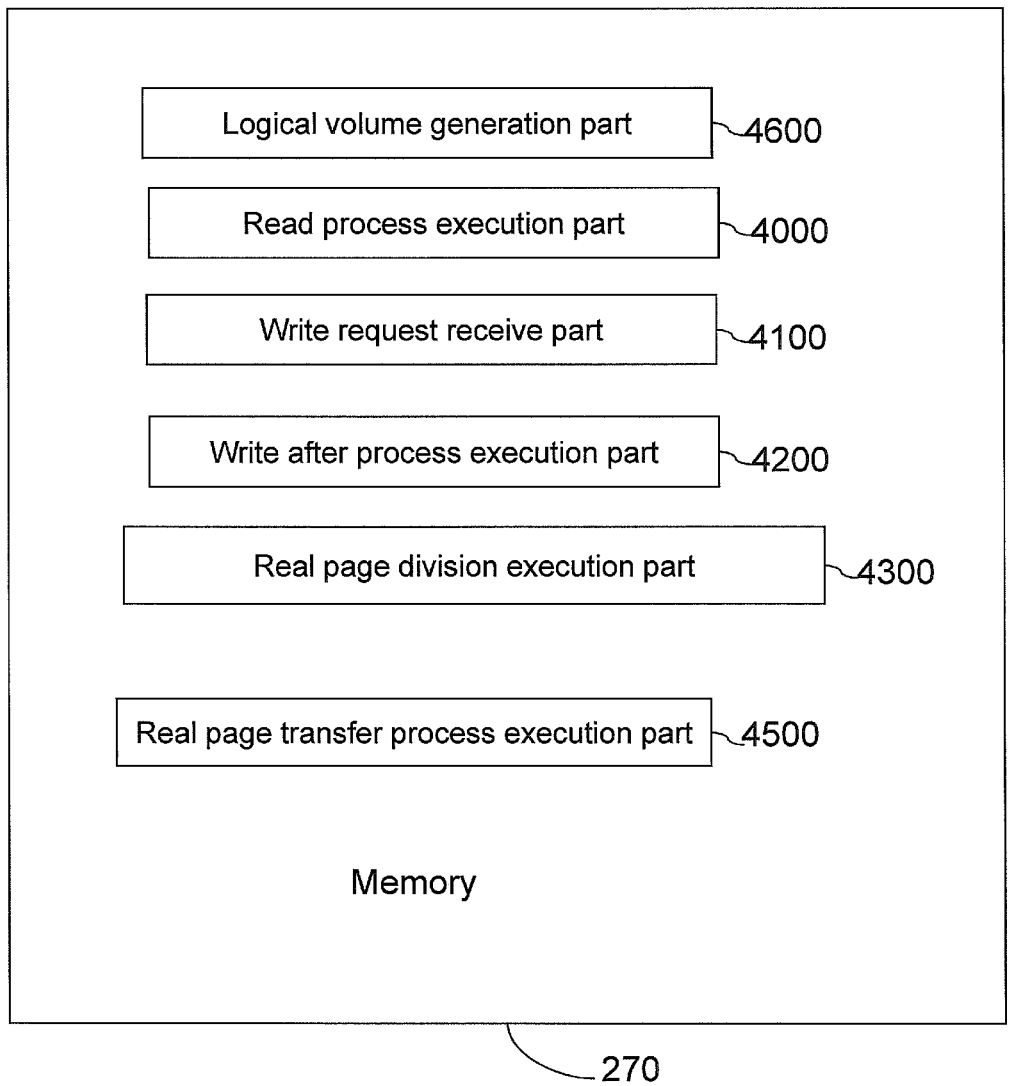
FIG. 19 is a diagram showing higher-level control programs in a memory of the storage controller in the example.

FIG. 19 shows the programs stored in the memory 270.

The programs related to this example are a logical volume generation process part 4600, a read process execution part 4000, a write request receive part 4100, a write after process execution part 4200, a real page transfer process execution part 4500, and a real page division process execution part 4300. These programs are executed by the processor 260. At least one of these programs is for realizing a higher-level wear leveling technology/capacity virtualization technology. Furthermore, as was already explained, in this example, a lower-level wear leveling technology/capacity virtualization technology is realized by the flash package 230, but this example may also be such that the storage controller 200 executes the lower-level wear leveling technology/capacity virtualization technology. In this case, the lower-level wear leveling technology/capacity virtualization technology is executed by the storage controller 200. Therefore, since both the higher-level program and the lower-level program are executed by the storage controller 200, the interface between the programs will differ, but the content executed by the higher-level program is basically not all that different. Therefore, logical volume generation process part 4600, the read process execution part 4000, the write request receive part 4100, the write after process execution part 4200, the real page transfer process execution part 4500, and the real page division process execution part 4300 will be explained in detail premised on the fact that the flash package 230 realizes the lower-level wear leveling technology/capacity virtualization technology in this example. Furthermore, in this example, it is supposed that a read request and a write request from the host 110 are issued at the boundary of a segment (a page in normal flash memory terminology), which is the read/write unit of the flash memory. Of course, the present invention is also valid in a case where at least one of a read request and a write request from the host 110 has specified only a portion of a segment.

Figure 30:
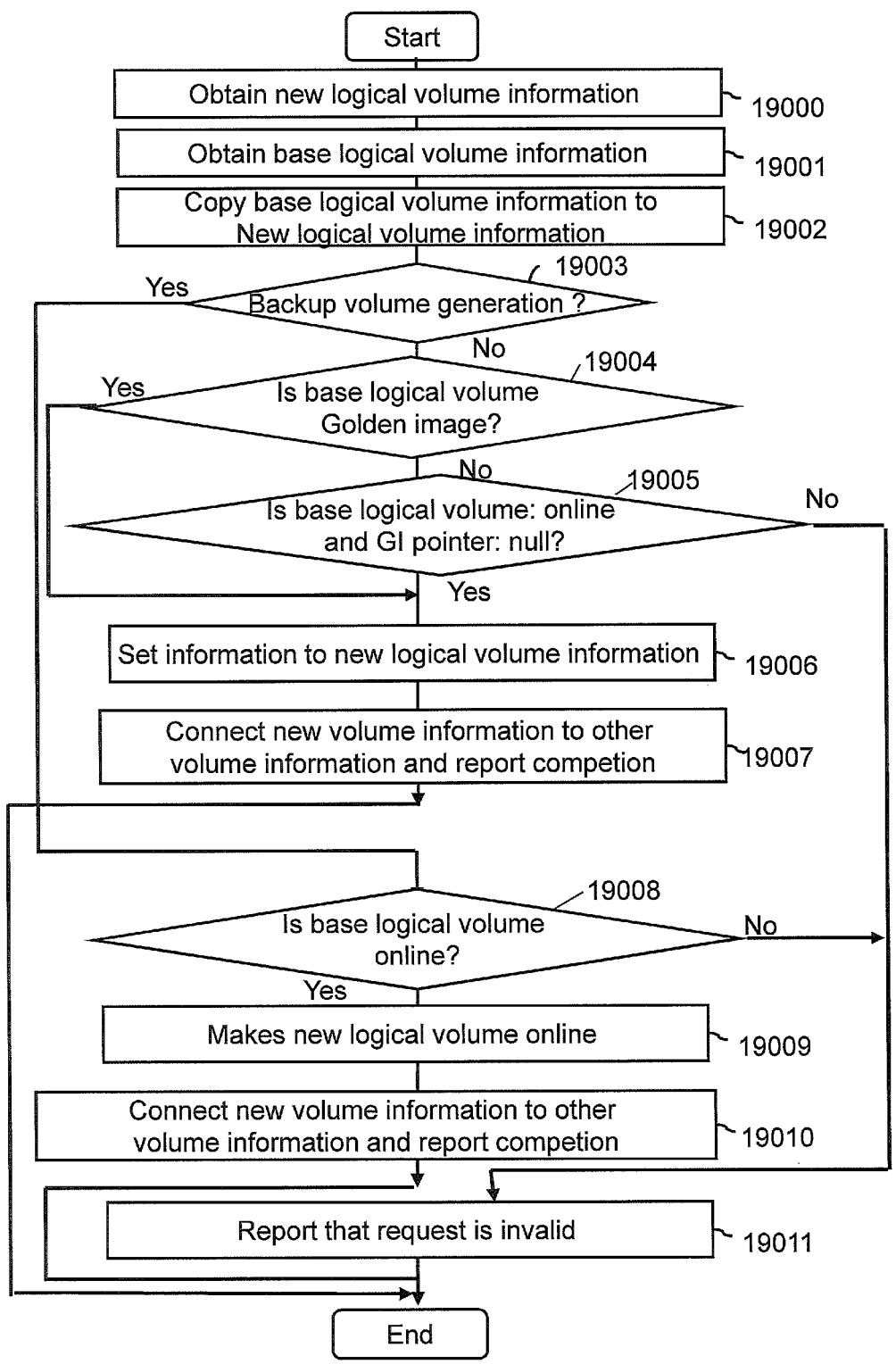
FIG. 30 is a diagram showing the flow of processing of a logical volume generation process part in the example.

FIG. 30 is the flow of processing of the logical volume generation process part 4600.

The trigger for starting the processing shown in FIG. 30, for example, is when the logical volume generation process part 4600 has either received a GI generation request to generate a new logical volume based on the logical volume storing the golden image from either the host 110 or the management server 130, or received a backup request to generate a backup in a new logical volume from a certain logical volume, which is an online volume. At this time, the storage controller 200 receives the identifier of the logical volume (primary volume) that will constitute the base, and also the identifier of the new logical volume (difference volume) from either the host 110 or the management server 130. These identifiers may be included in the GI generation request and the backup request.

Step 19000: The logical volume generation process part 4600 searches the empty logical volume information queue 2901 and secures empty logical volume information 2000. The generation process part 4600 sets the difference volume identifier in the logical volume ID 2001.

Step 19001: The generation process part 4600 uses the primary volume identifier to find the logical volume information 2000 of the base logical volume.

Step 19002: The generation process part 4600 copies the logical capacity 2002, the logical volume RAID group type 2003, the logical volume group type 2005, the real page pointer 2011, and the repetitive information 2012 of the primary volume logical volume information 2000 to the corresponding information of the new logical volume logical volume information 2000.

Step 19003: The generation process part 4600 judges whether or not the received requests is a GI generation request. In a case where the received request is a backup request, the generation process part 4600 jumps to Step 19008, and in a case where the received request is a GI generation request, performs Step 19004.

Step 19004: The generation process part 4600 checks whether or not the logical volume group type 2005 of the primary volume is GI volume. In the case of YES, the generation process part 4600 jumps to Step 19006.

Step 19005: The generation process part 4600 checks whether or not the primary volume logical volume group type 2005 is online volume, and the GI pointer 2008 is NULL. In a case where the conditions are not met, the logical volume generation process part 4600 jumps to Step 19011.

Step 19006: The generation process part 4600 sets the address of the primary volume logical volume information 2000 in the GI pointer 2008 of the newly acquired logical volume information. Furthermore, the generation process part 4600 makes the difference volume logical volume group type 2005 online volume. Furthermore, the generation process part 4600 makes the logical volume group type 2005 of the primary volume logical volume information 2000 GI volume (golden image).

Step 19007: The generation process part 4600 follows the GI forward pointer 2009 of the primary volume. At this time, the generation process part 4600 stores the defined GI (Golden Image) ID in group 2006. The generation process part 4600 adds the newly acquired logical volume information 2000 to the tail end of the logical volume information 2000. At this time, the generation process part 4600 updates the GI forward pointer 2009 and the GI backward pointer 2010 of the related logical volume information 2000. The generation process part 4600 sets a value that is 1 larger than the identifier set as the GI ID in group 2006 of the difference volume in this ID 2006. Thereafter, the generation process part 4600 reports normal-end to the source of the GI generation request (either the host 110 or the management server 130) and ends the processing.

Step 19008: The generation process part 4600 checks whether the primary volume logical volume group type 2005 is online volume. In the case of NO, the generation process part 4600 jumps to Step 19011.

Step 19009: The generation process part 4600 makes the logical volume group type 2005 of the newly acquired logical volume information 2000 online volume. The generation process part 4600 makes the logical volume group type of the previous logical volume information 2000 backup volume.

Step 19010: The generation process part 4600 follows the BK forward pointer 2013 of the primary volume. At this time, the generation process part 4600 stores the defined GI (Golden Image) ID in group 2006 and the BK (Backup) ID in group 2007. The generation process part 4600 adds the newly acquired logical volume information 2000 to the tail end of the logical volume information 2000 of the primary volume. At this time, the generation process part 4600 updates the BK forward pointer 2013 and the BK backward pointer 2014 of the related logical volume information 2000. The generation process part 4600 sets a value that is 1 larger than the identifier set as the BK (Backup) ID in group 2007 in the ID 2007 of the primary volume. Thereafter, the generation process part 4600 reports normal-end to the source of the backup request (either the host 110 or the management server 130) and ends the processing.

Step 19011: Since an invalid request was received, the generation process part 4600 clears the information set in the newly acquired logical volume information 2000, and returns the relevant logical volume information 2000 to the empty logical volume information queue 2901. Thereafter, the generation process part 4600 reports abnormal-end to the source of the either GI generation request or backup request (the host 110 or the management server 130) and ends the processing.

Figure 20:
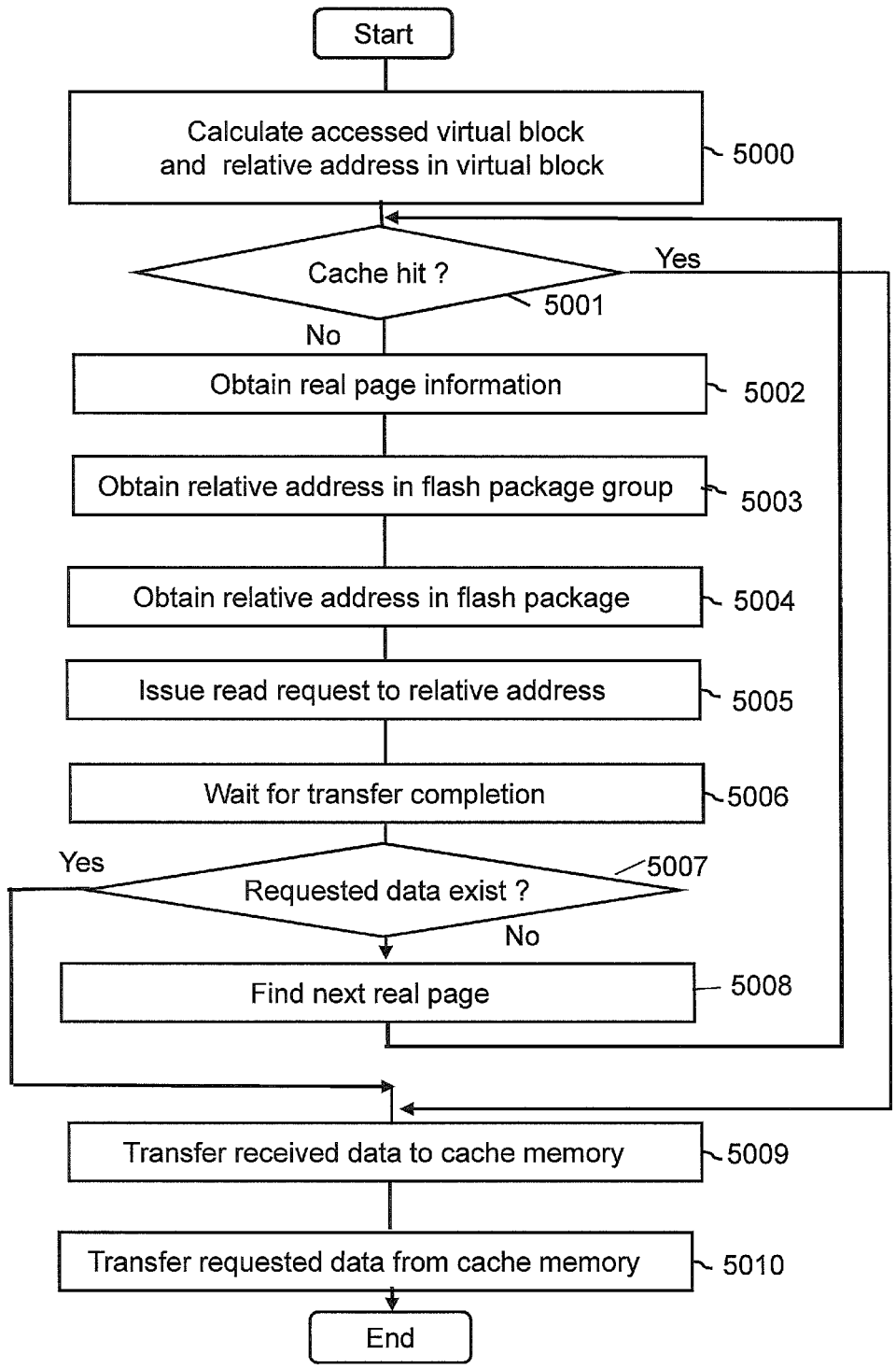
FIG. 20 is a diagram showing the flow of processing of a read process execution part in the example.

FIG. 20 is the flow of processing of the read process execution part 4000.

The read process execution part 4000 is executed when the storage controller 200 has received a read request from the host 110. In this example, it is supposed that data equivalent to one virtual segment is read. Furthermore, the present invention is also valid in a case where either a plurality of virtual segments is read or a portion of a virtual segment is read.

Step 5000: The read process execution part 4000 first finds the corresponding logical volume information 2000 based on the specified logical volume.

Step 5001: The read process execution part 4000 calculates the corresponding virtual page and the relative address inside the virtual page to be accessed based on the read-target address specified in the received read request. Next, the read process execution part 4000 checks whether the read-target data is stored in the cache memory 210. This is a well-known technology. In the case of a hit, the read process execution part 4000 jumps to Step 5009.

Step 5002: In the case of a miss, the read-target data must be loaded into the cache memory 210. In this step, first the read process execution part 4000 identifies real page information 2100 corresponding to the real page allocated to the read-target virtual page from the real page pointer 2011 of the logical block management information 2000.

Step 5003: The read process execution part 4000 obtains the flash package group 280 to which the relevant real page belongs and the first address in the flash package group 280 of the relevant real page from the package group 2101 and real page address 2102 of the identified real page information 2100.

Step 5004: The read process execution part 4000 calculates the relative address inside the real page constituting the access target of the relevant request based on the relative address in the virtual page obtained in Step 5001 and the RAID type 2302 in the package group. Based on the calculated real page relative address, the package group RAID type 2302, and the flash package pointer 2305, the read process execution part 4000 identifies which address in which flash package 230 is to be accessed. Furthermore, the read process execution part 4000 identifies the GI ID 2006 and the BK ID 2007 of the logical volume information 2000 of the specified logical volume.

Step 5005: The read process execution part 4000 issues the read request specifying the identified address to the flash package 230 identified in Step 5004. At this time, the read request includes values indicated by the identified GI ID 2006 and BK ID 2007 for identifying the generation information.

Step 5006: The read process execution part 4000 waits for the data to be sent from the flash package 230.

Step 5007: The read process execution part 4000 checks whether the requested data has been sent. For example, in this example, in the case of an area in which a large number of generation backup volumes have been generated, and, in addition, a write process does not occur, there is a likelihood of the read-target data being transferred to another real page as a result of dividing the real page. In this case, the flash package is notified that the requested data does not exist. In accordance with this, the storage controller 2200 must also issue a read request to the real page, which is storing either the data in the old generation backup volume or the data in the GI volume. In a case where the data has been sent, the read process execution part 4000 jumps to Step 5009.

Step 5007: The read process execution part 4000 searches the logical volume information 2000 to which the real page is allocated by going back along the BK backward pointer 2014 of the relevant logical block information 2000. When found, the read process execution part 4000 stores the address of the relevant logical block information 2000 and jumps to Step 5001.

Step 5008: In a case where the data is not found even after tracing the BK backward pointer back to the oldest backup volume, the read process execution part 4000 finds the logical volume information 2000 of the logical volume for which the volume type is online volume based on the BK backward pointer 2014 of the oldest volume type, finds the logical volume information 2000 storing the golden image based on the GI pointer 2008 in the information 2000 that was found, and jumps to Step 5001. Tracing back to the GI volume should enable the relevant data to be found. In a case where the GI volume has not been defined, tracing back to the oldest backup volume should enable the relevant data to be found.

Step 5009: The read process execution part 4000 stores the data that has been sent from the flash package 230 in the cache memory 210.

Step 5010: The read process execution part 4000 sends the data in the cache memory 210 specified by the relevant read request to the host 110, issues a normal-end notification to the host 110, and ends the processing.

Figure 21:
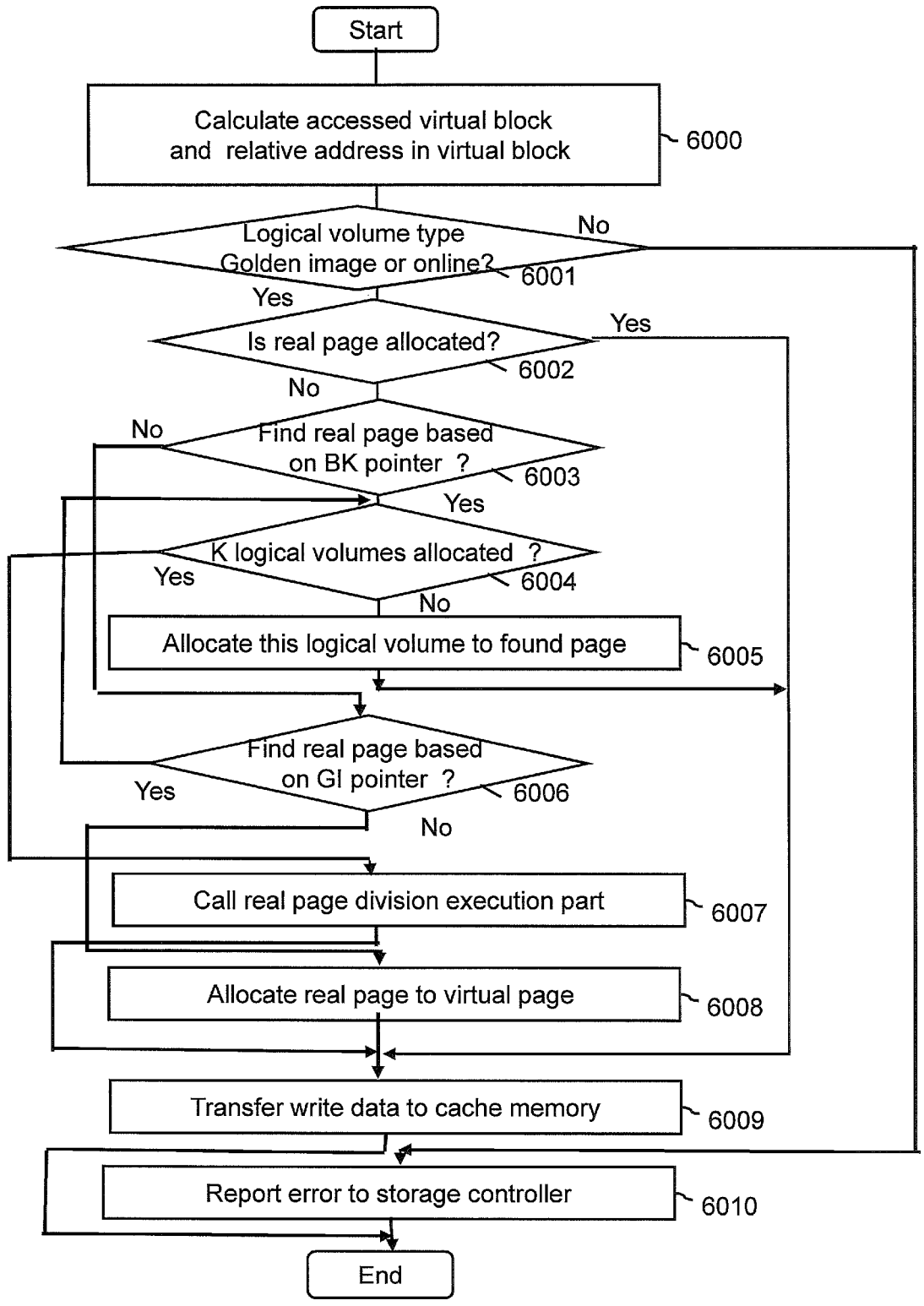
FIG. 21 is a diagram showing the flow of processing of a write request receive part in the example.

FIG. 21 is the flow of processing of the write request receive part 4100.

The write request receive part 4100 is executed when the storage controller 200 has received a write request from the host 110. In this example, it is supposed that data equivalent to one virtual segment is written. Furthermore, the present invention will be valid even in a case where either data is written to a plurality of virtual segments, or data is written to a portion of a virtual segment.

Step 6000: The write request receive part 4100 finds the logical volume information 2000 corresponding to the logical volume specified in the write request. In addition, the write request receive part 4100 calculates the corresponding virtual page and the relative address in the virtual page to be accessed based on the write-target address specified in the received write request.

Step 6001: The write request receive part 4100 checks whether the virtual volume group type 2005 of the relevant virtual volume information 2000 is either backup volume or GI volume. In this example, it is supposed that a write process with respect to either backup volume or GI volume is invalid. Furthermore, the present invention will be valid even though a write process is executed with respect to either backup volume or GI volume. In a case where the write-destination logical volume is either backup volume or GI volume, the write request receive part 4100 jumps to Step 6010.

Step 6002: The write request receive part 4100 checks whether a real page is allocated to the virtual page obtained in Step 6000 by referring to the real page pointer 2011 in the logical volume information 2000 specified by the write request. In a case where a real page has been allocated, the write request receive part 4100 jumps to Step 6009.

Step 6003: The remaining logical volume group type 2005 is online volume. The write request receive part 4100 conducts a search in a case where the GI forward pointer 2009, the GI backward pointer 2010, the BK forward pointer 2013, and the BK backward pointer 2014 of the relevant logical volume information 2000 are not NULL. First, the write request receive part 4100 searches the BK backward pointer 2014. The write request receive part 4100 finds whether there is a logical volume already allocated to a real page among the other logical volumes. In a case where such a logical volume is not found, the write request receive part 4100 jumps to Step 6006.

Step 6004: In a case where a real page-allocated logical volume is found, the write request receive part 4100 checks whether the number of logical volume information 2000 allocated to relevant real page is k. When this is the case, the write request receive part 4100 jumps to Step 6007.

Step 6005: When this is not the case, the write request receive part 4100 allocates a new logical volume to the relevant real page. First, the write request receive part 4100 copies the real page pointer 2011 that was found to the real page pointer 2011 of the relevant logical volume information 2000. The write request receive part 4100 also increases by 1 the number of logical volumes 2112 of the found real page information 2100, and sets the address of the relevant logical volume information 2000 in the logical volume information pointer 2113. Thereafter, the write request receive part 4100 jumps to Step 6009.

Step 6006: Next, the write request receive part 4100 searches the GI forward pointer 2009 and the GI backward pointer 2010. Here it is supposed that the write request receive part 4100 follows one GI backward pointer, and after that, follows one GI forward pointer. In a case where allocated real page information 2100 does not exist, the write request receive part 4100 jumps to Step 6008. In a case where the real page information 2100 is found, the write request receive part 4100 jumps to Step 6004.

Step 6007: The write request receive part 4100 calls the real page division process execution part 4300 to divide the real page. Thereafter, the write request receive part 4100 jumps to Step 6009.

Step 6008: In this step, the write request receive part 4100 allocates a real page to the corresponding virtual page. The write request receive part 4100 refers to the RAID group type 2003, the flash package group information 2300, the package group RAID type 2302, and the number of empty real pages 2304 of the logical volume information 2000 to decide which flash package group 280 real page to allocate. Thereafter, the write request receive part 4100 refers to the empty page management information pointer 2200 of the corresponding flash package group 280, and makes the relevant real page pointer 2011 point to the first real page information 2100. This allocates the real page to the virtual page. Furthermore, the write request receive part 4100 makes the empty page management information pointer 2200 point to the next real page information 2100 (the real page information 2100 pointed to by the empty page pointer 2103 in the real page information 2100 of the real page allocated to the virtual page), and, in addition, makes the empty page pointer 2103 in the real page information 2100 of the real page allocated to the virtual page NULL. The write request receive part 4100 sets 1 in the number of logical volumes 2112. The write request receive part 4100 also sets the address of the relevant logical volume information 2000 in the first of the logical volume information pointers 2113. Furthermore, the write request receive part 4100 reduces the number of the number of empty pages 2304 of the flash package group information 2300 corresponding to the relevant real page. In this example, the process for allocating a virtual page to a real page was carried out when a write request was received, but this allocation process may be executed until data is stored in the flash package 230.

Step 6009: The write request receive part 4100 stores the write data specified in this write request from the host 110 in the cache memory 210. At this time, the write request receive part 4100 assigns a GI ID in group 2006 and a BK ID in group 2007 to the write data. The write request receive part 4100 reports normal-end to the host 110 and ends the processing.

Step 6010: The write request receive part 4100 notifies the host 110 that the request is invalid. Thereafter, the write request receive part 4100 ends the processing.

Since the flash package group 280 has a RAID configuration, redundancy data sometimes must be generated with respect to the write data stored in the cache memory 210. However, this is a known method, and as such will not be explained in detail. Also, since an area for storing redundancy data is included in the real page, the virtual address inside the real page of the redundancy data corresponding to the write data is also uniquely determined. The redundancy data is also stored once in the cache memory 210. Furthermore, information showing to the address of the flash package 230 to which writing should be carried out is also attached to the redundancy data in the cache memory 210 the same as the write data. The write data and the redundancy data are written to the flash package 160 by the write after process execution part 5200, but since these data are both written to the flash package 230 as seen from the write after process execution part 5200, there is no need to distinguish between the two. Similarly, there is also no need for the flash package 230 to distinguish between the two.

Figure 22:
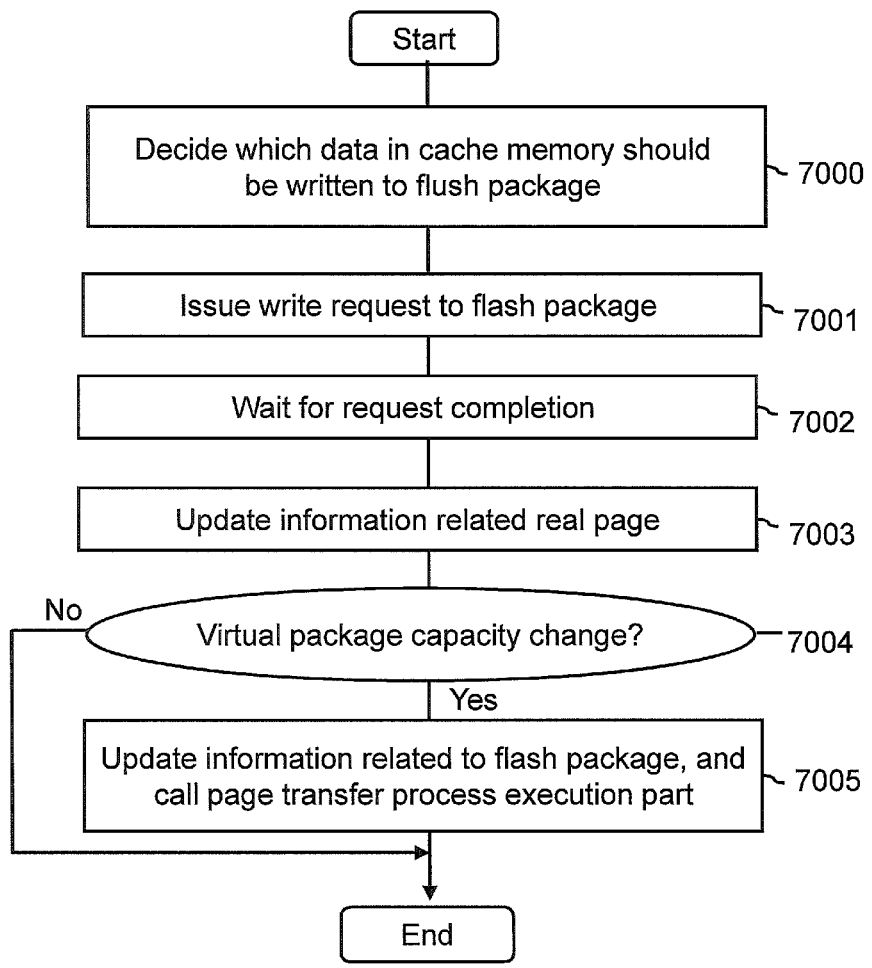
FIG. 22 is a diagram showing the flow of processing of a write after process execution part in the example.

FIG. 22 is the flow of processing of the write after process execution part 4200.

The write after process execution part 4200 is executed as needed by the processor 260. The write after process execution part 4200 executes a process for writing write data received from the host 110 and redundant data to the flash package 230. However, the write after process execution part 4200 processes both the write data and the redundant data as data to be written to the flash package 230 without distinguishing between the two. Furthermore, a GI ID in group 2006 and a BK ID in group 2007 are specified in the write request issued to the flash package 230.

Step 7000: The write after process execution part 4200 searches the cache memory 210, and decides the data to be written to the flash package 230. The write after process execution part 4200 fetches information related to the flash package 230 ID and the address to which it is to be written provided in the found data, and based on this information, specifies the address to be written to in the proper flash package 230. Furthermore, at this time the write after process execution part 4200 checks the moving state flag 2109 of the real block information 3300 corresponding to the real block to be written, and in a case where this flag 2109 is ON, cancels the execution of this write request and searches for other write data because this real page is in the moving state.

Step 7001: The write after process execution part 4200 sends the above-mentioned write request provided by the GI ID in group 2006 and the BK ID in group 2007 to the flash package 230.

Step 7002: The write after process execution part 4200 waits for a write request completion report from the flash package 230.

Step 7003: The write after process execution part 4200 checks the completion report related to the relevant write request from the flash package 230. The completion report, for example, comprises information denoting the amount of stored data (the amount of write data sent in Step 7001) and the amount of compressed and stored data (the amount of compressed write data sent in Step 7001). This information may be sent from the flash package 230 to the storage controller 200 at a different time than the completion report. The write after process execution part 4200 identifies the amount of stored data and the amount of compressed and stored data denoted in the information included in the completion report with respect to the relevant write request, adds the identified amount of stored data to the amount of stored page data 2104 corresponding to the write-destination real page, and, in addition, adds the amount of identified compressed and stored data to the amount of compressed and stored page data 2105 corresponding to the write-destination real page.

Step 7004: The write after process execution part 4200 checks to make sure there are absolutely no flash packages 230 in which the virtual capacity of the flash package 230 has changed. In a case where there are no such flash packages 230, the write after process execution part 4200 ends the processing.

Step 7005: In a case where a flash package 230 for which the virtual capacity has changed does exist, the write after process execution part 4200 configures the post-change virtual capacity in the flash package virtual capacity 2502 corresponding to the flash package 230 for which the virtual capacity has changed. Next, the write after process execution part 4200 checks whether the smallest value of the plurality of flash package virtual capacities 2502 corresponding to the plurality of flash packages 230 configuring the flash package group 280, which comprises the flash package 230 for which the virtual capacity changed, has changed. In the case of a change, the write after process execution part 4200 updates the number of real pages 2303 and the number of empty real pages 2304 corresponding to this flash package group 280 in accordance with this changed value. Furthermore, the write after process execution part 4200 transfers the real page information 2100 between the empty page information management queue and the unavailable page information management queue in accordance with this number. Thereafter, the write after process execution part 4200 calls a page transfer process (the page transfer process execution part 4500). After that, the write after process execution part 4200 ends the processing.

Figure 24:
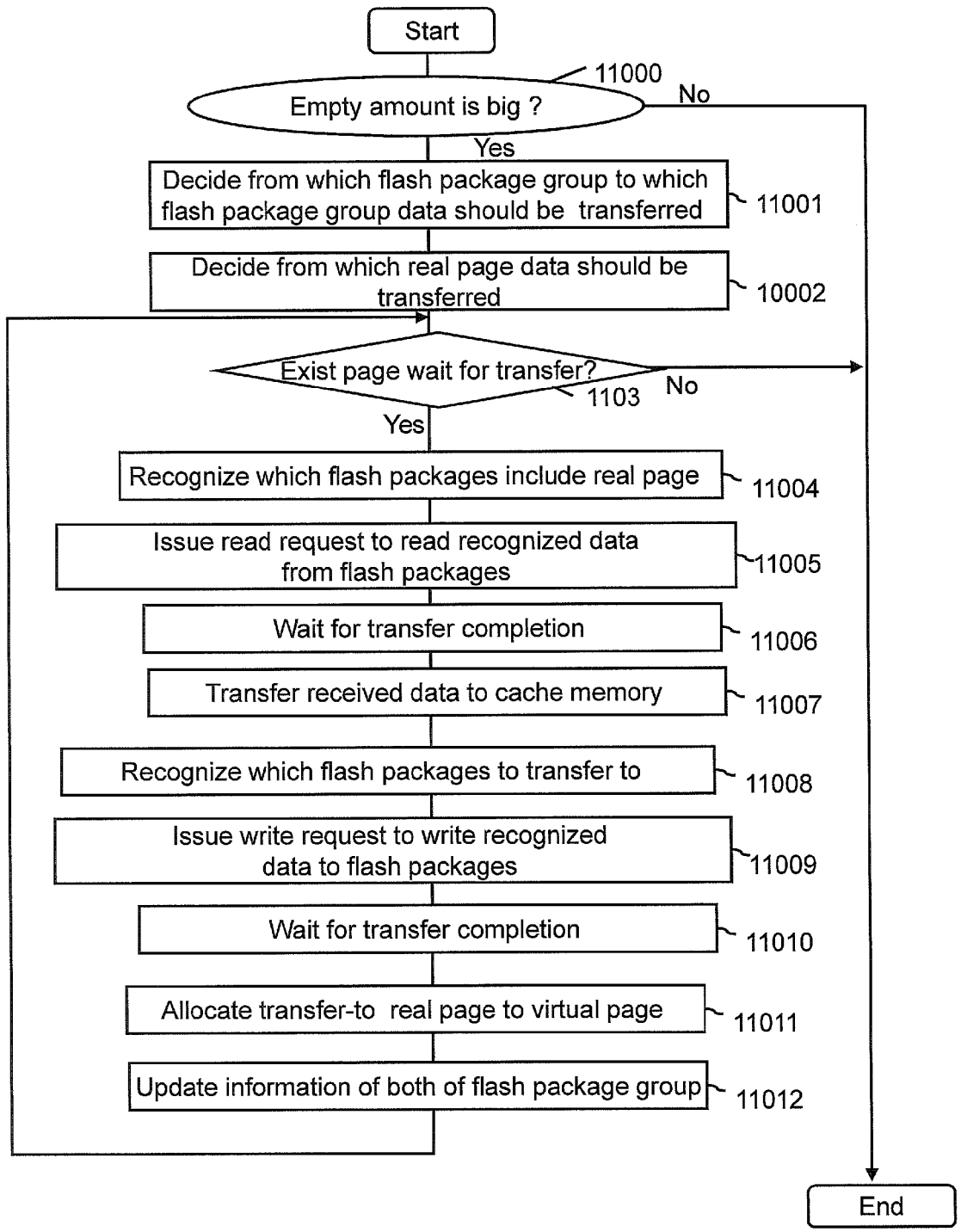
FIG. 24 is a diagram showing the flow of processing of a real page transfer process execution part in the example.

FIG. 24 is the flow of processing of the page transfer process execution part 4500.

The page transfer process execution part 4500 is called from the write after process execution part 4200 and the write same command process execution part 4300. The flash package group 280 comprising the flash package 230 in which there has been a change in the virtual capacity is specified at this time.

Step 11000: The page transfer process execution part 4500 determines whether the number of empty real pages 2304 corresponding to the specified flash package group 280 (will be called the "target group" in the explanation of FIG. 24) is not equal to or less than a prescribed threshold (that is, whether or not there is a lot of empty capacity based on the target group 280). In a case where the result of this determination is negative, the processing ends.

Step 11001: The page transfer process execution part 4500 searches the real page information 2100 corresponding to the plurality of flash packages 230 configuring the target group to find the real page information 2100 in which the value denoted by the amount of compressed and stored page data 2105 is large. A real page for which the value denoted by the amount of compressed and stored page data 2105 is large may be one or more of all the real pages based on the target group in which the value denoted by the amount of compressed and stored page data 2105 is in the top X % (where X is a value larger than 0), or may be a real page in which the value denoted by the amount of compressed and stored page data 2105 is equal to or larger than a prescribe threshold Z (where Z is a value larger than 0). The page transfer process execution part 4500 makes the real page corresponding to the discovered real page information 2100 the transfer target candidate, and turns ON the waiting state for transferring 2111 corresponding to this real page.

Step 11002: At this point, the page transfer process execution part 4500 selects the flash package group 280 that will be the transfer destination. In this example, one flash package group 280 is selected, but, it goes without saying that a plurality of flash package groups 280 may be selected as transfer destinations. In this example, for example, the page transfer process execution part 4500 selects as the transfer destination a flash package group 280 with a relatively small number of empty real pages 2104 (for example, the flash package group 280 for which the number of empty real pages 2104 is either the smallest or is less than the prescribed threshold). Next, the page transfer process execution part 4500 decides which of the real pages inside the selected transfer-destination flash package group (the "transfer-destination group" in the explanation of FIG. 24) 280 will be the transfer destination. Upon deciding the transfer-destination real page, the page transfer process execution part 4500 sets the real page information 2100 pointed to by the empty page information management pointer 2200 corresponding to the transfer-destination group 280 in the copy-destination transfer to real page pointer 2110 of the real page information 2100 of the transfer-source real page. The page transfer process execution part 4500 updates the empty page information management pointer 2200 in the page management information 2100 corresponding to the next empty real page. The above processing is executed with respect to all the real pages for which a transfer decision was made in Step 11001. A transfer-destination page is determined for each transfer-source real page in accordance with the above.

Step 11003: At this point, the page transfer process execution part 4500 decides the real page information 2100 of the real page that is to be the transfer source. Specifically, the page transfer process execution part 4500 finds the real page information 2100 for which the waiting state for transferring 2111 is ON. When the information is not found, the processing ends and the page transfer process execution part 4500 returns to the call source.

Step 11004: At this point, the page transfer process execution part 4500 computes the flash package 230 making up the real page corresponding to the discovered real page information 2100. The flash package group information 2300 showing the package group 2101 of the discovered real page information 2100 is the relevant flash package group information 2300. The flash package(s) 230 corresponding to the flash package information 2500 shown by the flash package pointer 2305 stored in this flash package group information 2300 is/are the flash package(s) 230 constituting the basis of the copy-source real page. Next, the page transfer process execution part 4500, based on the real page address 2102 inside the real page information 2100 and the block capacity 2503 of the flash package information 2500, identifies the area constituting the transfer target in each flash package 230 with respect to all of the flash packages 230.

Step 11005: The page transfer process execution part 4500 requests that each flash package 230 configuring the flash package group 280 constituting the basis of the transfer-source real page(s) transfer the data of the data-storing area of the identified areas to the cache memory 210.

Step 11006: The page transfer process execution part 4500 waits for a completion report from the flash package 230, which was the destination of the request issued in Step 11005.

Step 11007: Information as to whether or not data has been stored for each region (for each virtual segment in this embodiment) in each virtual segment is sent from the flash package 230. In a case where such data has been stored, the amount of this compressed and stored data are also sent from the flash package 230. The page transfer process execution part 4500 stores this information in the cache memory 210.

Step 11008: The page transfer process execution part 4500 at this point computes the collection of flash packages 230 configuring the flash package group 280 constituting the basis of the transfer-source real page thereof, and the collection of virtual segments in each flash package 230 to which the transfer-destination real page corresponds. In this case, the real page information 2100 shown by the transfer-destination real page address of the real page information 2100 corresponding to the transfer-source real page is the real page information 2100 corresponding to the transfer-destination real page. The process for computing, based on the real page information 2100, the collection of flash packages 230 configuring the flash package group 280, and the area of each flash package 230 constituting the transfer-destination real page has been explained in Step 11004, and as such an explanation of this process will be omitted.

Step 11009: The page transfer process execution part 4500 requests that each flash package 230 configuring the flash package group 280 to which the transfer-destination real page is allocated store the data in the specified area. The information stored in the cache memory 210 in Step 1107 (the information that was sent from the migration-source flash package 230) and data about the data-storing area(s) in the migration-source real page are sent to each flash package 230 at this time.

Step 11010: The page transfer process execution part 4500 waits for a completion report from the flash package 230, which is the destination of the request issued in Step 11009.

Step 11011: The page transfer process execution part 4500 manages the transfer-source real page as an empty real page, and, in addition, allocates the transfer-destination real page to the virtual page to which the transfer-source real page is allocated in place of this transfer-source real page. Specifically, for example, the page transfer process execution part 4500 links the real page information 2100 corresponding to the transfer-source real page to the empty page information management pointer 2200, and sets the real page pointer 2004, which had been showing the real page information 2100 corresponding to the transfer-source real page, to show the transfer-destination real page information 2100. Furthermore, the page transfer process execution part 4500 copies the amount of stored page data 2104 and the amount of compressed and stored page data 2105 in the real page information 2100 corresponding to the transfer-source real page to the real page information 2100 corresponding to the transfer-destination real page. Thereafter, the page transfer process execution part 4500 clears the moving state flag 2109, the transfer to real page pointer 2110, and the waiting state for transferring 2111 in the real page information 2100 corresponding to both the transfer-source real page and the transfer-destination real page.

Step 11012: The page transfer process execution part 4500 updates the flash package group information (hereinafter, the transfer-source group information) 2300 corresponding to the transfer-source flash package group 280, and the flash package group information (hereinafter, the transfer-destination group information) 2300 corresponding to the transfer-destination flash package group 280. Specifically, 1 is taken away from the value denoted by the number of empty real pages 2304 in the transfer-source group information 2300, and 1 is added to the value denoted by the number of empty real pages 2304 in the transfer-destination group information 2300. After this, the page transfer process execution part 4500 jumps to Step 11003 to search for the next transfer-target real page.

Figure 23:
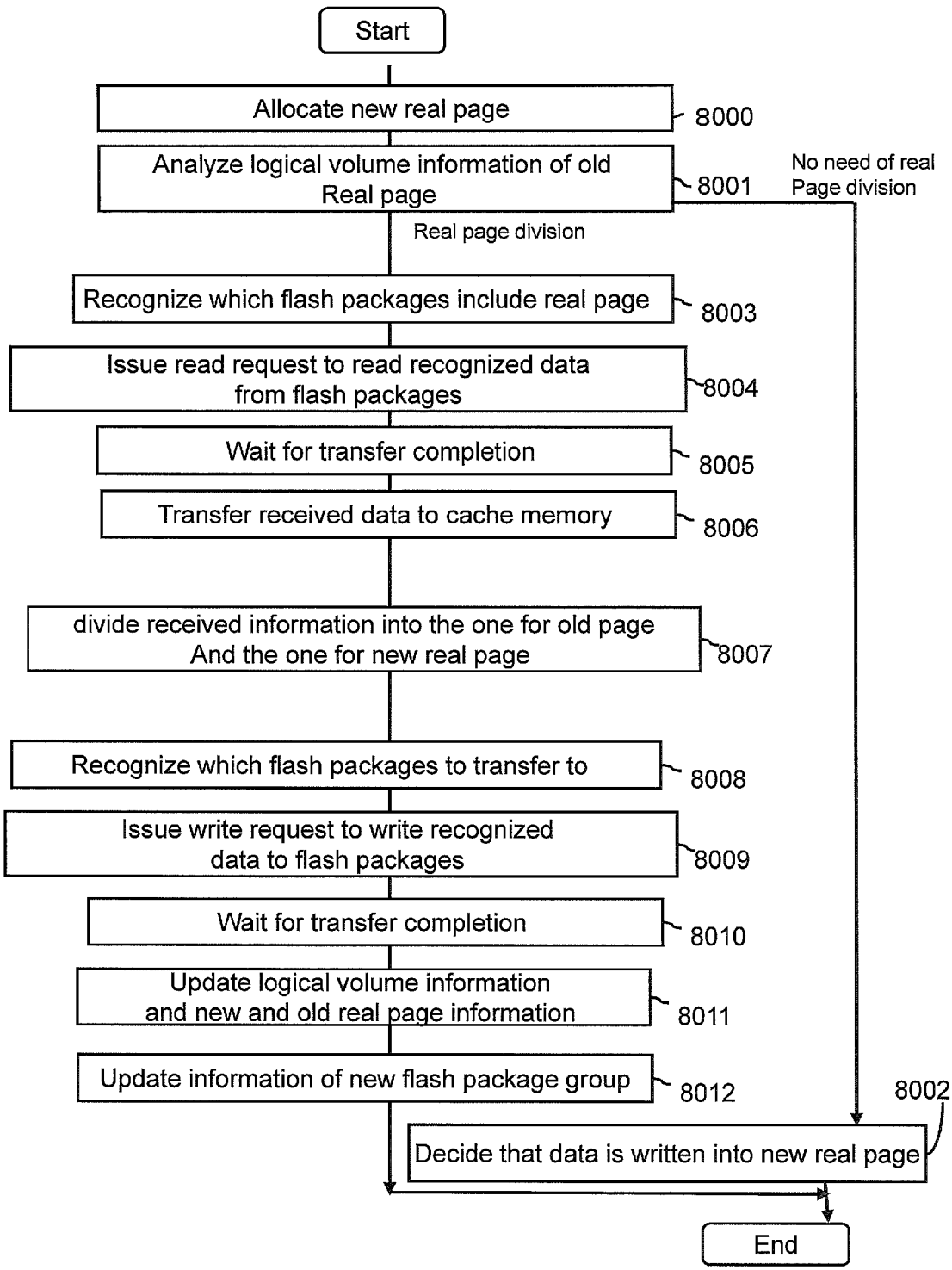
FIG. 23 is a diagram showing the flow of processing of a real page division process execution part in the example.

FIG. 23 is the flow of processing of the real page division process execution part 4300.

The real page division process execution part 4300 is called for dividing a real page when k logical volumes, which is the upper limit, have already been allocated from the write process execution part 4100 to the real page for which the write is to be carried out.

Step 8000: The real page division process execution part 4300 allocates a new real page at this point. Since this step is the processing shown in Step 6008 of FIG. 22, a detailed explanation will be omitted.

Step 8001: The real page division process execution part 4300 refers to the relevant real page information 2100 (the real page information 2100 of the real page for which the write is to be carried out), analyzes the logical volume group type 2005 of the logical volume information 2000 pointed to by the logical volume information pointer 2113 allocated to the relevant real page, and judges whether either of the following correspond.

(1) The golden image is inside a logical volume, and, in addition, a plurality of online volumes is included in the logical volume group comprising this logical volume. In this case, it is supposed that real page division is carried out in units of online volumes. In this example, the real page division process execution part 4300 arranges the GI ID in group 2006 of the online volumes in ascending order, makes the number of logical volumes allocated to each real page equal, regards the closest GI ID in group 2006 as the boundary, and in a case where there exists thereinafter an online volume that has a GI ID in group 2006, allocates the backup volume of each online volume to the real page to which these online volumes had been allocated up until now. Furthermore, the real page division process execution part 4300, in a case where there exists a GI ID in group 2006, which is larger than the GI ID in group 2006 that constitutes the boundary, allocates the backup volume of each online volume to a new real page. At this point, the real page division process execution part 4300 sorts the number of logical volumes allocated to the real page up until now and a set of these logical volumes, and the number of logical volumes allocated to the new real page and a set of these logical volumes.

(2) In this example, real page division is carried out only as described hereinabove. A logical volume constituting the target of the relevant write request is allocated to a new real page.

In this Step 8001, the real page division process execution part 4300 sorts (1) or (2), and in the case of (1) jumps to Step 8003.

Step 8002: The real page division process execution part 4300 writes the write data to the real page corresponding to the newly allocated real page information 2100, and returns to the call source.

Step 8003: The real page division process execution part 4300, in order to carry out real page division, reads all of the data from the real pages found in Step 6003 and Step 6006. This processing is the same as the processing of Step 11004 and beyond shown in FIG. 24. Step 8003 is the same processing as Step 11004. Here, a calculation is made as to which areas of the flash packages 230 configuring the flash package group 280 to which the real page is allocated constitute the real page corresponding to the relevant real page information 2100.

Step 8004: This is the same processing as Step 11005. The real page division process execution part 4300 requests that each flash package 230 configuring the flash package group 280 to which the transfer-source real page is allocated transfer the data of the data-storing virtual segment from among the specified virtual segments in the cache memory 210.

Step 8005: The real page division process execution part 4300 waits for completion reports from all the flash packages 230 that issued the request.

Step 8006: The real page division process execution part 4300 receives from the flash package 230 the data of the data-storing areas, and the following information (a) through (e) for each area corresponding to each virtual block group:

(a) the amount of this stored data;

(b) the amount of the compressed and stored data;

(c) the number of generations allocated and the generation IDs;

(d) information as to whether or not data is stored in each partial area (in this example, in virtual segment units); and (e) in a case where the information of the above-mentioned denotes that data is being stored, information showing the generation ID of this data and the post-compression data length thereof. The real page division process execution part 4300 stores this information and data in the cache memory 210.

Step 8007: The real page division process execution part 4300 sorts, from among the information stored in the cache memory 210, the information written to the new real page and the information used previously in accordance with a set of logical volumes allocated to the new division-destination page sorted in (1) of Step 12001 and a set of logical volumes allocated to the division-source real page used up to that point. In addition, the real page division process execution part 4300 calculates the values to be set in the division-destination real page, and in the amount of stored page data 2104 and the amount of compressed and stored page data 2105 in each division-source real page, and stores these values.

Step 8008: Here the real page division process execution part 4300 calculates a set of flash packages 230 configuring the flash package group 280 to which the division-source real page and the division-destination real page are allocated, and which areas of the respective flash packages 230 will become the division-source and division destination real pages. Since the processing for calculating, based on the real page information 2100, the set of flash packages 230 configuring the flash package group 280, and which areas of the respective flash packages 230 will become the division-source and division destination real pages was explained using Step 11004, an explanation of this processing will be omitted.

Step 8009: The real page division process execution part 4300 requests that the flash package 230 configuring the flash package group 280 to which the division-source real page and the division-destination real page are allocated store the data of the specified area. The information that was sent from the flash package 230, which constitutes the division source stored in the cache memory 210 in Step 12006, becomes the information to be sent to the division-source real page and the information to be sent to the division-destination real page in Step 12007, and this information is sent to the corresponding flash package 230.

Step 8010: The real page division process execution part 4300 waits for completion reports from all the flash packages 230 to which the request was issued.

Step 8011: The real page division process execution part 4300 allocates a virtual page of the logical volume, which was decided would be allocated, to the division-destination real page. This may be done such that the real page pointer 2011, which corresponds to the virtual page that corresponds to the corresponding logical volume information, points to the division-destination real page information 2100. The real page division process part 4300 also sets the values stored in Step 12007 in the amount of stored page data 2104 and the amount of compressed and stored page data 2105 of the real page information 2100 of the transfer-source. Furthermore, the real page division process execution part 4300 sets the values sorted in Step 12001 in the number of logical volumes 2112 and the logical volume information pointer 2113. The real page division process execution part 4300 also sets the values stored in Step 12007 in the amount of stored page data 2104 and the amount of compressed and stored page data 2105 of the real page information 2100 of the transfer-destination. Furthermore, the real page division process execution part 4300 sets the values sorted in Step 12001 in the number of logical volumes 2112 and the logical volume information pointer 2113.

Step 8012: The real page division process execution part 4300 updates the flash package group information 2300, which constitutes the division destination. At this point, the real page division process execution part 4300 increases by 1 the number of empty real pages 2304 of the division-destination flash package group information 2300. Thereafter, the real page division process execution part 4300 returns to the call source.

Next, the operations executed by the flash package 230 will be explained. The operations of the flash package 230 are executed by the package processor 310, and the programs executed in accordance with this processor 310 are stored in the package memory 320.

Figure 25:
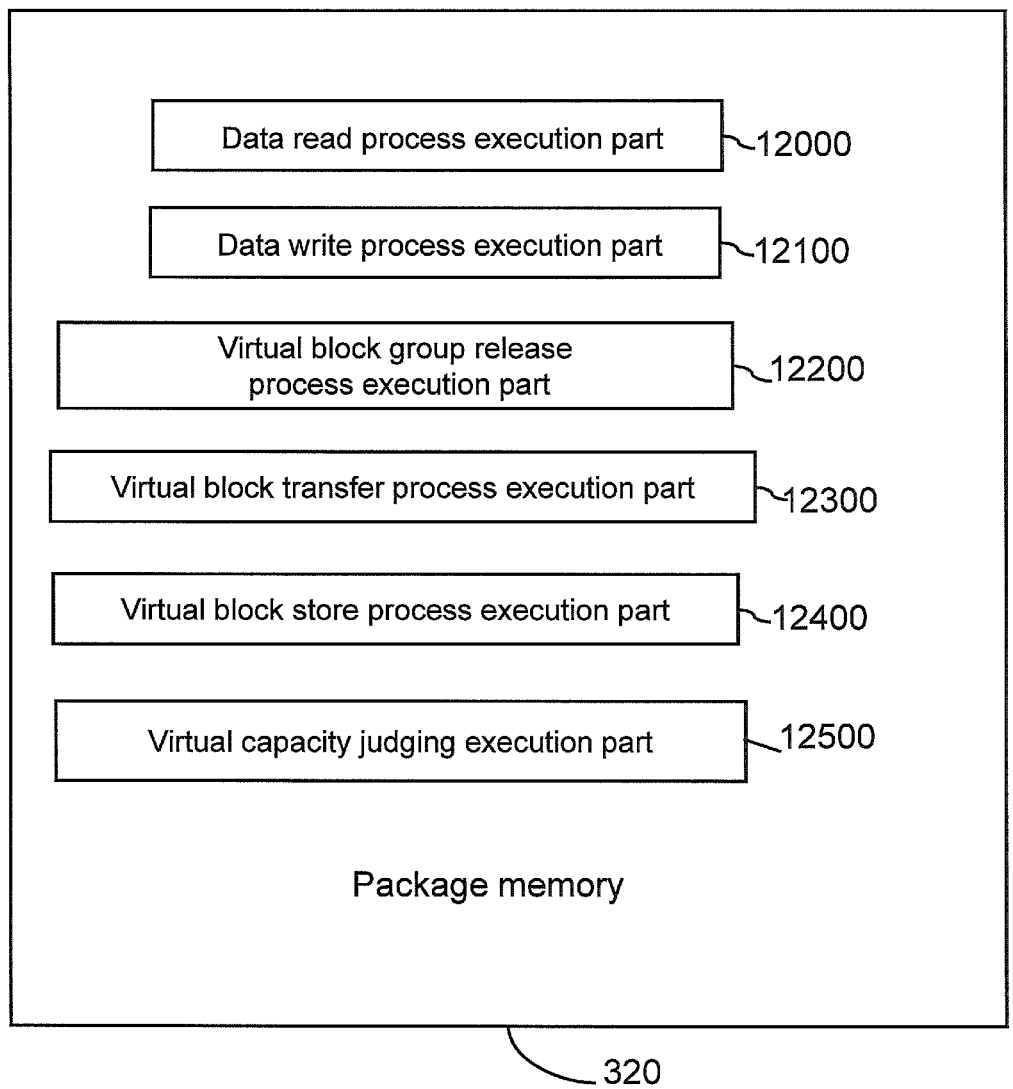
FIG. 25 is a diagram showing lower-level control programs in the package memory of the flash package in the example.

FIG. 25 shows the programs related to this example stored in the package memory 320.

Figure 26:
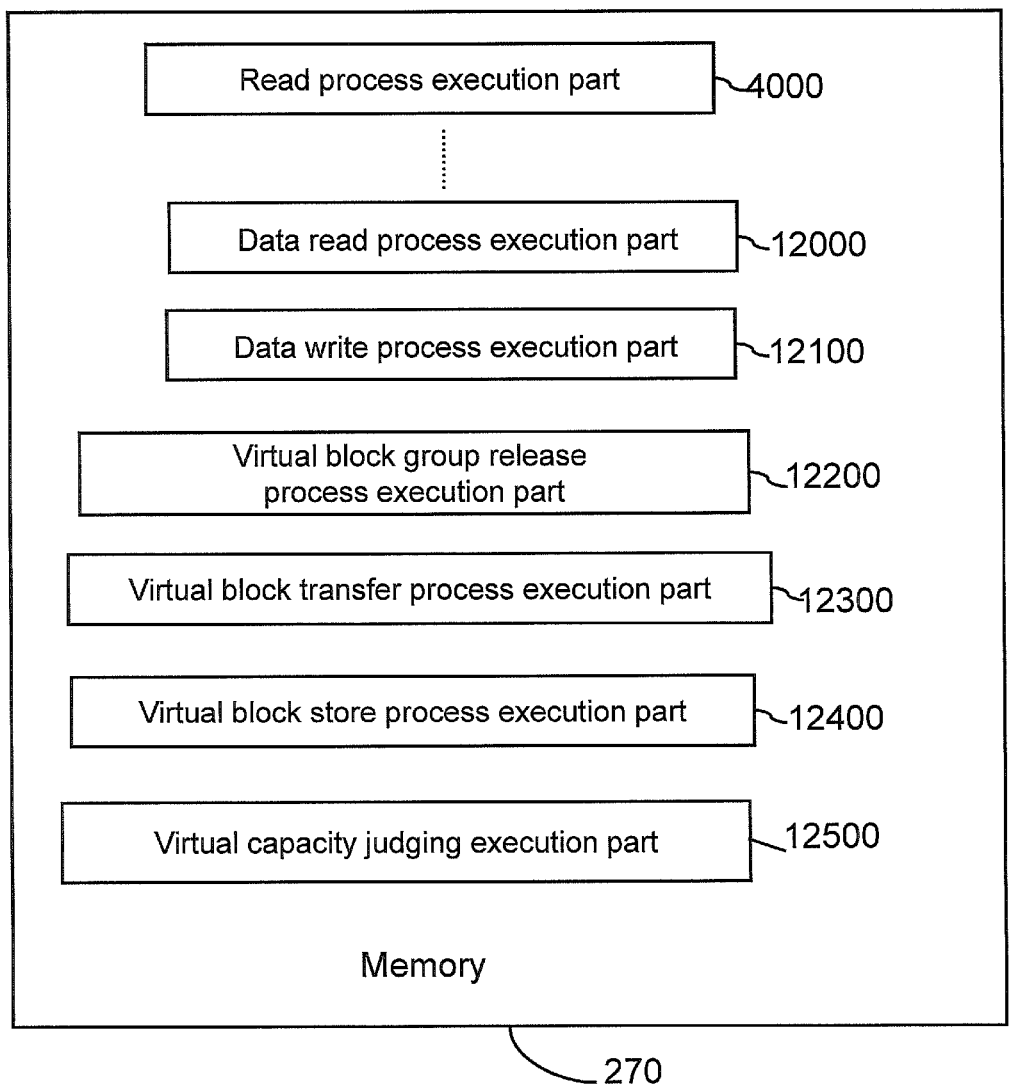
FIG. 26 is a diagram showing a configuration in which lower-level control programs have been stored in the memory of the storage controller in the example.

The programs related to this example include a data read process execution part 12000, a data write process execution part 12100, a virtual block transfer process execution part 12300, a virtual block store process execution part 12400, and a virtual capacity judging execution part 12500. At least one of these programs is for realizing the lower-level wear leveling technology and capacity virtualization technology. In this example, the flash package 230 realizes the lower-level wear leveling technology and capacity virtualization technology. However, the lower-level wear leveling technology and capacity virtualization technology may be realized by the storage controller 200. In this case, as shown in FIG. 26, substantially the same programs as the information pieces shown in FIG. 25 are stored in the common memory 220. Because the information pieces in the configuration shown in FIG. 26 are executed by the storage controller 200, these program differ slightly from the respective information pieces shown in FIG. 25. Therefore, in this example, it is supposed that the flash package 230 realizes the lower-level wear leveling technology and capacity virtualization technology, and as such, the flow of processing of the data read process execution part 12000, the data write process execution part 12100, the real block release process execution part 12200, the virtual block transfer process execution part 12300, the virtual block store process execution part 12400, and the virtual capacity judging execution part 12500 shown in FIG. 25 will be explained in detail.

Figure 27:
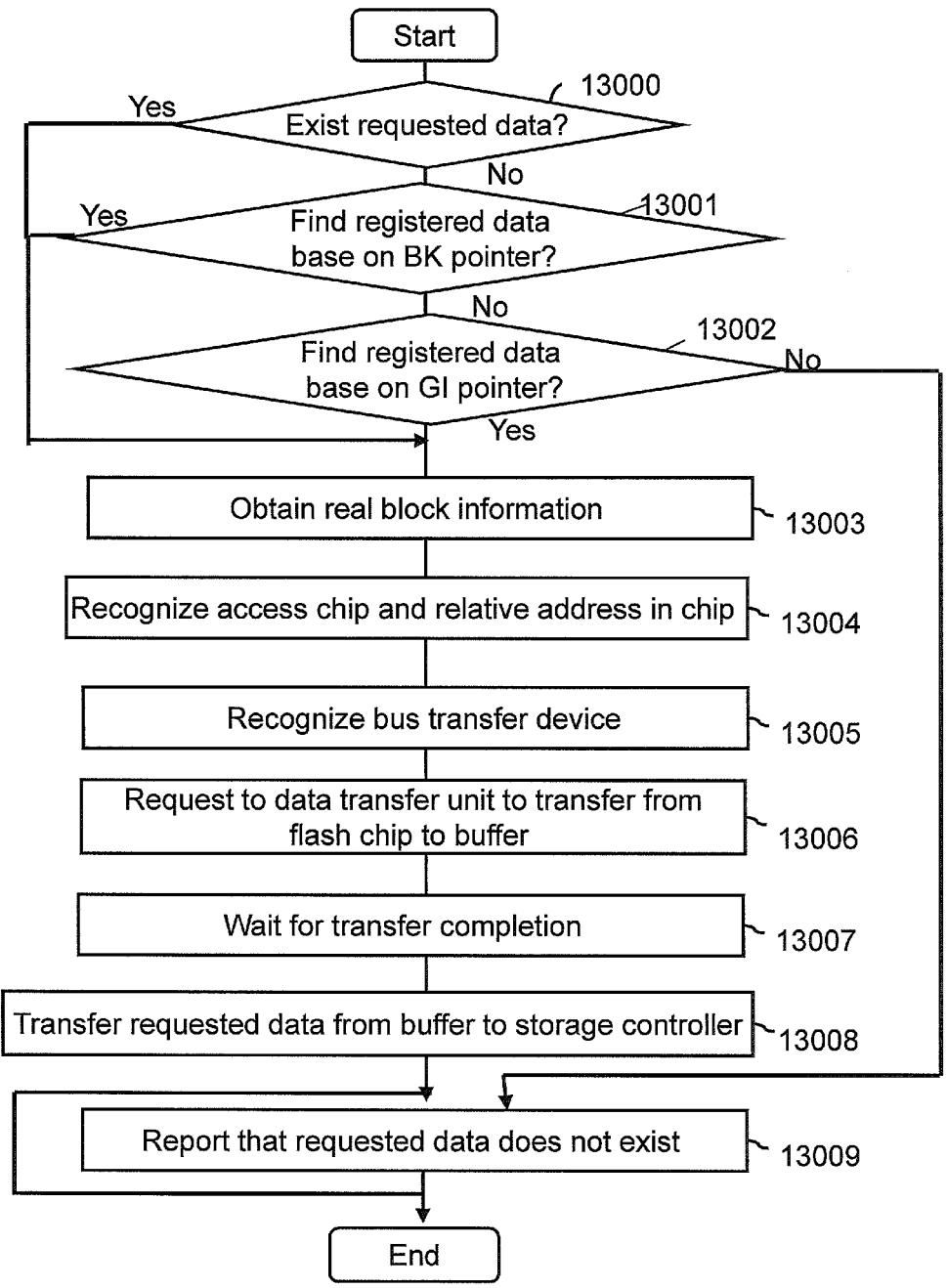
FIG. 27 is a diagram showing the flow of processing of a data read process execution part in the example.

FIG. 27 is the flow of processing of the data read process execution part 12000.

The data read process execution part 12000 is the flow of processing executed when a read request has been received from the storage controller 200. Furthermore, the flow of processing of FIG. 28 described in this example shows the flow of processing for reading data stored in one virtual segment. However, the present invention is also valid in a case where either the data of a plurality of virtual segments or the data of a portion of a virtual segment is read in accordance with a read request. Furthermore, as one of the characteristic features of this example, a GI ID 2006 and a BK ID 2007 are included in the read request to distinguish between generations.

Step 13000: The data read process execution part 12000, based on the address, which is the read target of the received read request, and the package block capacity 3005, calculates the corresponding virtual block group and the relative address inside the virtual block group to be accessed. In accordance with this, the data read process execution part 12000 recognizes the read-target virtual block information 3200. Furthermore, the data read process execution part 12000 recognizes the generation ID 3208 from the GI ID 2006 and BK ID 2007 that were received, and based on the relative address inside the virtual block and the corresponding generation virtual segment address pointer 3205, recognizes the address in the real block in which the relevant virtual segment is stored. In a case where a virtual segment is stored, the data read process execution part 12000 jumps to Step 13003.

Step 13001: In a case where a virtual segment is not stored, the data read process execution part 12000 searches the generation ID 3208 for a virtual segment of an old generation. First, the data read process execution part 12000 searches in order from the newest generation to determine whether a virtual segment having a generation ID 3208, for which the GI ID in group 2006 is the same as the received GI ID 2006 and the BK ID 2007 is an old generation, is stored in the relevant real page. In a case where such a virtual segment has been found, the data read process execution part 12000 jumps to Step 13003 in order to send this virtual segment to the storage controller 200.

Step 13002: Next, the data read process execution part 12000 checks whether there exists a logical volume having a GI ID in group 2006 of 0 and a BK ID in group 2007 of 0 (a potential golden image) in the generation ID 3208 of the relevant real page. In a case where such a logical volume does not exist, the data read process execution part 12000 jumps to Step 13009. In this case, the data read process execution part 12000 moves to the next step in order to send the corresponding virtual segment to the storage controller 200.

Step 13003: In this step, the data read process execution part 12000 identifies the real block information 3300 of the real page allocated to each read-target virtual segment based on the real block information pointer 3202 of each virtual block information 3200.

Step 13004: The data read process execution part 12000 checks the first address in the flash chip 300 from which a real block corresponding to the real block identifier 3301 of each identified real block management information 3300, is stored. Next, the data read process execution part 12000 computes the relevant address of the relevant flash chip 300 in which each virtual segment, which has been specified in the relevant read request from the relevant virtual segment address pointer 3205, is stored.

Step 13005: The data read process execution part 12000 accesses the chip information 3100 corresponding to the flash chip 300 in which the read data is stored, identifies the package bus 340 to which this flash chip 300 is coupled, and recognizes the corresponding package bus transfer device 350.

Step 13006: The data read process execution part 12000 instructs the package bus transfer device 350 recognized in Step 13003 from which address in which flash chip 300 data is to be transferred to the buffer 330. Furthermore, the data read process execution part 12000 instructs the compression extension circuit 360 to extend the data in synchronization with the data transfer.

Step 13007: Thereafter, the data read process execution part 12000 waits for the transfer to be completed.

Step 13008: The data read process execution part 12000 sends the storage controller 200-requested read data (the data that was extended in Step 13005) stored in the buffer 330 to the storage controller 200. Thereafter, the data read process execution part 12000 ends the processing.

Step 13009: The data read process execution part 12000 reports to the storage controller 200 to the effect that data was not stored in the relevant real page. Thereafter, the data read process execution part 12000 ends the processing.

Figure 28:
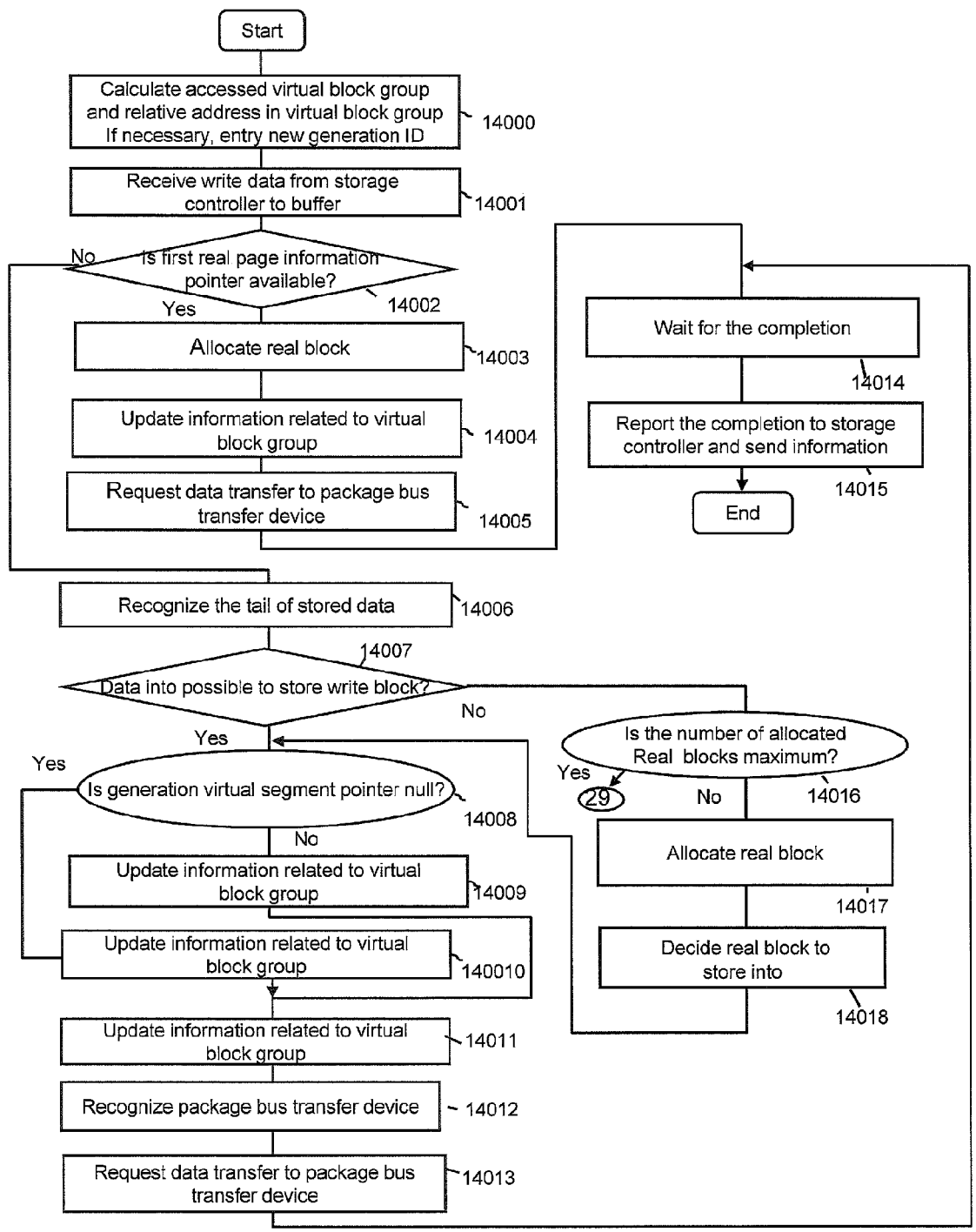
FIG. 28 is a diagram showing a portion of the flow of processing of a data write process execution part in the example.
Figure 29:
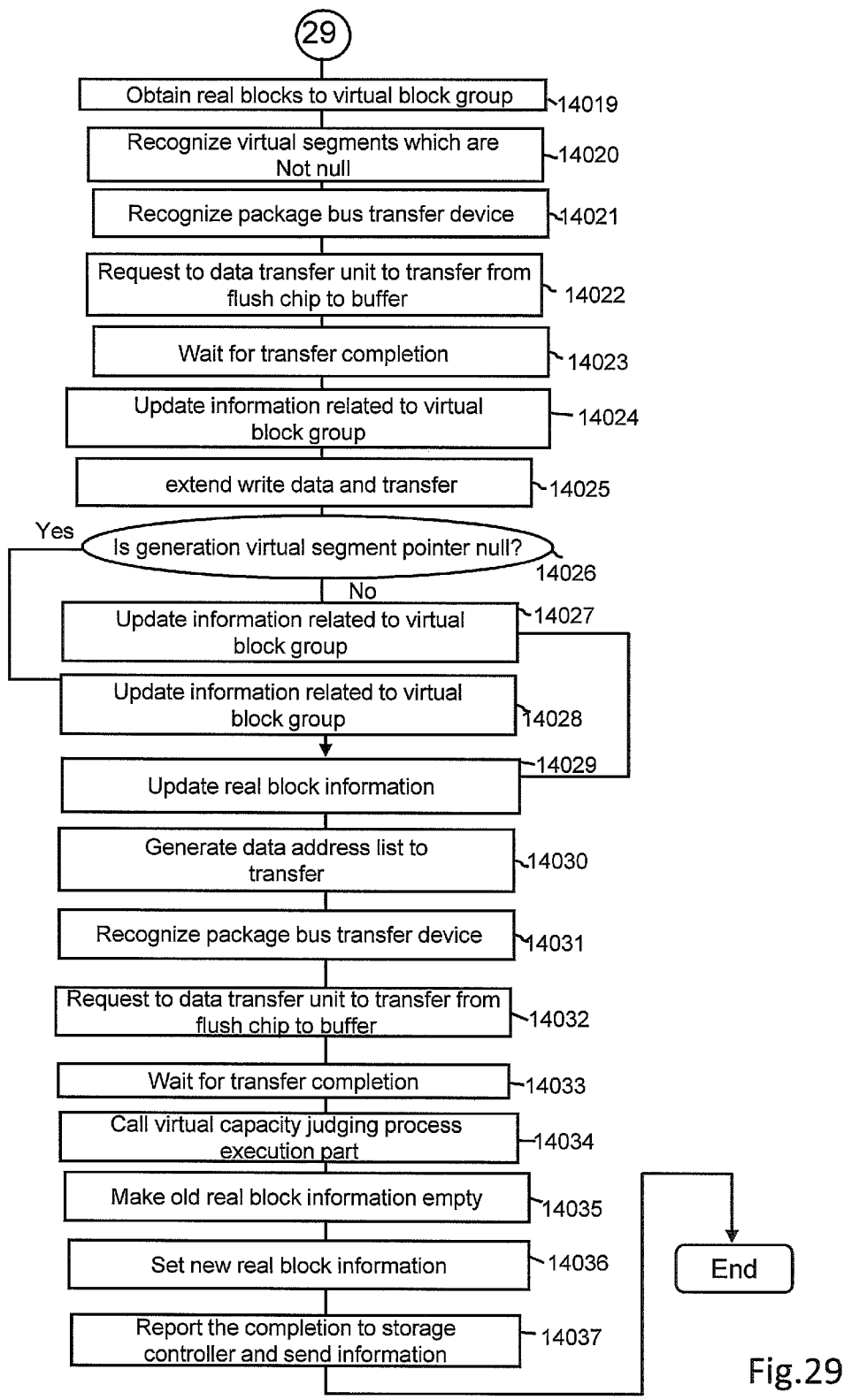
FIG. 29 is a diagram showing a portion of the flow of processing of the data write process execution part in the example.

FIGS. 28 and 29 are the flow of processing of the data write process execution part 12100.

The data write process execution part 12100 is executed when the flash package 230 has received a write request from the storage controller 200. Furthermore, the flow of processing of FIGS. 28 and 29 shown in this example depict the flow of processing for writing data that is stored in a single virtual segment. However, the present invention is also valid in a case where data either is written to a plurality of virtual segments or is written to a portion of a virtual segment in accordance with a write request. Furthermore, as one of the characteristic features of this example, a GI ID 2006 and a BK ID 2007 are included in the write request to distinguish between generations.

Step 14000: The data write process execution part 12100, based on the address, which is the write target of the received write request, and the package block capacity 3005, calculates the corresponding virtual block group and the relative address of the virtual block group to be accessed. In accordance with this, the data write process execution part 12100 recognizes the write-target virtual block information 3200. Furthermore, the data write process execution part 12100 checks whether the received GI ID 2006 and BK ID 2007 are registered in the generation ID 3208. In a case where these IDs 2006 and 2007 are registered, the write-target generation is recognized. In a case where these IDs 2006 and 2007 are not registered, the data write process execution part 12100 increases the number of generations 3207 by 1, and registers the received GI ID 2006 and BK ID 2007 in the generation ID 3208.

Step 14001: The data write process execution part 12100, based on the relative address in the virtual block group and the generation ID 3208, also recognizes the corresponding generation virtual segment, and recognizes the corresponding generation virtual segment address pointer 3205.

Step 14001: The data write process execution part 12100 stores write data specified in the write request by the host 110 in the buffer 330. Furthermore, the data write process execution part 12100 instructs the compression extension circuit 360A to carry out compression at this time. The compressed data is stored in the buffer 330.

Step 14002: The data write process execution part 12100 identifies the initial real block information pointer 3202 of the virtual block information 3200 corresponding to the write-target virtual block group. The data write process execution part 12100 performs a check to determine whether or not this value is NULL, that is, whether a real block has been allocated. In a case where a real block has been allocated, the data write process execution part 12100 jumps to Step 14005.

Step 14003: This is the step for allocating a real block, which is in an empty state, to the corresponding virtual block group. Furthermore, it is supposed here that the allocated real block is one that has been deleted and is not storing data. The data write process execution part 12100 refers to the number of empty real blocks in chip 3103 of each chip information 3100, and decides the flash chip 300 from which a real block is to be allocated. Thereafter, the data write process execution part 12100 refers to the empty real block information pointer 3400 of the corresponding flash chip 300, and makes the initial empty real block pointer 3302 of the relevant virtual block group management information point to the first real block information 3300. This results in the initial real block being allocated to the virtual block group. Furthermore, the data write process execution part 12100 makes the empty real block information pointer 3400 point to the next real block information 3300 (the real block information 3300 indicated by the empty real block pointer 3302 in the real block information 3300 of the real block allocated to the virtual block group), and, in addition, sets the empty real block pointer 3302 in the real block information 3300 of the real block allocated to the virtual block group to NULL. Furthermore, the data write process execution part 12100 decreases the number of the number of empty real blocks in chip 3103 of the chip information 3100 corresponding to the relevant real block.

Step 14004: In addition, the data write process execution part 12100 sets the identifier and first address, which is the real block, in the generation virtual segment address pointer corresponding to virtual segment of the relevant generation. The data write process execution part 12100 sets the value denoted by the compression extension circuit in the amount of generation compressed virtual segment data 3206. The data write process execution part 12100 also sets a value that is the same as this value in the amount of generation compressed and stored data 3204. In addition, the data write process execution part 12100 adds the same value as mentioned hereinabove to the amount of compressed and stored package data 3007. In addition, the data write process execution part 12100 sets the capacity of the virtual segment of the write-target generation in the amount of stored data 3203. The data write process execution part 12100 also adds the same value as the value denoting this capacity to the amount of stored package data 3006. Furthermore, the data write process execution part 12100 stores the amount of received write data and the post-compression data length as values to be returned to the storage controller 200.

Step 14005: The data write process execution part 12100 instructs the package bus transfer device 350 to which address of which flash chip 300 the data from the buffer 330 is to be written. Thereafter, the data write process execution part 12100 jumps to Step 14014.

Step 14006: The data write process execution part 12100 refers to the real block identifier 3301 of the real block information 3300 shown by the last real block information pointer 3202 of the virtual block information 3200, and identifies the first address of the flash chip 300 from which the corresponding real block is stored.

Step 14007: The data write process execution part 12100, based on the empty capacity in real block 3304 of the real block information 3300 corresponding to write-target real block and the length of write data stored in the buffer 330, checks whether the received data can be written to an empty area of this real block. In a case where such a write is not possible, the data write process execution part 12100 jumps to Step 14016.

Step 14008: The data write process execution part 12100 checks whether the generation virtual segment address pointer 3205 of the relevant generation virtual segment is NULL. When this is the case, the data write process execution part 12100 jumps to Step 14010.

Step 14009: When this is not the case, the data write process execution part 12100 adds a value obtained by subtracting the amount of generation compressed virtual segment data 3206 from the value denoted by the relevant compression extension circuit 360 to the amount of compressed and stored data 3204. In addition, the data write process execution part 12100 adds the same value as this value to the amount of compressed and stored package data 3007. Thereafter, the data write process execution part 12100 sets the value denoted by the compression extension circuit 360 in the amount of generation compressed virtual segment data 3206. The data write process execution part 12100 also stores a 0 with respect to the amount of data written this time, and the value that was added to the amount of generation compressed virtual segment data 3206 with respect to the post-compression data as values to be returned to the storage controller 200. Thereafter, the data write process execution part 12100 jumps to Step 14011.

Step 14010: In a case where the pointer 3205 is NULL, the data write process execution part 12100 adds the value denoted by the relevant compression extension circuit 360 to the amount of compressed and stored data 3204. In addition, the data write process execution part 12100 adds the same value as this value to the amount of compressed and stored package data 3007. Thereafter, the data write process execution part 12100 sets the value denoted by the compression extension circuit in the amount of generation compressed virtual segment data 3206. In addition, the data write process execution part 12100 adds the pre-compression value to the amount of stored data 3203, and adds the same value as the post-addition value to the amount of stored package data 3006. The data write process execution part 12100 also stores the amount of pre-compression data received from the storage controller 200 and the value denoted by the compression extension circuit with respect to the post-compression data as values to be returned to the storage controller 200.

Step 14011: The data write process execution part 12100 deletes only the amount of write data received this time (the post-compression value) from the empty capacity in real block 3304. The data write process execution part 12100 sets the last real block information pointer 3202 of the relevant virtual block information 3200 and the relative address transferred this time in the generation virtual segment address pointer 3205 corresponding to the relevant generation virtual segment.

Step 14012: The data write process execution part 12100 accesses the chip information 3100 corresponding to the flash chip 300, which is to store the write data, identifies the package bus 340 to which this flash chip 300 is coupled, and recognizes the corresponding package bus transfer device 350.

Step 14013: The data write process execution part 12100 instructs the package bus transfer device 350 that was recognized in Step 14007 as to which address in which flash chip 300 the write data is to be written from the buffer 330.

Step 14014: Thereafter, the data write process execution part 12100 waits for the write to be completed.

Step 14015: The data write process execution part 12100 reports to the storage controller 200 that the write request has been completed and ends the processing. Furthermore, the data write process execution part 12100 reports the amount of pre-compression write data and the amount of post-compression data to the storage controller 200 at this time. This report may be included in the write request completion report.

Step 14016: This step is executed in a case where the length of the write data is larger than the empty area of the write-target real block. In this step, the data write process execution part 12100 does not allocate a real block in a case where min(k, L(<1)*number of generations 3207*(m+1) real blocks have been allocated to the relevant virtual block group. In this case, the data write process execution part 12100 jumps to Step 14019 shown in FIG. 29.

Step 14017: This step is for allocating a real block, which is in an empty state, to the corresponding virtual block group. Furthermore, it is supposed here that the allocated real block is one that has been deleted and is not storing data. The data write process execution part 12100 refers to the number of empty real blocks in chip 3103 of each chip information 3100, and decides the flash chip 300 from which a real block is to be allocated. Thereafter, the data write process execution part 12100 refers to the empty real block management information pointer 3400 of the corresponding flash chip 300, and makes the empty real block pointer 3302, which is the first NULL value in the relevant virtual block group management information, point to the first real block information 3300.

This results in a new real block being allocated to the virtual block group. Furthermore, the data write process execution part 12100 makes the empty real block management information pointer 3400 point to the next real block information 3300 (the real block information 3300 indicated by the empty real block pointer 3302 in the real block information 3300 of the real block allocated to the virtual block group), and, in addition, sets the empty real block pointer 3302 in the real block information 3300 of the real block allocated to the virtual block group to NULL. Furthermore, the data write process execution part 12100 decreases the number of the number of empty real blocks in chip 3103 of the chip information 3100 corresponding to the relevant real block.

Step 14018: The data write process execution part 12100 decides the address of the flash chip 300 in which to store the data by referring to the real block information 3300 denoted by the real block information pointer 3202 newly allocated to the relevant virtual block information 3200, and the real block identifier 3301 of the real block information 3300 denoted by the immediately previous real block information pointer 3202. Thereafter, the data write process execution part 12100 jumps to Step 14008.

Step 14019: In this step, the data write process execution part 12100 allocates a different real block to the relevant virtual block group. The reason for allocating a different real block is to reduce the bias of the number of real block deletions. This process is called the wear leveling process. The number of real blocks to be allocated at this time, for example, is determined based on a value obtained by adding the value shown by the compression extension circuit 360 to the amount of generation compressed and stored data 3206. In this step, the data write process execution part 12100 calls a wear leveling process execution part and determines the real block by using the number of real blocks required as the input value. The data write process execution part 12100 receives real block information 3300 address(es) of real block(s) for storing write data proportional to a number equivalent to the input value from the wear leveling process execution part. It is supposed that this real block has been subjected to delete processing and is in a state in which data can be written directly. Furthermore, in this example, since it is supposed that the wear leveling process execution part, for example, is premised on known technology like that of Patent Literature 1, this execution part will not be explained in particular detail here.

Step 14020: Here, the data write process execution part 12100 extends all of the virtual segments of all of the generations in the relevant virtual block group one time, and reads these virtual segments to the buffer. For this reason, the amount of generation compressed virtual segment data 3206 corresponding to the generation virtual segment address pointer 3205 is referred to even in the case of a NULL value. The data write process execution part 12100, based on this values and the real block information 3300, generates an address list showing in virtual segment address order what length is to be transferred to the buffer from which address of which flash chip 300.

Step 14021: The data write process execution part 12100 identifies the package bus 340 to which the relevant flash chip 300 is coupled and recognizes the corresponding package bus transfer device 350 by accessing the chip information 3100 corresponding to the flash chip 300 recognized in Step 14020.

Step 14022: The data write process execution part 12100 instructs the package bus transfer device 350 recognized in Step 14020 from which address of which flash chip 300 data is to be read to the buffer 330 in accordance with the instructional information that was generated in Step 14020. Furthermore, the data write process execution part 12100 instructs the compression extension circuit 360 to extend the data.

Step 14023: Thereafter, the data write process execution part 12100 waits for the read to the buffer 330 to be completed.

Step 14024: The data write process execution part 12100 updates all of the generation virtual segment address pointers 3205 (called the valid generation virtual segment address pointers 3205 hereinafter) for which a NULL value is not stored in the relevant virtual block information 3200. The data write process execution part 12100 sets the block address in the initial valid generation virtual segment address pointer 3205, and the first address thereof in the address of the initially allocated real block and the relative address. The data write process execution part 12100, as the next valid generation virtual segment address pointer 3205 basically sets the block address of the previous valid generation virtual segment address pointer 3205 in the block address, and as the relative address, sets a value obtained by adding the value of the previous valid amount of generation compressed virtual segment data 3206. In a case where the relative address exceeds the real page capacity, the data write process execution part 12100 sets a value obtained by subtracting the real page capacity from this value as the relative address, and sets the address of the real page allocated next as the page address. The data write process execution part 12100, after setting the value of the last valid generation virtual segment address pointer 3205, adds the value of the corresponding amount of generation compressed virtual segment data 3206 to the value of this relative address. In a case where this post-addition value does not exceed the real page capacity, the data write process execution part 12100 sets a value obtained by subtracting this calculated value from the real page capacity in the empty capacity in real block 3304 of the real block information 3300 corresponding to the block address of the last valid generation virtual segment address pointer 3205, and, additionally, sets the address of the relevant real block in the block address with respect to the generation virtual segment address pointer 3205 corresponding to this relevant write request. In addition, in a case where this calculated value exceeds the real page capacity, the data write process execution part 12100 sets a value obtained by subtracting this calculated value from two times the value of the real page capacity in the empty capacity in real block 3304 of the real block information 3300 pointed to by the last real page address information pointer.

Step 14025: The data write process execution part 12100 extends and transfers the write data received from the storage controller 200 to the area subsequent to the transferred data, in Step 14023.

Step 14026: The data write process execution part 12100 judges whether or not the generation virtual segment address pointer 3205 of the relevant generation virtual segment is NULL. When this is the case, the data write process execution part 12100 jumps to Step 14028.

Step 14027: When this is not the case, the data write process execution part 12100 adds a value obtained by subtracting the amount of generation compressed virtual segment data 3206 from the value denoted by the compression extension circuit 360 used at the time of the transfer from the storage controller 200 to the amount of compressed and stored data 3204. In addition, the data write process execution part 12100 adds the same value as this post-subtraction value to the amount of compressed and stored package data 3007. Thereafter, the data write process execution part 12100 adds the value denoted by the compression extension circuit 360 to the amount of generation compressed virtual segment data

3206. The data write process execution part 12100 also respectively stores a 0 with respect to the amount of write data written this time and the value added to the amount of generation compressed virtual segment data 3206 with respect to the amount of post-compression data as the values to be returned to the storage controller 200. Thereafter, the data write process execution part 12100 jumps to Step 14029.

Step 14028: When this is the case, the data write process execution part 12100 adds the value denoted by the compression extension circuit 360 used at the time of the transfer from the storage controller 200 to the amount of compressed and stored data 3204. In addition, the data write process execution part 12100 adds the same value as this post-addition value to the amount of compressed and stored package data 3007. Thereafter, the data write process execution part 12100 sets the value denoted by the compression extension circuit 360 in the amount of generation compressed virtual segment data 3206. In addition, the data write process execution part 12100 adds the pre-compression value to the amount of stored data 3203, and adds the same value as this post-addition value to the amount of stored package data 3006. The data write process execution part 12100 also respectively stores the amount of pre-compression data received from the storage controller 200 with respect to the amount of write data written this time and the value denoted by the compression extension circuit with respect to the amount of post-compression data as the values to be returned to the storage controller 200.

Step 14029: The data write process execution part 12100 makes the value obtained by adding the value of the corresponding amount of compressed virtual segment data 3206 to the value of this relative address the calculated value in the value of the last valid generation virtual segment address pointer 3205. The data write process execution part 12100, in a case where this calculated value does not exceed the real block capacity, sets the address of the real block denoted by the last valid generation virtual segment address pointer 3205 in the block address with respect to the generation virtual segment address pointer 3205 corresponding to the relevant write request, and sets this calculated value as the relative address. In addition, in a case where this calculated value does not exceed the real block capacity, the data write process execution part 12100 sets a value obtained by subtracting this calculated value from the real block capacity in the empty capacity in real block 3304 of the last real block information 3300. In addition, in a case where this calculated value does exceed the real block capacity, the data write process execution part 12100 sets a value obtained by subtracting this calculated value from two times the value of the real block capacity in the empty capacity in real block 3304 of the last real block information 3300.

Step 14030: Next, the data write process execution part 12100 refers to the real block identifier 3301 of the real block information 3300 corresponding to the newly allocated real block, recognizes from which address of which flash chip 300 this real page has been stored, and generates an address list for instructing transfer.

Step 14031: The data write process execution part 12100 accesses the chip information 3100 corresponding to the write data-storing flash chip 300 recognized in Step 14017, identifies the package bus 340 to which this flash chip 300 is coupled, and recognizes the corresponding package bus transfer device 350.

Step 14032: The data write process execution part 12100 instructs the package bus transfer device 350 recognized in Step 14018 as to which address of which flash chip 300 the data from the buffer 330 is to be written. The data write process execution part 12100 instructs the compression extension circuit 360 to perform compression at this time.

Step 14033: Thereafter, the data write process execution part 12100 waits for the write from the buffer 330 to be completed.

Step 14034: Thereafter, the data write process execution part 12100 calls the virtual capacity judging process execution part 12500 to check whether it is necessary to change the virtual capacity of the relevant package.

Step 14035: This step is for converting the originally allocated real block to an empty state. First of all, the data write process execution part 12100 carries out delete processing for all the originally allocated real blocks. When this processing is complete, next the data write process execution part 12100 sets the address of the real block information 3300 denoted by the empty real block information pointer 3400 in the empty real block pointer 3302 corresponding to the originally allocated real block, and sets the address of the real block information 3300 corresponding to the originally allocated real block denoted in the empty real block information pointer 3400. Furthermore, the data write process execution part 12100 sets the real block information pointer 3202 of the corresponding virtual block information 3200 to NULL. The data write process execution part 12100 repeats this processing by the number of real blocks allocated to the relevant virtual block group.

Step 14036: This step is a process for allocating a newly allocated number of real blocks to the virtual block group. Specifically, for example, the data write process execution part 12100 makes the real block information pointers 3202 of the corresponding number of virtual block information 3200 point only to the real block information 3300 of the newly allocated real block.

Step 14037: The data write process execution part 12100 reports to the storage controller 200 that the write request has ended. Furthermore, in a case where the virtual capacity of the relevant flash package 230 has changed, the data write process execution part 12100 reports the new virtual capacity to the storage controller 200. The data write process execution part 12100 also reports the pre-compression value and post-compression value of the write data.

Figure 31:
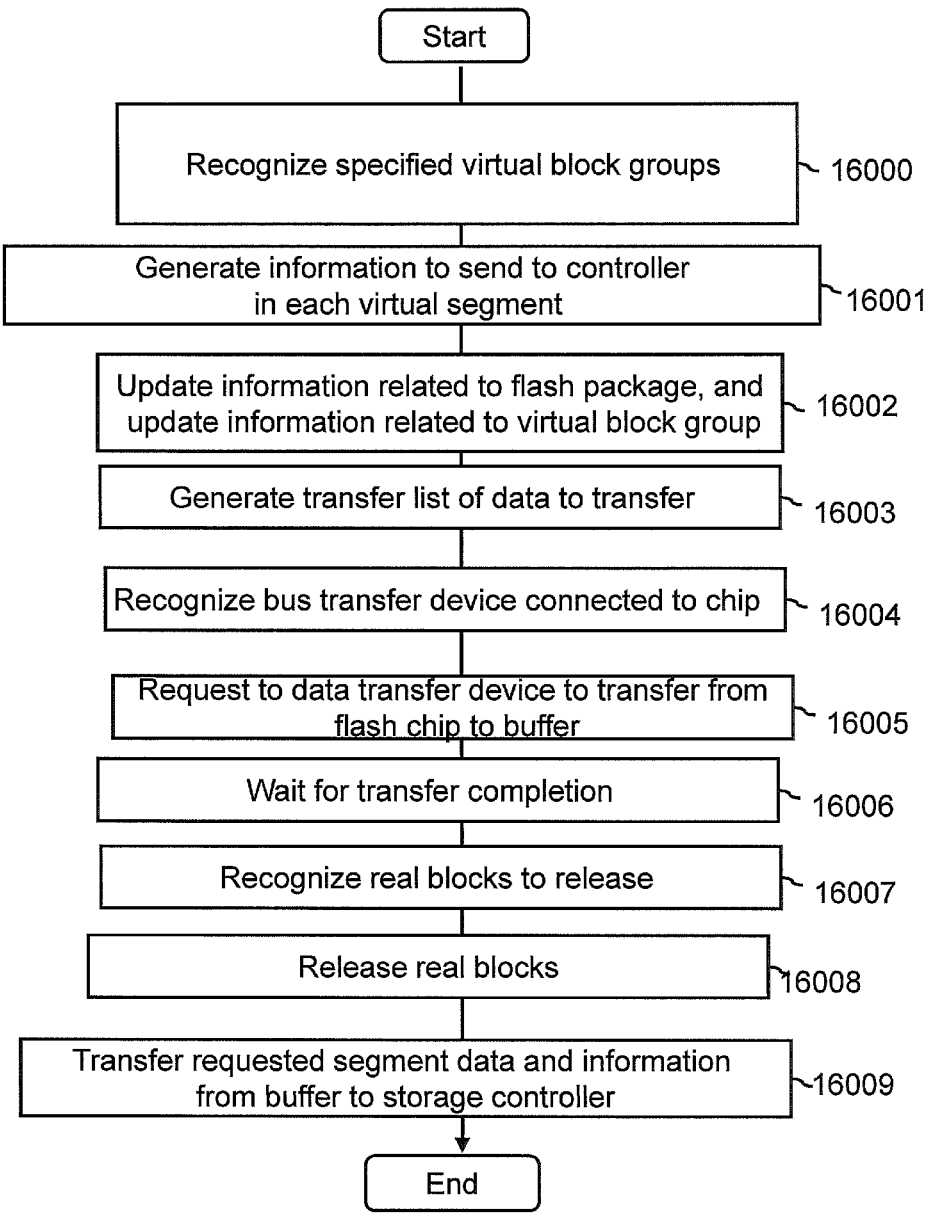
FIG. 31 is a diagram showing the flow of processing of a virtual block transfer process execution part in the example.

FIG. 31 is the flow of processing of the virtual block transfer process execution part 12300.

The virtual block transfer process execution part 12300 is executed when the flash package 230 receives a request to transfer data stored in a collection of specified virtual segments (a virtual block transfer request) from the storage controller 200. Furthermore, since the request is in real page units, it is supposed here that the request is not for the transfer of a portion of the segments of the virtual block group.

Step 16000: The virtual block transfer process execution part 12300 computes a collection of virtual block groups specified by a virtual block transfer request.

Step 16001: The virtual block transfer process execution part 12300 stores with respect to all specified virtual block groups the amount of stored data 3203, the amount of compressed and stored data 3204, the number of generations 3207, and the generation ID 3208 as information to be returned to the storage controller 200. In addition, the virtual block transfer process execution part 12300 refers to the generation ID 3208, refers to the corresponding generation virtual segment address pointer 3205 for all the generation virtual segments of each virtual block group, and sets as values to be returned to the storage controller 200 the following information:

(a) information showing whether data is not being stored (NULL) or data is being stored; and (b) in a case where the information of the above-mentioned (a) is information denoting that data is being stored, information that shows which generation of data, and information stored in the amount of generation compressed virtual segment data 3206.

Step 16002: The virtual block transfer process execution part 12300 sets the amount of stored data 3203 and the amount of compressed and stored data 3204 of each virtual block group for all the virtual block groups specified as the values to be returned to the storage controller 200. Furthermore, the virtual block transfer process execution part 12300 finds the respective total values of the amount of stored data 3203 and the amount of compressed and stored data 3204 of these virtual block groups, and sets the respective total values as the values to be returned to the storage controller 200. In addition, the virtual block transfer process execution part 12300 subtracts the respective total values from the amount of stored package data 3006 and the amount of compressed and stored package data 3007. Thereafter, the virtual block transfer process execution part 12300 clears the amount of stored data 3203, the amount of compressed and stored data 3204, all the virtual segment address pointers 3205, and the amount of compressed virtual segment data 3206.

Step 16003: The virtual block transfer process execution part 12300, based on the virtual segment address pointers 3205 and corresponding amounts of compressed virtual segment data 3206, which show that the virtual segment address pointers 3205 of all the virtual segments specified are not null (showing to store data), creates an information list showing the addresses in which are stored data, which is stored inside the relevant virtual block groups and is to be sent to the storage controller 200, and the transfer lengths thereof.

Step 16004: The virtual block transfer process execution part 12300 accesses the chip information 3100 corresponding to the flash chip 300 in which the real block allocated to the specified virtual segment is stored, identifies the package bus 340 to which the relevant flash chip 300 is coupled, and identifies the corresponding bus transfer device 350.

Step 16005: The virtual block transfer process execution part 12300 instructs the bus transfer device 350 identified in Step 16004 to transfer the data to the buffer 330 from the addresses in accordance with the information list created in Step 16004. The virtual block transfer process execution part 12300 instructs the compression extension circuit 360B to extend the data at this time.

Step 16006: The virtual block transfer process execution part 12300 waits for the transfer to be completed.

Step 16007: The virtual block transfer process execution part 12300 carries out release processing for real blocks corresponding to the real block information 3300 indicated by the real block information pointer 3202 of the virtual block information 3200, which corresponds to all the relevant virtual block groups. Thus, the virtual block transfer process execution part 12300 releases the real block identifiers 3301 of all the relevant real block information 3300, and judges to which address of which flash chip 300 the released real block is being belonged.

Step 16008: This step is for converting all the real blocks allocated to all the relevant virtual block groups to the empty state. Since the contents of the processing are exactly the same as those of Step 14035 on FIG. 29, an explanation will be omitted here. However, the processing of Step 14035 is targeted at a single virtual block group, but here the processing of Step 14035 is executed in accordance with the number of relevant virtual block groups.

Step 16009: The virtual block transfer process execution part 12300 sends the data stored in the buffer 330 to the storage controller 200. First, the virtual block transfer process execution part 12300 stores, with respect to all the specified virtual block groups, the amount of stored data 3204, the amount of compressed and stored data 3205, the number of generations 3207, and the generation ID 3208 as information to be returned to the storage controller 200. In addition, the virtual block transfer process execution part 12300 refers to the generation ID 3208, refers to the generation virtual segment address pointers 3205 corresponding to all the generations of virtual segments in each of the virtual block groups, and sends the following information:

(a) information denoting whether data is not being stored (NULL) or data is being stored; and (b) in a case where the information of the above-mentioned (a) is information denoting that data is being stored, information that shows which generation of data, and information stored in the amount of generation compressed virtual segment data 3206. Lastly, the virtual block transfer process execution part 12300 sends the data stored in the virtual segments of all the valid generations to the storage controller 200. The processing ends with the above.

Figure 32:
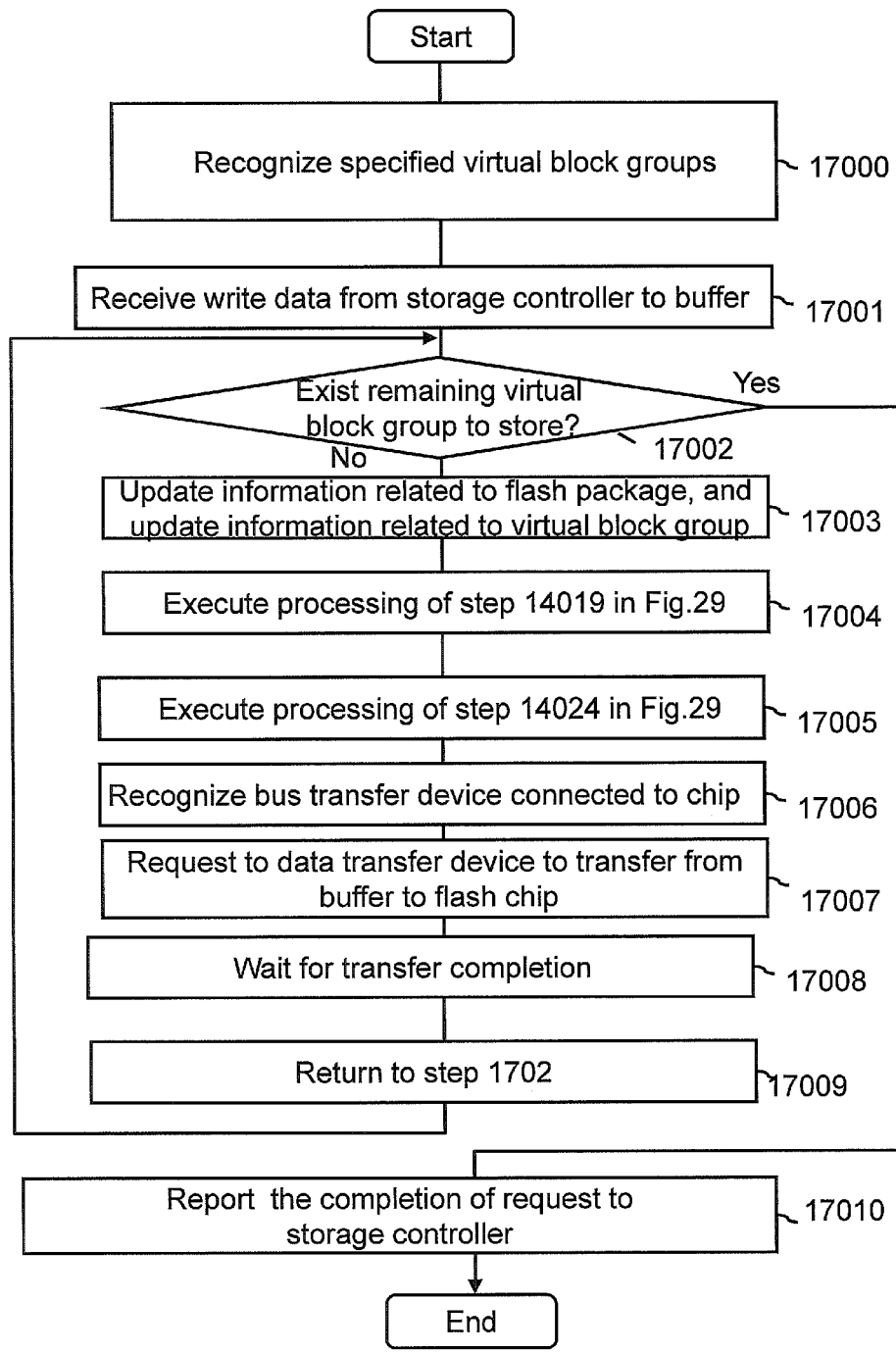
FIG. 32 is a diagram showing the flow of processing of a virtual block store process execution part in the example.

FIG. 32 is the flow of processing of the virtual block store process execution part 12400.

The virtual block store process execution part 12400 is executed upon receiving a storage request (a request to respectively allocate real blocks to specified virtual block groups and to store data sent from the storage controller 200). The flow of data is the reverse of that of the virtual block transfer process execution part 12300, but since there are numerous points shared in common, an explanation will be given while citing the respective steps of the flow of processing of FIG. 31.

Step 17000: This step is the same as Step 16000. The virtual block store process execution part 12400 identifies a target virtual block group from a collection of virtual segments for which storage has been specified.

Step 17001: The virtual block store process execution part 12400 receives the following information from the storage controller 200. That is, the virtual block store process execution part 12400 receives from the storage controller 200 with respect to all the specified virtual block groups a set comprising the amount of stored data, the amount of compressed and stored data, the number of generations, and the generation ID. In addition, the virtual block store process execution part 12400 receives the following information:

(a) information denoting whether data is not being stored (NULL) or data is being stored; and (b) in a case where the information of the above-mentioned (a) is information denoting that data is being stored, information that shows which generation of data, and information stored in the length of post-compression data. Lastly, the virtual block store process execution part 12400 receives the data stored in the virtual segment, and instructs the compression extension circuit 360 to compress this data at this time and to store the compressed data in the buffer 330. The virtual block store process execution part 12400 also adds the change value for the amount of stored data and the amount of compressed and stored data for all the data to the amount of stored package data 3006 and the amount of compressed and stored package data 3007. Next, the virtual block store process execution part 12400 sorts the specified virtual segments for each virtual block group.

Step 17002: This step is the same as Step 16002. The virtual block store process execution part 12400 searches for a virtual block group, which has been instructed to store data. In a case where no more exist, the virtual block store process execution part 12400 jumps to Step 17010.

Step 17003: The virtual block store process execution part 12400 stores the received set comprising the amount of stored data, the amount of compressed and stored data, the number of generations, and the generation ID corresponding to the relevant virtual block groups in the amount of stored data 3203, the amount of compressed and stored data 3204, the number of generations 3207 and the generation ID 3208 of the corresponding virtual block information 3200. Furthermore, the virtual block store process execution part 12400 sets the information denoting whether data is being stored or not received in relation to the corresponding generation virtual segment in the corresponding generation virtual segment address pointer 3205. In a case where information that data is being stored has been received, the virtual block store process execution part 12400 sets the corresponding length of post-compression data in the amount of generation compressed virtual segment data 3206 by referring to the generation information.

Step 17004: The real blocks are allocated to the relevant virtual block group here. The number of allocated real blocks is determined on the basis of the amount of compressed and stored data 3204 of the relevant virtual block information 3200. The required number of real blocks is allocated at this point. Since this processing was shown in Step 14019 of FIG. 29, an explanation will be omitted.

Step 17005: The virtual block store process execution part 12400 updates the virtual segment address pointer(s) 3205 showing that data is stored in the relevant virtual block information 3200. This is the same as Step 14024, and as such, an explanation will be omitted.

Step 17006: The virtual block store process execution part 12400 identifies the package bus 340 to which the relevant flash chip 300 is coupled, and identifies the corresponding bus transfer device 350 based on the chip information 3100 corresponding to the flash chip 300 in which the data inside the virtual segment is stored.

Step 17007: The virtual block store process execution part 12400 instructs the bus transfer device 350 identified in Step 17006 to store the data of the entire relevant virtual block group from the addresses of the flash chip 300 to the buffer 330.

Step 17008: The virtual block store process execution part 12400 waits for the transfer to be completed.

Step 17009: The virtual block store process execution part 12400 returns to Step 17002.

Step 17010: The virtual block store process execution part 12400 reports the completion of the processing request to the storage controller 200, and ends the above processing.

Figure 33:
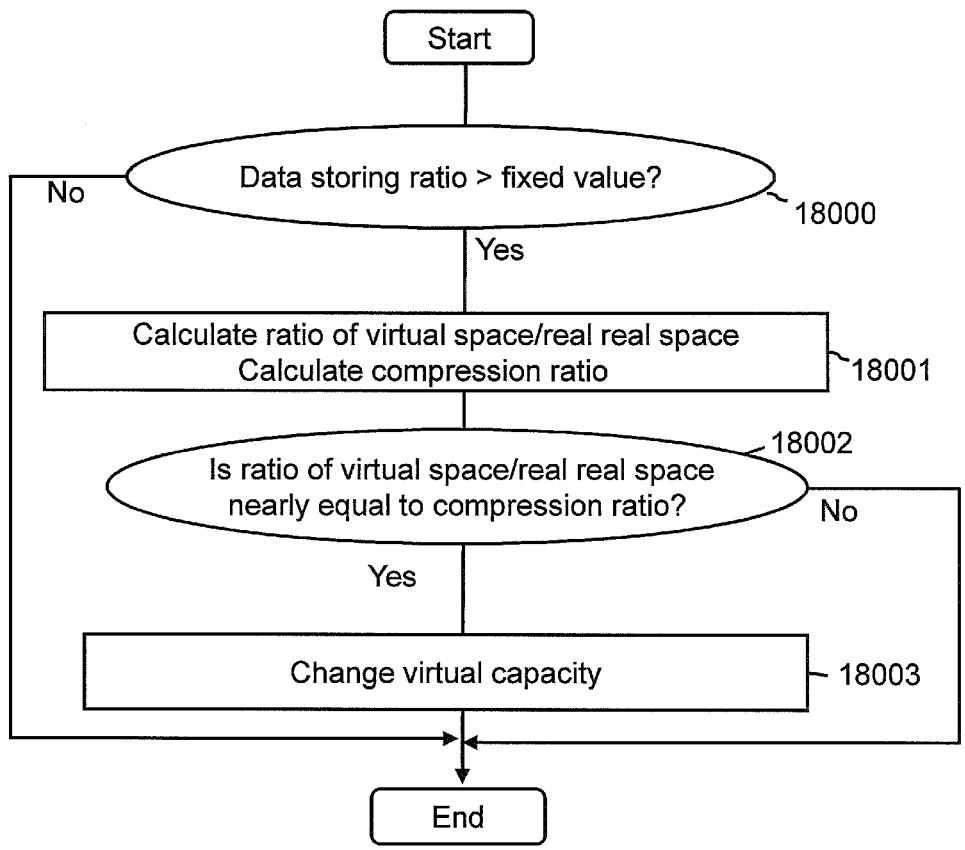
FIG. 33 is a diagram showing the flow of processing of a virtual capacity judging process execution part in the example.

FIG. 33 is the flow of processing of the virtual capacity judging execution part 12500.

The virtual capacity judging execution part 12500 discerns the compression ratio and determines whether it is necessary to adjust the virtual capacity of the relevant package 230. In a case where the determination is that adjustment is required, the virtual capacity judging execution part 12500 decides and sets this capacity in the virtual package capacity 3002. In addition, the virtual capacity judging execution part 12500 returns this capacity and the fact that the capacity has changed to the call source.

Step 18000: The virtual capacity judging execution part 12500 computes the ratio amount of stored package data 3006/virtual package capacity 3002. The computed ratio will be called P. In a case where ratio P is equal to or less than Q (Q, for example, is a much smaller value than P), the virtual capacity is not adjusted, and the processing returns to the call source. This is because when the ratio P is equal to or less than Q, there is still not that much data being stored.

Step 18001: The virtual capacity judging execution part 12500 computes R=(virtual package capacity 3002/real package capacity 3003). The virtual capacity judging execution part 12500 also computes T=(amount of stored package data 3006/amount of compressed and stored package data 3007). The value T is the compression ratio.

Step 18002: The virtual capacity judging execution part 12500 compares R with T. In a case where these values are substantially equivalent (for example, in a case where the difference between R and T is less than a prescribed value), the ideal virtual package capacity 3002 is set. For this reason, the virtual capacity judging execution part 12500 decides not to perform an adjustment, and returns processing to the call source. In a case where R is larger than T (a case where the virtual capacity is too large) or a case where R is smaller than T (a case where the virtual capacity is too small), the virtual capacity judging execution part 12500 adjusts the virtual package capacity 3002.

Step 18003: The virtual capacity judging execution part 12500 adjusts the virtual capacity. The post-adjustment virtual capacity value, for example, is real package capacity 3003*T. This is the ideal value provided the compression ratio T does not change in the future. The post-adjustment virtual capacity value may be (real package capacity 3003−amount of compressed and stored package data 3007)*R+ amount of compressed and stored package data 3007*T. The virtual capacity judging execution part 12500 sets the decided value (the post-adjustment virtual capacity value) in the virtual package capacity 3002, and, in addition, notifies the call source of the virtual capacity adjustment and this decided value, and ends the processing.

According to this example, it is possible to hold performance degradation in check and to enable the storage of a capacity that is larger than the physical capacity even when using a compression function to reduce the stored data capacity in a large-scale storage system to which large numbers of flash packages mounted with large numbers of flash memories are respectively coupled.

An example of the present invention has been explained hereinabove, but this is merely an example for explaining the present invention and does not purport to limit the scope of the present invention solely to this example. The present invention can also be put into practice using a variety of other modes. For example, typically all of the above-mentioned generation ID, GI ID and BK ID are numbers, but anything can be used either instead of or in addition to the number in the case of an ID of the type that is regularly updated when the generations have increased. Furthermore, for example, a method in which the address (for example, a LBA (Logical Block Address)) of an area of the logical volume is used with respect to a real page and real segment in place of a generation ID is conceivable, but since doing so makes it unclear which generation is the latest, it is preferable that a generation ID be used as in the example described hereinabove.

An overview of the present invention in accordance with one or more aspects thereof will be described below based on the above explanation.

A storage system comprises a plurality of flash packages and a storage controller for sending a write request (hereinafter, a second write request) for write data based on data conforming to a write request from a higher-level apparatus (hereinafter, a first write request). The higher-level apparatus may be a host computer or another storage system.

Each flash package comprises one or more flash memories and a package controller, which is coupled to the storage controller and to one or more flash memories. Each flash memory comprises a plurality of real blocks. Each real block is configured from a plurality of real segments. This flash memory is a type of flash memory, for example, a NAND flash memory, in which data is deleted in block units and data is written and read in segment units. The package controller writes write data, which conforms to a write request from the storage controller, to the real block.

There is a higher-level virtual space, a higher-level real space, a lower-level virtual space, and a lower-level real space. The higher-level virtual space comprises one or more virtual logical volumes (virtual logical volumes conforming to thin provisioning) configured from a plurality of virtual pages (virtual storage areas). The higher-level real space is a storage space configured from a plurality of real pages. The lower-level virtual space is a storage space configured from a plurality of virtual blocks. A real page is configured from one or more virtual blocks. The lower-level real space is a storage space configured from a plurality of real blocks. Higher-level capacity virtualization in which a real page is allocated to a write-destination virtual page to which a real page is not allocated, and lower-level capacity virtualization in which a real block is allocated to a write-destination virtual block to which a real block is not allocated are carried out.

The storage controller (or the package controller) generates a second logical volume based on a first logical volume. The storage controller (or the package controller) manages a plurality of logical volumes comprising the first logical volume and one or more second logical volumes generated based on the first logical volume as a logical volume group. In a case where a second logical volume has been newly generated based on the first logical volume, the generation ID of the logical volume to which data in accordance with a higher-level write request from the higher-level apparatus is written is updated to the latest generation ID, from among the plurality of logical volumes which configure the same logical volume group and include the newly generated second logical volume. Even though the generation ID is updated, for example, it is preferable that the volume ID (for example, a LUN (Logical Unit Number)), which is specified by the access request (a first write request and a first read request) from the higher-level apparatus, not be updated. The storage controller (or the package controller) allocates the same real page to the same address virtual pages of the plurality of logical volumes comprising the logical volume group.

Each real block comprises a plurality of real segments. In a case where data is written anew to a real block, which is allocated to a virtual block that makes up the same real page, the data is written to an empty real segment of this real block.

The storage controller manages the association between the generation IDs of logical volumes configuring the logical volume group, and the real pages allocated to the plurality of logical volumes configuring this logical volume group. The storage controller, in a case where a second write request is to be sent, includes the generation ID of the write-destination logical volume conforming to the first write request in this second write request. The package controller receives the second write request, writes the write data conforming to this second write request in an empty real segment of the real block allocated to the real page (virtual block) of the address that conforms to this second write request, and manages the write-destination real segment of this write data in association with the generation ID included in the second write request of this write data. One real page is allocated to a plurality of logical volumes corresponding to each of a plurality of generations, and a plurality of generation data is written to this same real page, but due to the characteristics of the flash memory, these data are not overwritten and deleted, but rather are stored in a plurality of different real segments in one or more real blocks allocated to the same real page. There is valid data (the latest data) and invalid data for each generation. At the time of a reclamation, the valid data for each generation is concentrated in one or more real blocks with respect to the same real page, and delete processing is carried out for the real block in which only the invalid data of one or more generations is stored.

The storage controller receives a first read request from the higher-level apparatus, and sends a second read request that is based on this first read request to the read-source flash package of the plurality of flash packages, and when the second read request is sent, includes the generation ID of the read-source logical volume that conforms to the first read request in this second read request. The package controller receives the second read request, and identifies, based on the one or more real blocks allocated to the real page (virtual block) of the address conforming to this second read request, the real segment storing the valid data with respect to the generation ID included in this second read request. In a case where such a real segment does not exist, the package controller identifies the real segment storing valid data of an older generation (for example, either the first logical volume or the latest second logical volume) than the generation denoted by the generation ID included in the second read request. The package controller reads the data from the identified real segment, and sends this data to the storage controller. The storage controller receives this data and sends this data to the higher-level apparatus.

The storage controller can manage whether each logical volume group is a first type logical volume group in which the first logical volume is updated by the higher-level apparatus, or a second type logical volume group in which the second logical volume is updated by the higher-level apparatus. According to the first type logical volume group, data is typically backed up from the first logical volume to the second logical volume. According to the second type logical volume group, typically, a second logical volume that was generated based on the golden image-storing first logical volume is used in a virtual computer executed by the higher-level apparatus. The virtual computer reads and executes an OS included in the golden image from the second logical volume.

The storage controller (or the package controller) judges whether or not the number of logical volumes (number of generations) allocated with the same real page exceeds a fixed number, and in a case where the result of this judgment is affirmative, distributes the plurality of data (for example, valid data) stored in one or more real blocks that are allocated to this same real page and written to the plurality of logical volumes allocated with this same real page, to a plurality of real pages.

Either the storage controller or the package controller defines in the storage controller a virtual capacity that is larger than the total value of the physical capacity of the plurality of flash chips of the flash package.

Either the storage controller or the package controller compresses the write data conforming to the lower-level write request. The package controller of the flash package, which is the destination of the lower-level write request, writes compressed data, which is the compressed write data, to the real block allocated to the write-destination virtual block.

Either the storage controller or the package controller changes the virtual capacity of a flash package in accordance with the data storage status of this flash package. The data storage status is typically the above-described compression ratio. The flash package compression ratio is a value based on the total capacity of the pre-compression write data with respect to the valid compressed data stored in this flash package and the total capacity of the valid compressed data stored in this flash package. Specifically, for example, either the storage controller or the package controller manages the amount of valid compressed data written to a virtual segment and the amount of pre-compression data with respect to this valid data. The total capacity of the pre-compression write data with respect to the valid compressed data stored in the flash package is a value computed on the basis of the amount of pre-compression data with respect to the written valid data for each virtual segment provided by this flash package. The total capacity of the valid compressed data stored in the flash package is a value computed on the basis of the amount of valid compressed data stored in this flash package for each virtual segment provided by this flash package. For example, it is supposed that a real block #1 is allocated to a virtual block #1, and that the virtual block #1 comprises virtual segments #1 and #2. An explanation in which the length of the virtual segment is 8 kilobytes will be given here. It is supposed that one kilobyte of compressed data is stored in the virtual segment #1 as a result of compressing and storing the data, two kilobytes of compressed data is stored in the virtual segment #2 as a result of compressing and storing the data, and, in addition, the data in virtual segment #1 is rewritten and compressed, resulting in three kilobytes of data being stored. In this case, the valid data (latest data) of virtual segment #1 is three kilobytes of compressed data, and the valid data (latest data) of virtual segment #2 is two kilobytes of compressed data. For this reason, the total amount of the latest compressed data in real block #1 is three kilobytes+two kilobytes=five kilobytes. Furthermore, the total amount of the latest pre-compression data in real block #1 is eight kilobytes+eight kilobytes=16 kilobytes. In a case where compressed data is stored in the virtual segment like this, the amount of stored package data 3006 and the amount of compressed and stored package data 3007 are updated with respect to the flash package providing this virtual segment. The package controller sends to the storage controller compression status information (for example, information denoting the amount of compressed data written to this virtual segment and the amount of pre-compression write data with respect to this compressed data and/or information denoting the relevant write-time compression ratio computed based on these amounts) with respect to the virtual block comprising the write-destination virtual segment. The compression status information may be included in the completion report with respect to the lower-level write request.

Either the storage controller or the package controller increases the virtual capacity of this flash package in a case where the flash package compression ratio has increased. This is because it is possible to further reduce the amount of stored data, thereby raising the prospects of even more write data being stored.

Either the storage controller or the package controller decreases the virtual capacity of this flash package in a case where the compression ratio of the flash package has been decreased. This is because the amount of stored data is not reduced very much, thereby increasing the prospects that not much more write data can be stored.

Each real page comprises a plurality of virtual blocks. In a case where the storage controller increases the virtual capacity of a flash package, the number of empty real pages based on this flash package increases, and in a case where the storage controller decreases the virtual capacity of a flash package, the number of empty real pages based on this flash package decreases. In a case where there is a higher-level capacity virtualization function in addition to the lower-level capacity virtualization function like this, the virtual capacity can be increased and decreased without changing the corresponding relationship between the virtual block and the real block.

The compression of the write data is carried out for at least one of the following operations, i.e. when writing to a flash chip, when performing a reclamation process, or when transferring data between pages. The reclamation process is one that is inevitably carried out in a flash package, and since compression is carried out at the time of this process, drops in performance can be expected to be held in check.

The storage controller transfers data between flash packages from a transfer-source real page to a transfer-destination real page based on the flash package compression ratio. The storage controller makes use of management information associated with the transfer-source real page and management information associated with the transfer-destination real page. The management information, for example, may include whether data is being stored or whether cyclic information is being stored. Furthermore, in a data transfer between flash packages, the transfer-source flash package may extend (or not extend) and transfer the valid compressed data inside the real block allocated to the transfer-source real page to the transfer-destination flash package, and the transfer-destination flash package may compress (or not compress because compression has already been completed) and store the received data in the real block allocated to the transfer-destination real page. The management information corresponding to the transfer-source real page (for example, information denoting the amount of stored data and the amount of compressed and stored data) is reset, and the management information corresponding to the transfer-destination real page (for example, information denoting the amount of stored data and the amount of compressed and stored data) may be updated in accordance with the data transfer on the basis of the amount of stored compressed data (and the amount of pre-compression data with respect to this compressed data).

The package controller is able to carry out a reclamation process in the flash package of this package controller. In the reclamation process, the package controller makes a transfer-source real block into an empty real block by transferring the valid data inside the transfer-source real block, which is full, to a transfer-destination real block, and performs a delete process with respect to the transfer-source real block (a process for deleting the data stored in the transfer-source real block). Data compression and extension may be carried out in this reclamation process.

REFERENCE SIGNS LIST

100 Storage system
110 Host
120 Storage area network (SAN)
200 Storage controller
210 Cache memory
220 Common memory
230 Flash package
250 Connecting unit
260 Processor
270 Memory
280 Flash package group
300 Flash chip
310 Package processor
320 Package memory
330 Buffer
340 Package bus
350 Bus transfer device 360 Compression extension circuit
2000 Logical volume information
2100 Real page information
2300 Flash package group information
2500 Flash package information
3000 Package information
3100 Chip information
3200 Virtual block information
3300 Real block information
4000 Read process execution part
4100 Write request receive part
4200 Write after process execution part
4300 Real page division process part
4500 Page transfer process execution part
4600 Logical volume generation process part
12000 Data read process execution part
12100 Data write process execution part
12300 Virtual block transfer process execution part
12400 Virtual block store process execution part
12500 Virtual capacity judging execution part

What is claimed is:

1. A storage system comprising:
a storage controller; and
a plurality of flash packages, wherein each of the plurality of flash packages includes a plurality of flash memory chips storing a plurality of generations of data which are associated with a logical storage area of a logical address and provides the storage controller access to the logical storage area;
wherein the storage controller is configured to access data of any generation and manage a plurality of real pages based on the logical storage area provided by the plurality of flash packages,
wherein the storage controller is configured to generate, based on a first logical volume, a second logical volume,
wherein the storage controller is configured to allocate a real page among the plurality of real pages to both a first part of the first logical volume where the first part is configured to be an access target of first data of a first generation and a second part of the second logical volume where the second part is configured to be an access target of second data of a second generation, wherein the first generation and the second generation are different,
wherein on a condition that a number of empty real pages included in the plurality of flash packages is less than a prescribed threshold:
a real page to be migrated is chosen based on an amount of stored data of the plurality of real pages, wherein the amount of stored data is an amount of a plurality of generations of data, and wherein the data stored in the chosen real page is allocated to both the first part of the first logical volume and the second part of the second logical volume and is migrated to another plurality of flash packages.

2. The storage system of claim 1, wherein the plurality of flash packages constitute a flash package group.

3. The storage system of claim 2, wherein one flash package group is chosen as a transfer destination.

4. The storage system of claim 2, wherein a plurality of flash package groups are chosen as a single transfer destination.

5. The storage system of claim 1, wherein the storage controller is further configured to update empty page information in a page management information corresponding to an empty real page of the number of empty real pages.

6. A method for use in a storage system, the method comprising:
associating, by a plurality of flash packages, a plurality of generations of data with a logical storage area of a logical address;
storing the associated plurality of generations of data in a plurality of flash memory chips;
accessing data of any generation by a system controller;
managing, by the system controller, a plurality of real pages based on the logical storage area provided by a plurality of flash packages,
making, by the system controller, based on a first logical volume, a second logical volume,
allocating, by the system controller, a real page among the plurality of real pages to both a first part of the first logical volume where the first part is configured to be an access target of first data of a first generation and a second part of the second logical volume where the second part is configured to be an access target of second data of a second generation, wherein the first generation and the second generation are different,
wherein on a condition that a number of empty real pages included in the plurality of flash packages is less than a prescribed threshold:
choosing a real page to be migrated based on an amount of stored data of the plurality of real pages, wherein the amount of stored data is an amount of a plurality of generations of data, and migrating the data stored in the chosen real page to another plurality of flash packages, wherein the chosen real page is allocated to both the first part of the first logical volume and the second part of the second logical volume.

7. The method of claim 6, wherein the plurality of flash packages constitute a flash package group.

8. The method of claim 7, wherein one flash package group is chosen as a transfer destination.

9. The method of claim 7, wherein a plurality of flash package groups are chosen as a single transfer destination.

10. The method of claim 6 further comprising:
updating empty page information in a page management information corresponding to an empty real page of the number of empty real pages.

* * * * *